United States Patent [19]

Porter et al.

[11] 4,217,640
[45] Aug. 12, 1980

[54] CACHE UNIT WITH TRANSIT BLOCK BUFFER APPARATUS

[75] Inventors: Marion G. Porter; Charles P. Ryan; William A. Shelly, all of Phoenix, Ariz.

[73] Assignee: Honeywell Information Systems Inc., Waltham, Mass.

[21] Appl. No.: 968,522

[22] Filed: Dec. 11, 1978

[51] Int. Cl.$^2$ ............................................. G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,588,829 | 6/1971 | Boland et al. | 364/200 |
| 3,693,165 | 9/1972 | Reiley et al. | 364/200 |
| 3,820,078 | 6/1974 | Curley et al. | 364/200 |
| 3,893,084 | 7/1975 | Kotek et al. | 364/200 |
| 3,988,719 | 10/1976 | Whitby et al. | 364/200 |
| 4,006,466 | 1/1977 | Patterson et al. | 364/200 |
| 4,041,292 | 8/1977 | Kindell et al. | 235/164 |
| 4,055,851 | 10/1977 | Jenkins et al. | 364/200 |

*Primary Examiner*—Harvey E. Springborn
*Attorney, Agent, or Firm*—Faith F. Driscoll; Nicholas Prasinos; Ronald T. Reiling

[57] ABSTRACT

A data processing system comprises a data processing unit coupled to a cache unit which couples to a main store. The cache unit includes a cache store organized into a plurality of levels, each for storing a number of blocks of information in the form of data and instructions. Directories associated with the cache store contain addresses and level control information for indicating which blocks of information reside in the cache store. The cache unit further includes control apparatus and a transit block buffer comprising a number of sections each having a plurality of locations for storing read commands and transit block addresses associated therewith. A corresponding number of valid bit storage elements are included, each of which is set to a binary ONE state when a read command and the associated transit block address are loaded into a corresponding one of the buffer locations. Comparison circuits, coupled to the transit block buffer, compare the transit block address of each outstanding read command stored in the transit block buffer section with the address of each read command or write command received from the processing unit. When there is a conflict, the comparison circuits generate an output signal which conditions the control apparatus to hold or stop further processing of the command by the cache unit and the operation of the processing unit. Holding lasts until the valid bit storage element of the location storing the outstanding read command is reset to a binary ZERO indicating that execution of the read command is completed.

37 Claims, 16 Drawing Figures

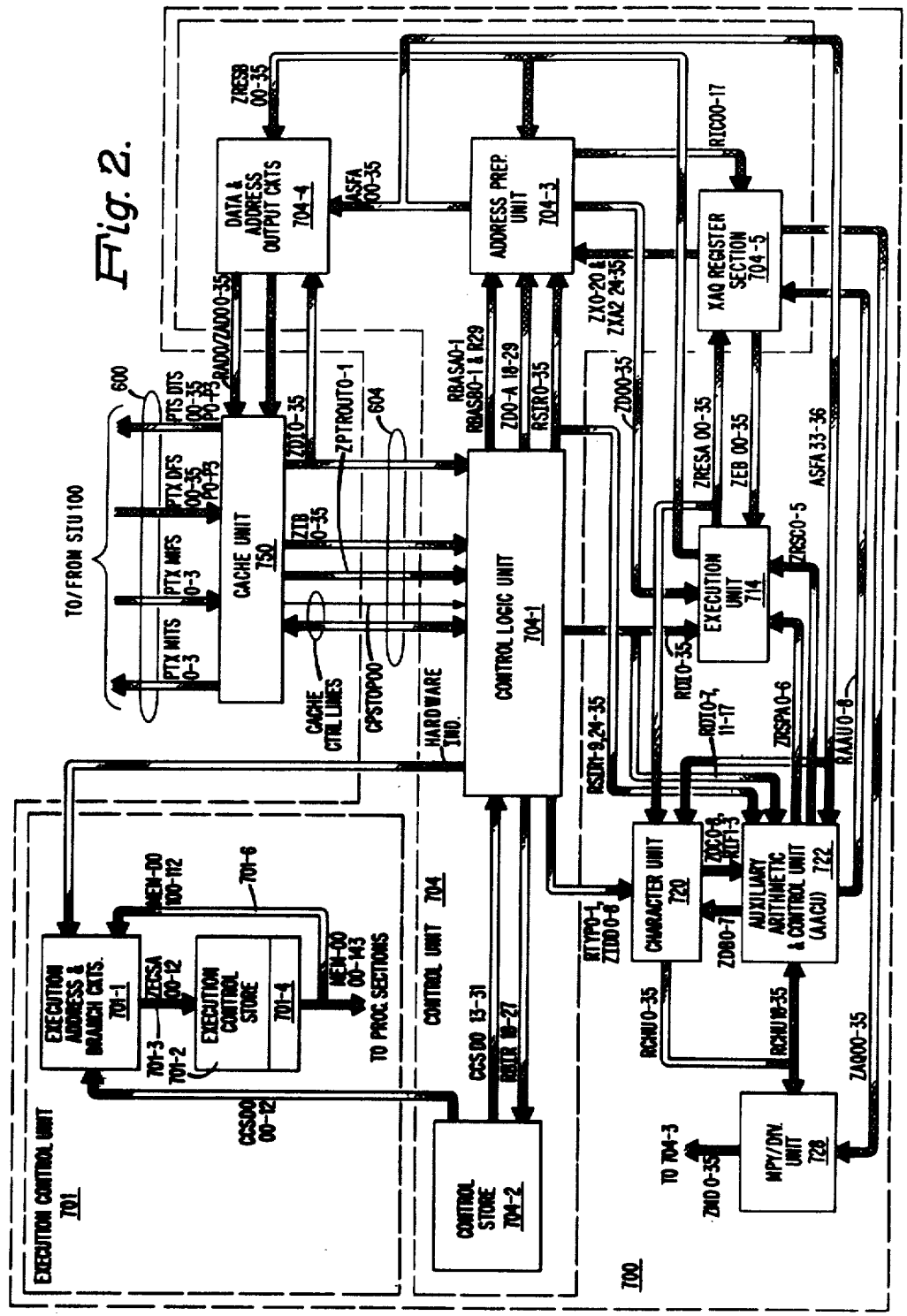

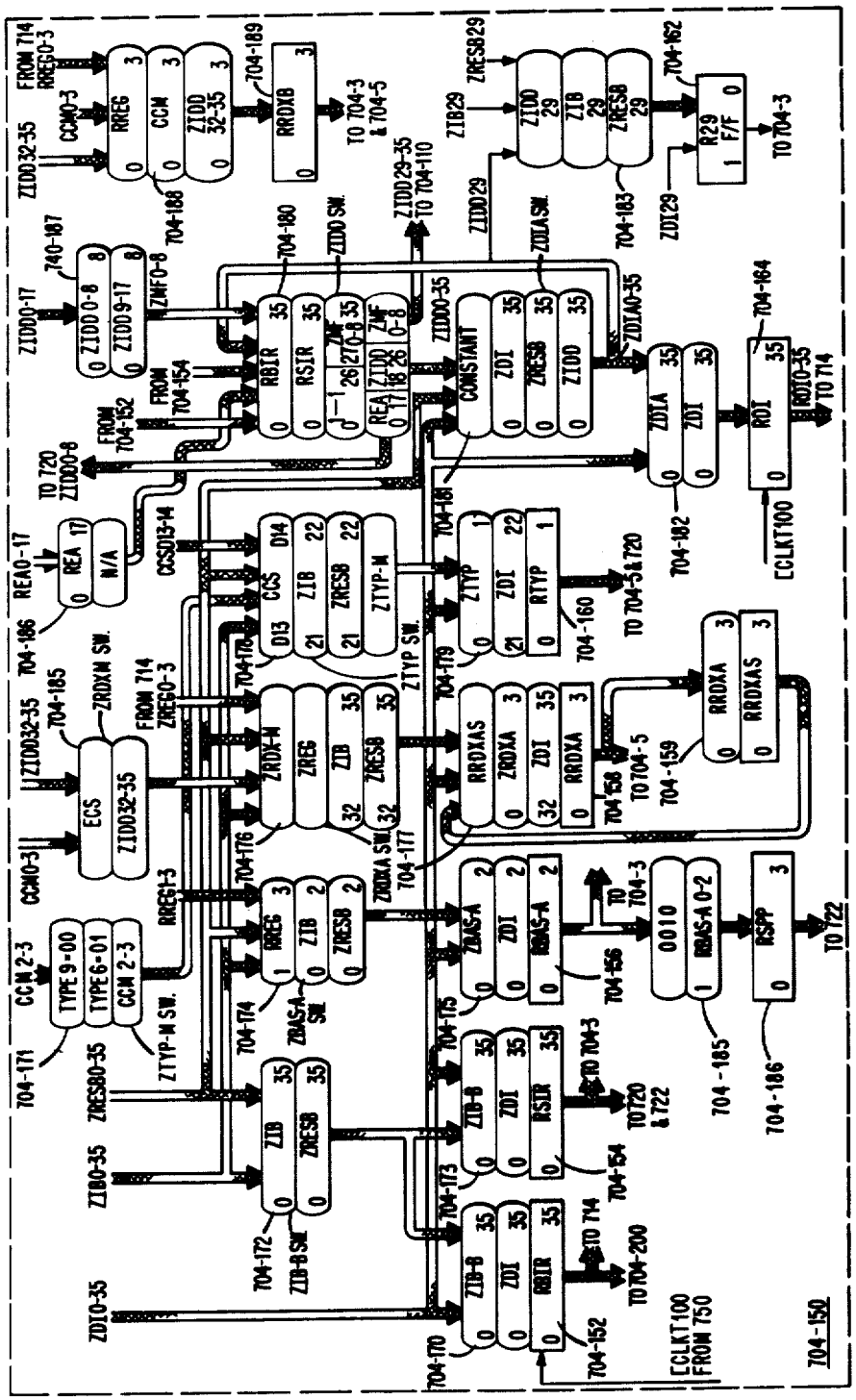
Fig. 3c. (sheet 2 of 2)

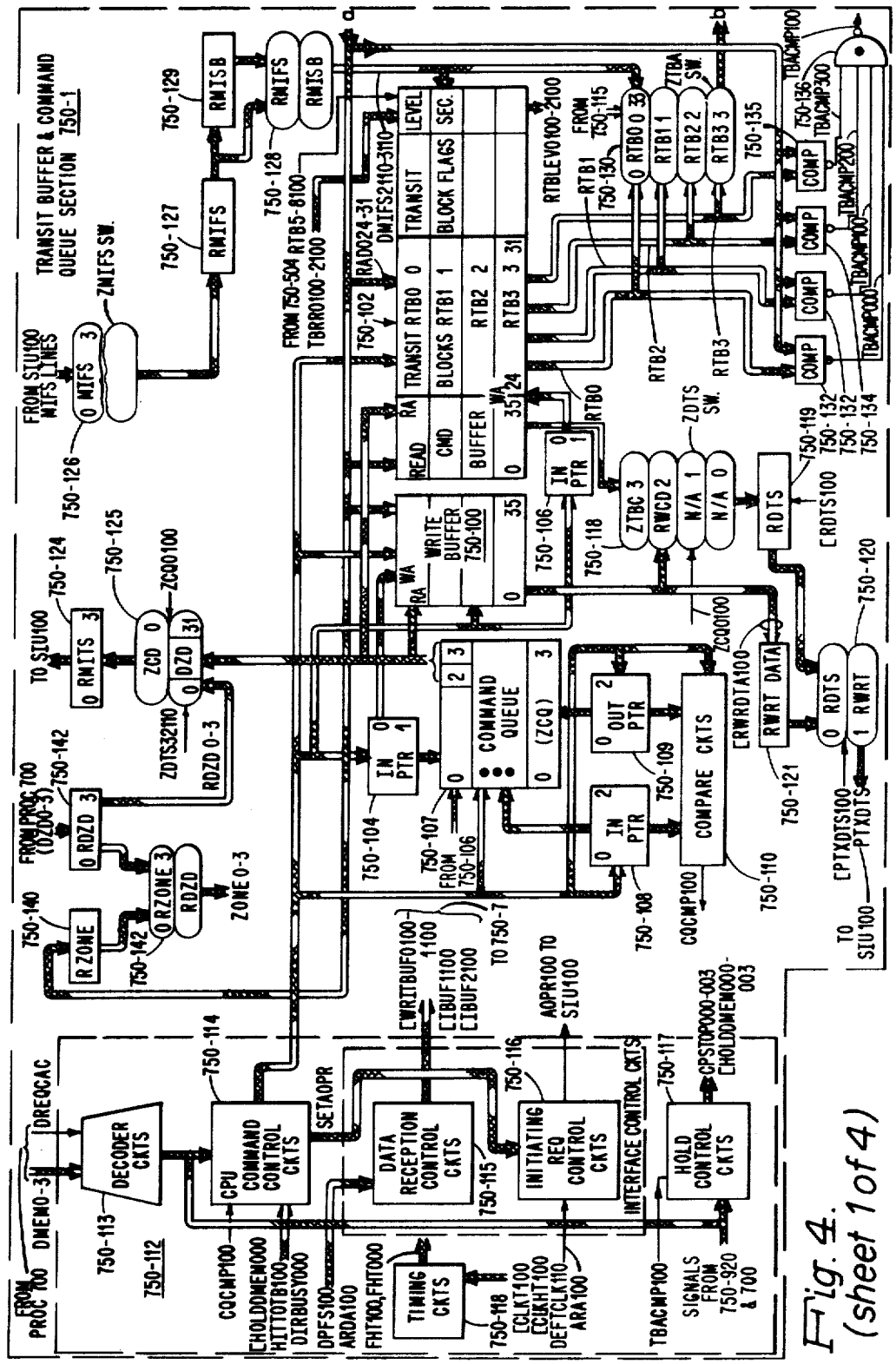
Fig. 4. (sheet 1 of 4)

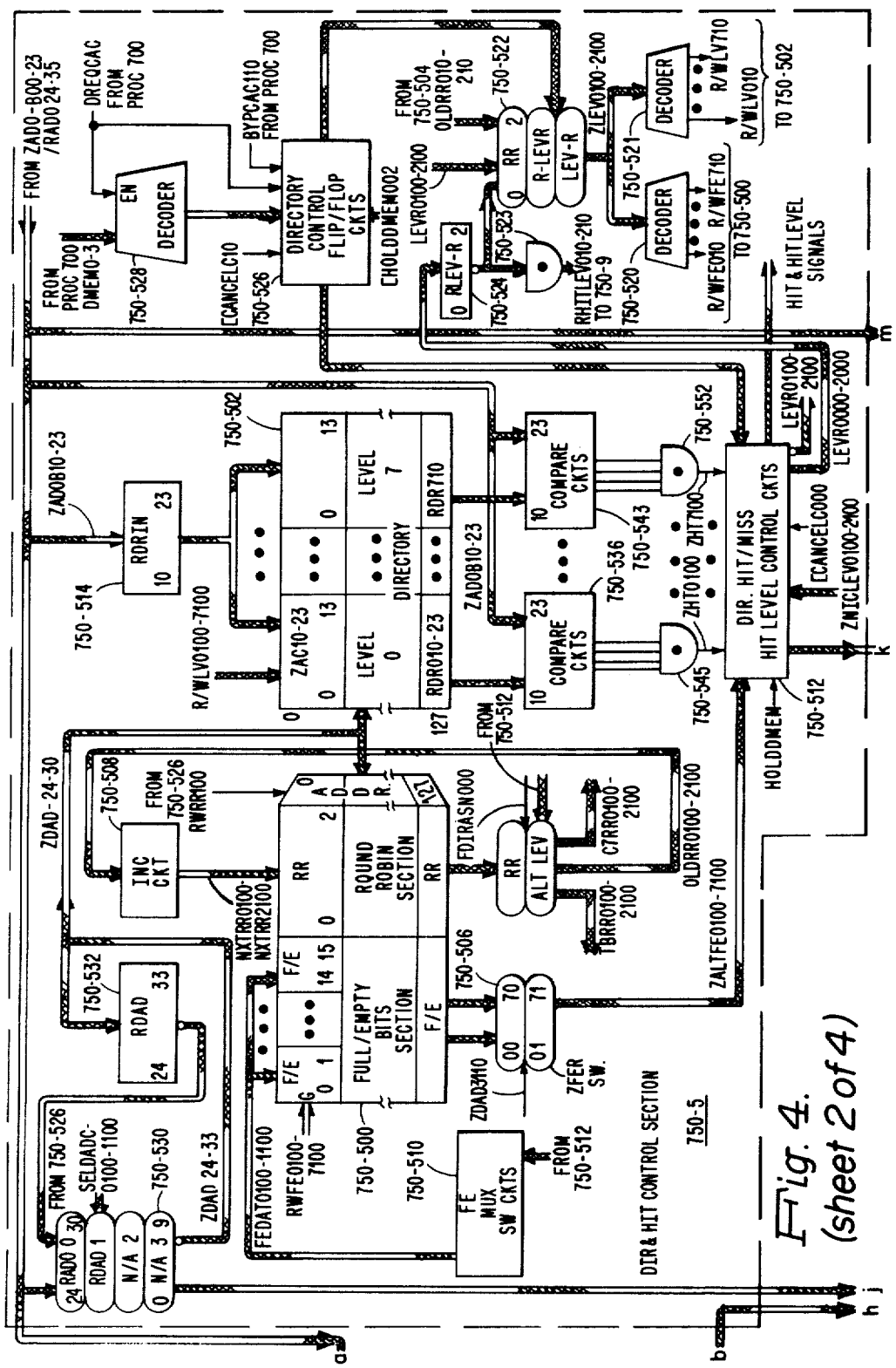
Fig. 4. (sheet 2 of 4)

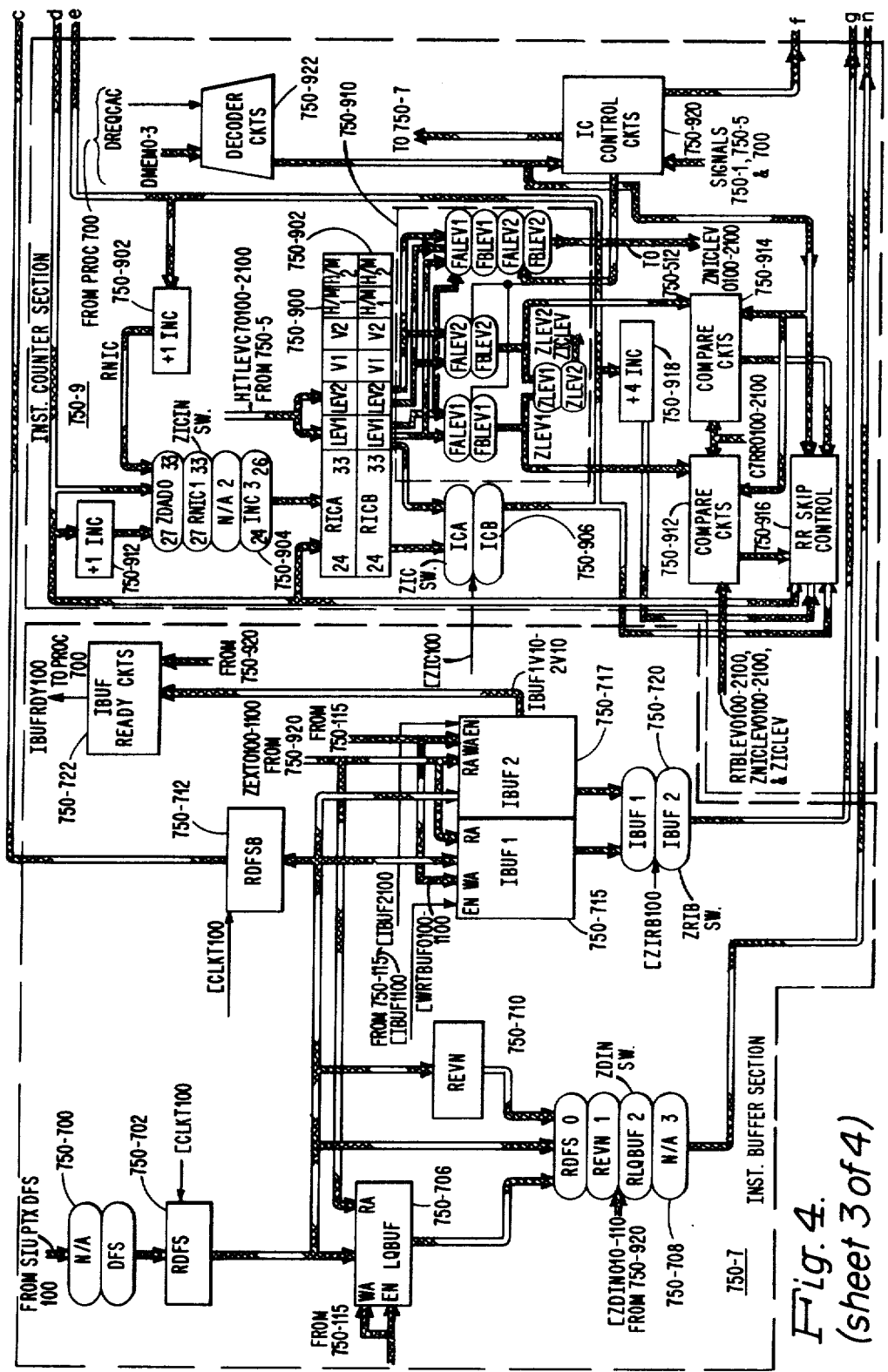
Fig. 4. (sheet 3 of 4)

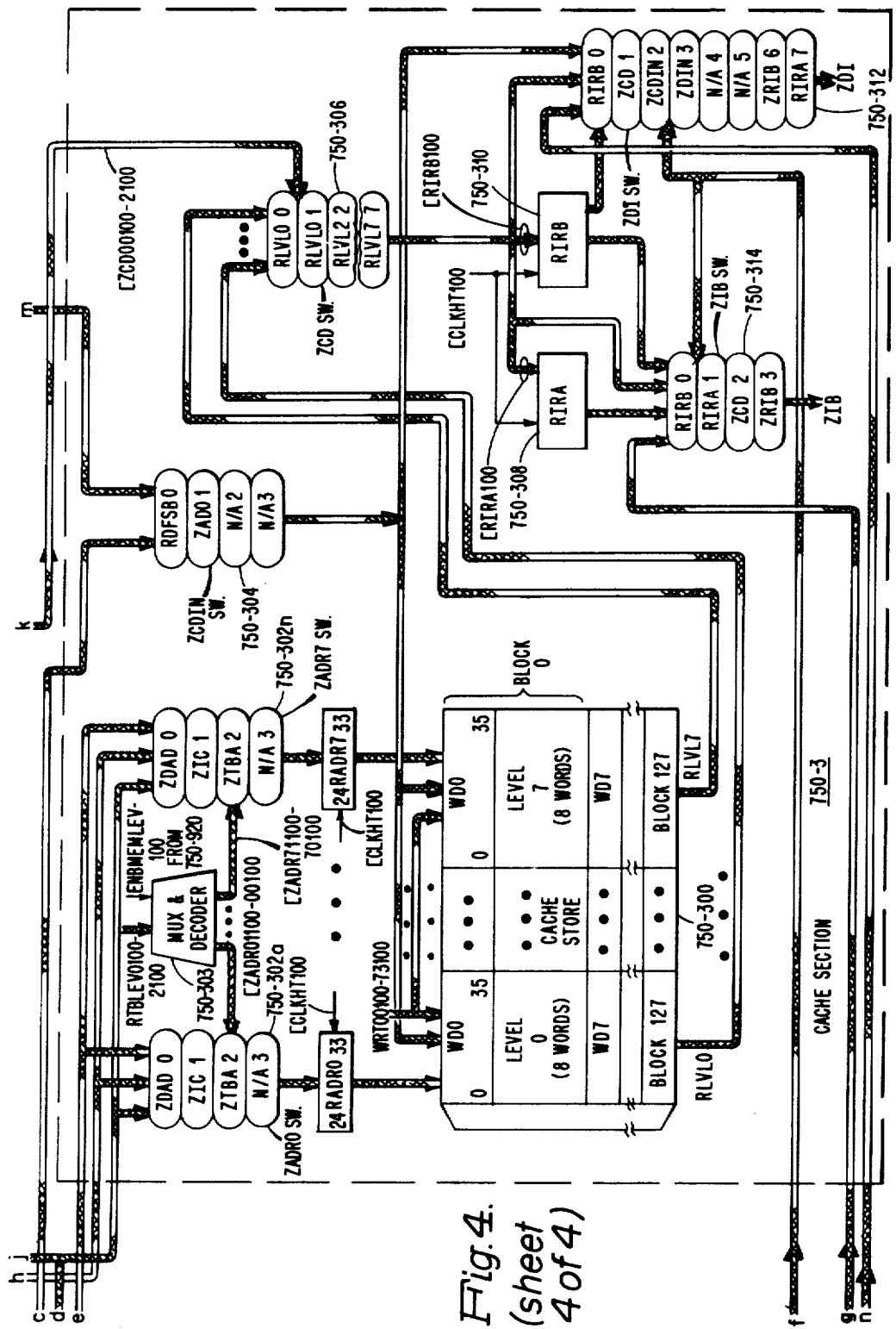
Fig. 4. (sheet 4 of 4)

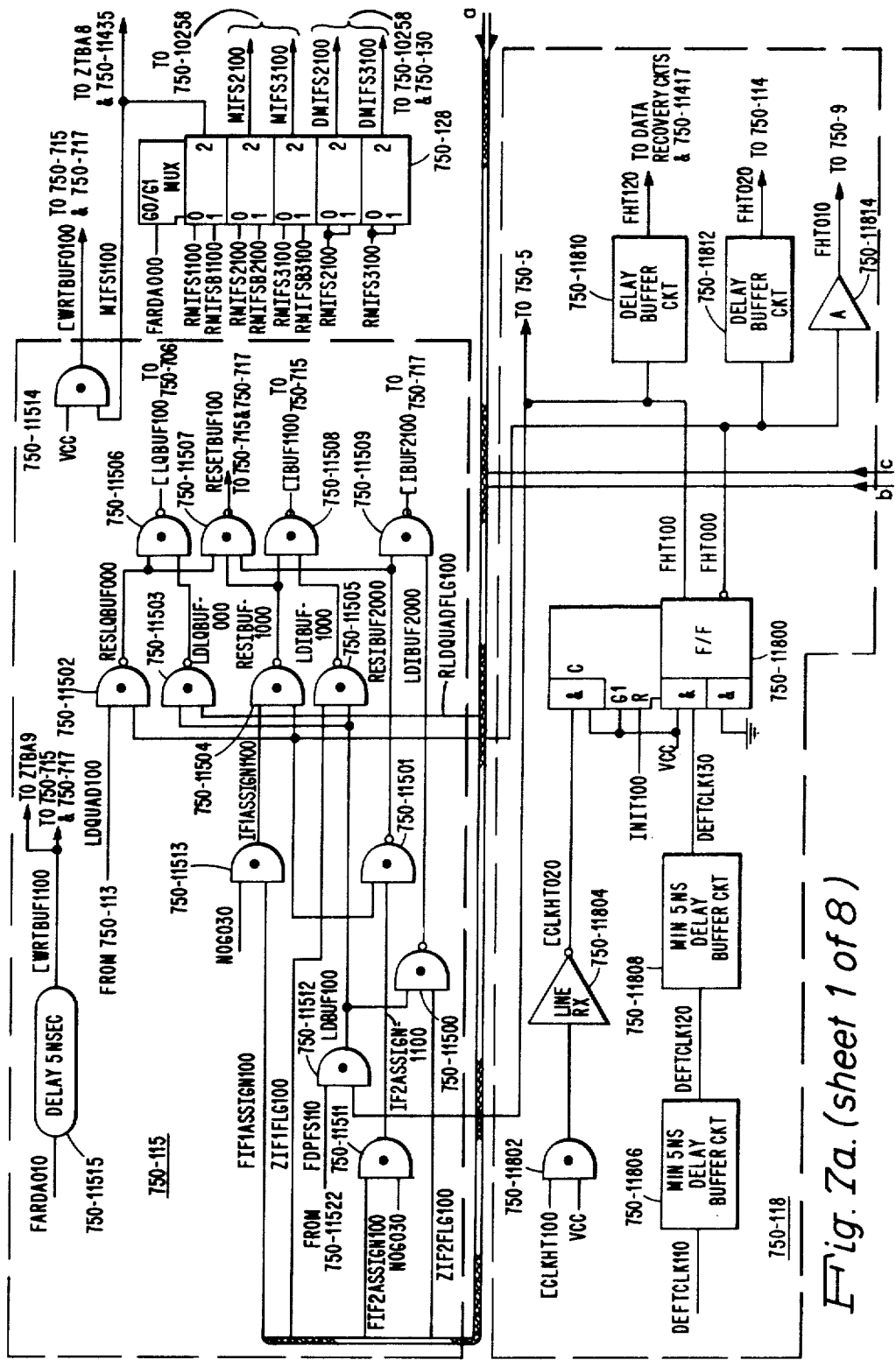
Fig. 7a. (sheet 1 of 8)

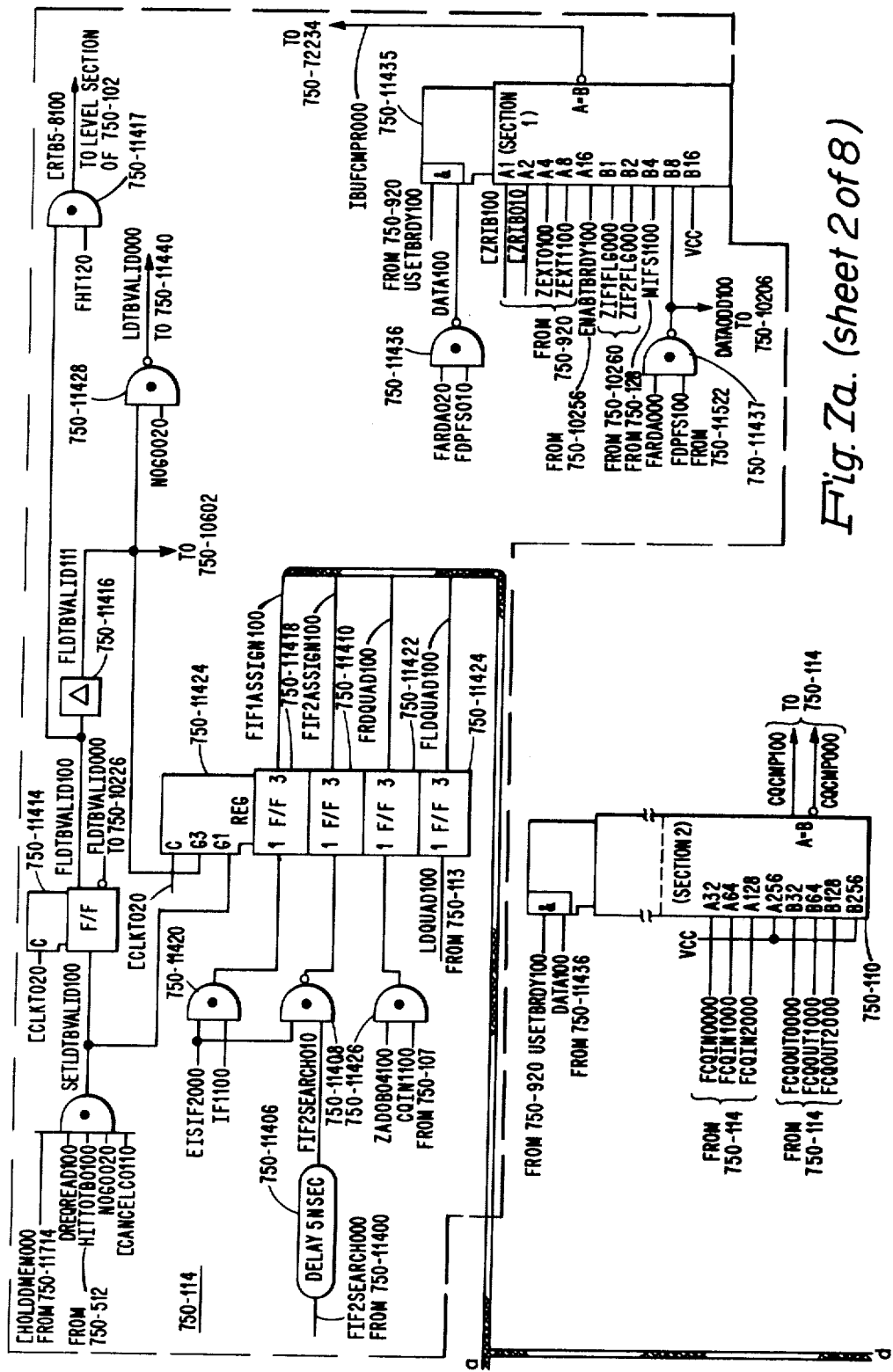
Fig.7a. (sheet 2 of 8)

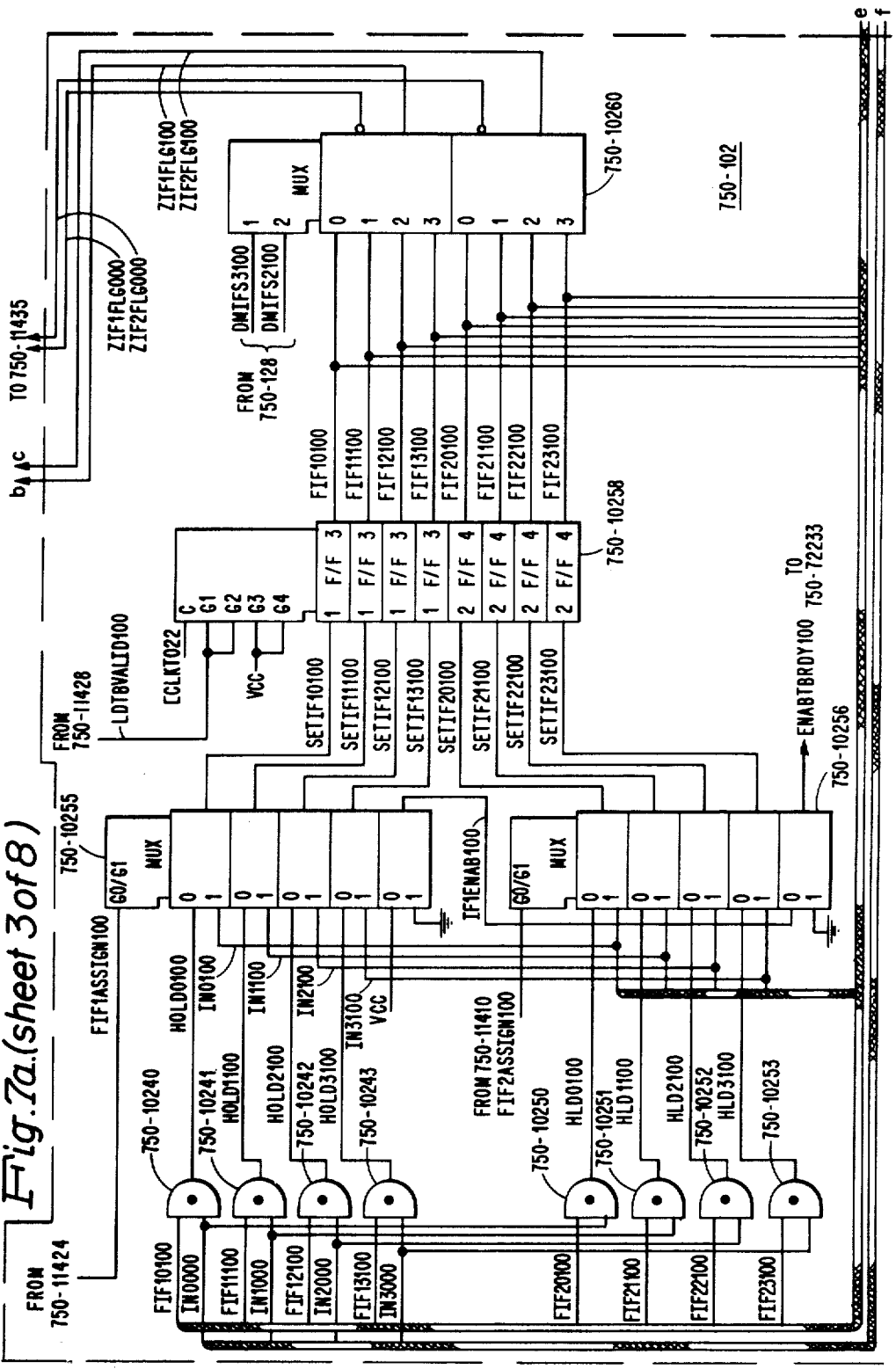
Fig.7a (sheet 3 of 8)

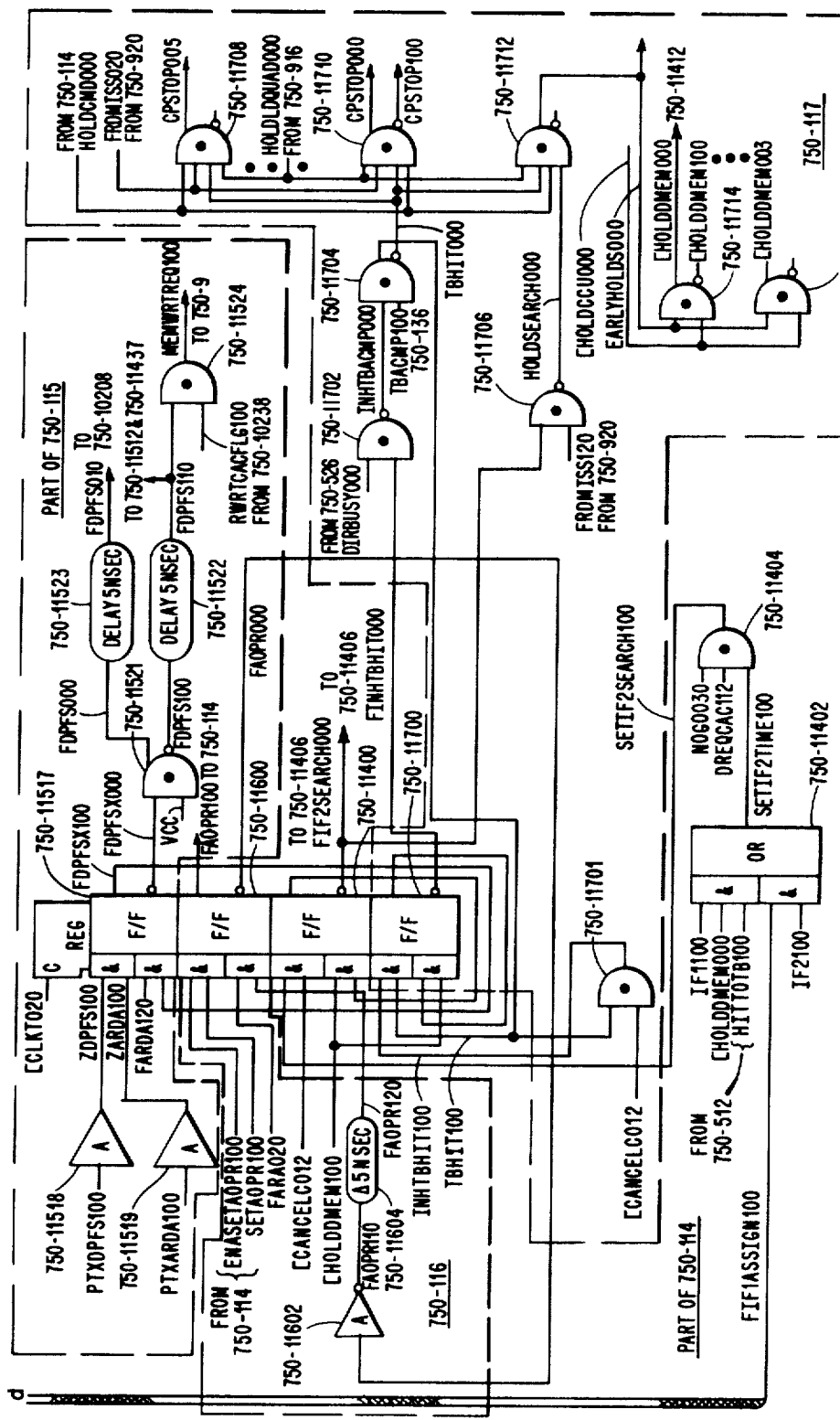
Fig. 7a. (sheet 4 of 8)

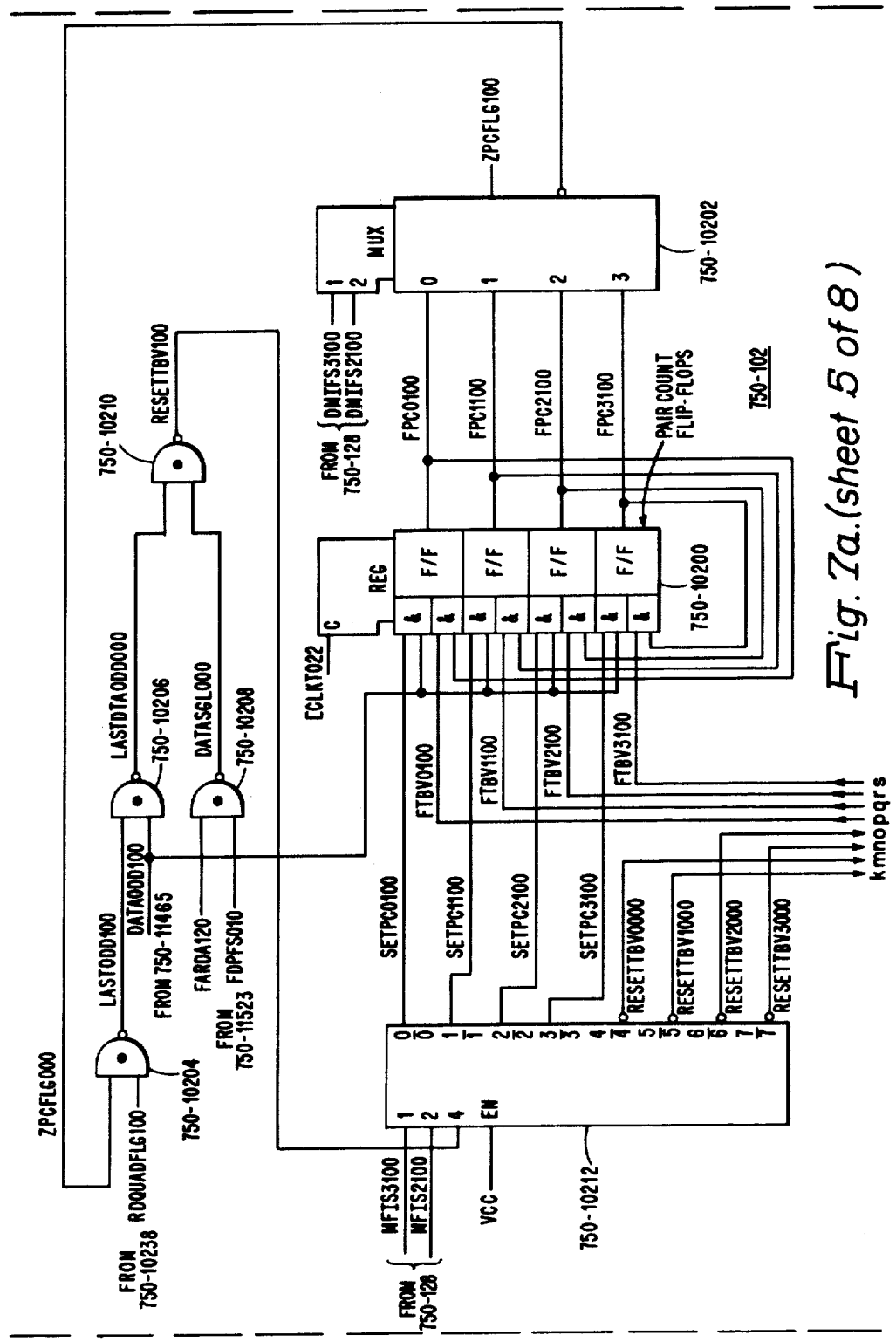
Fig. 7a.(sheet 5 of 8)

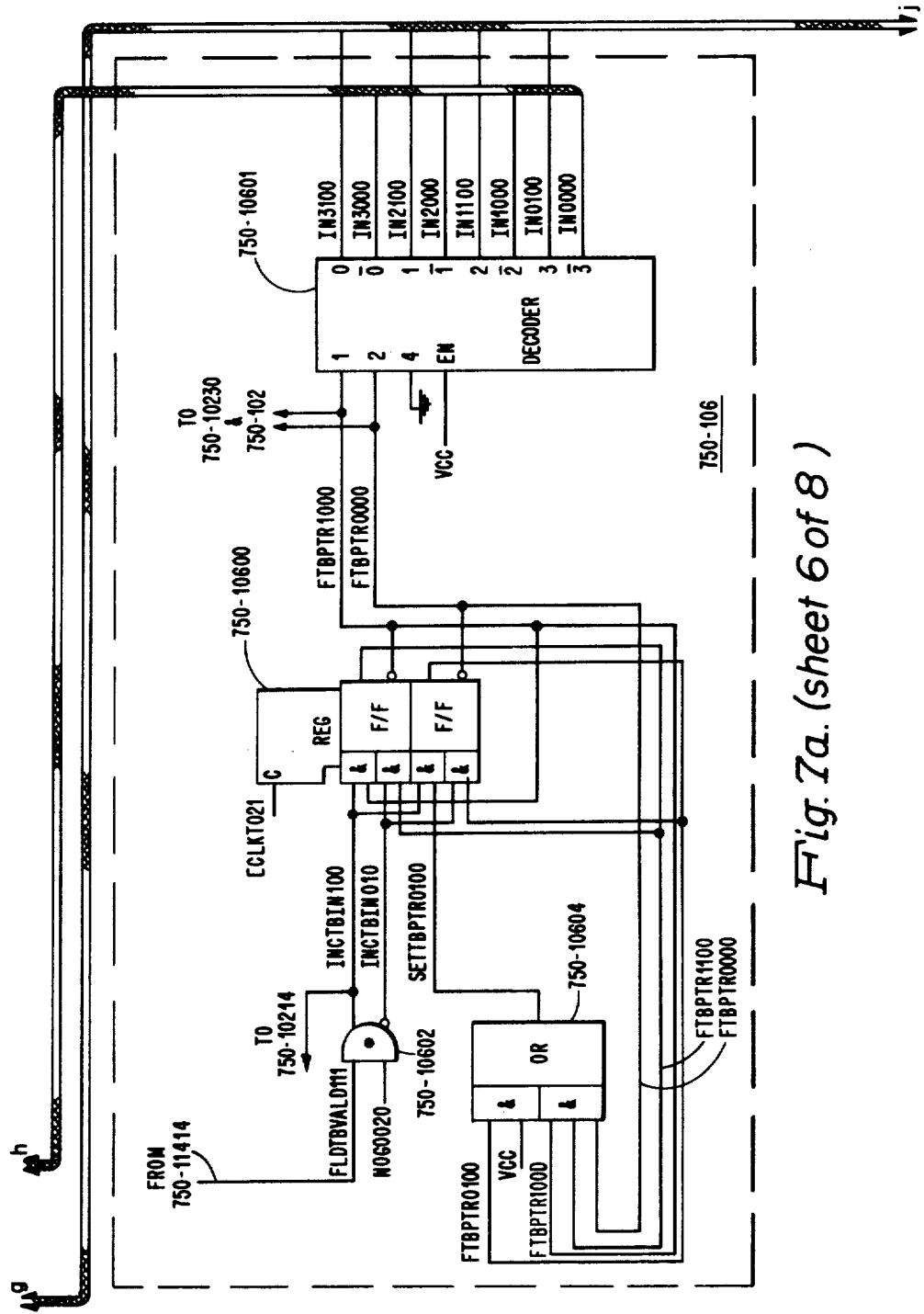
Fig. 7a. (sheet 6 of 8)

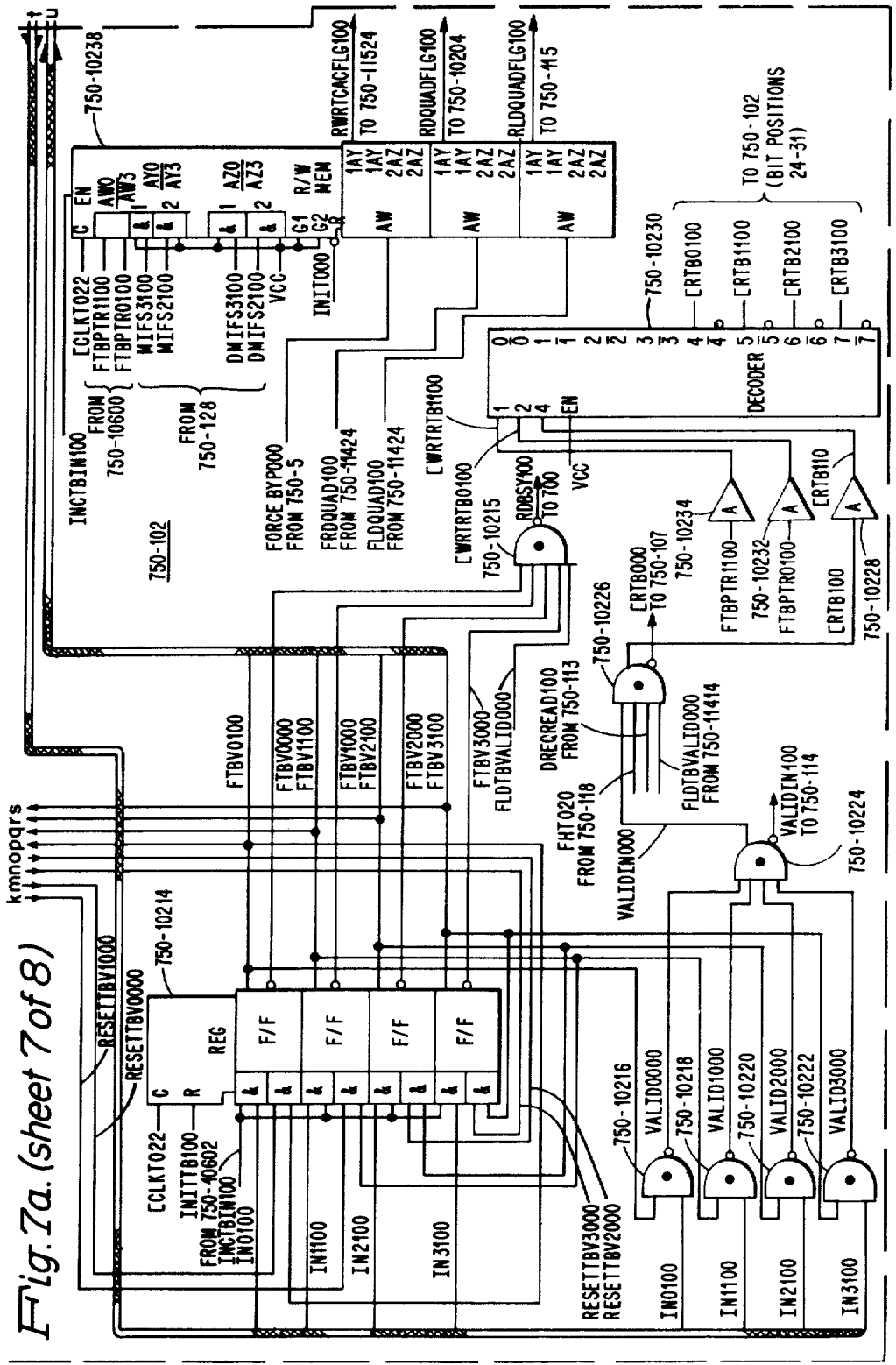
Fig.7a.(sheet 7 of 8)

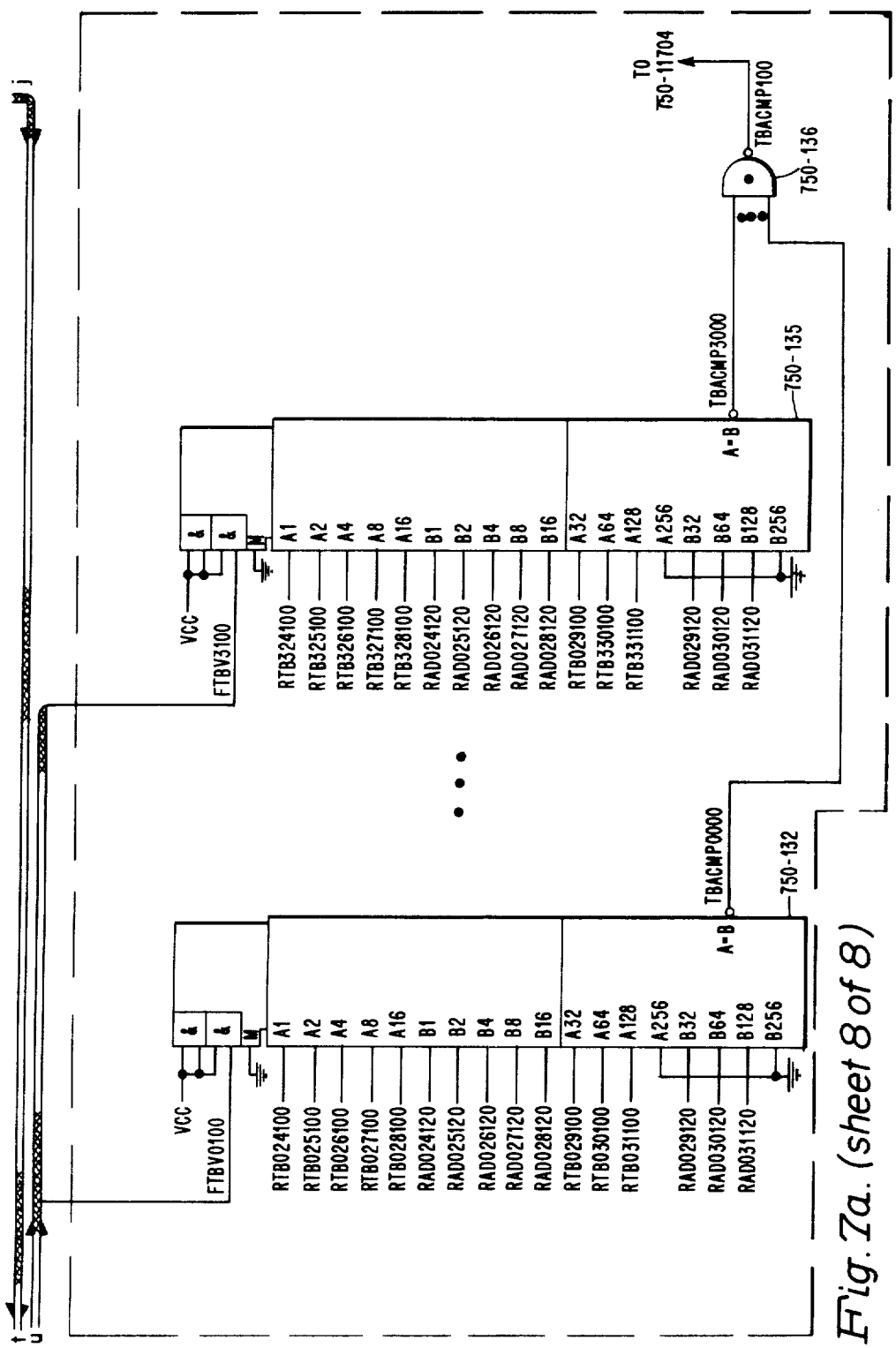
Fig. 7a. (sheet 8 of 8)

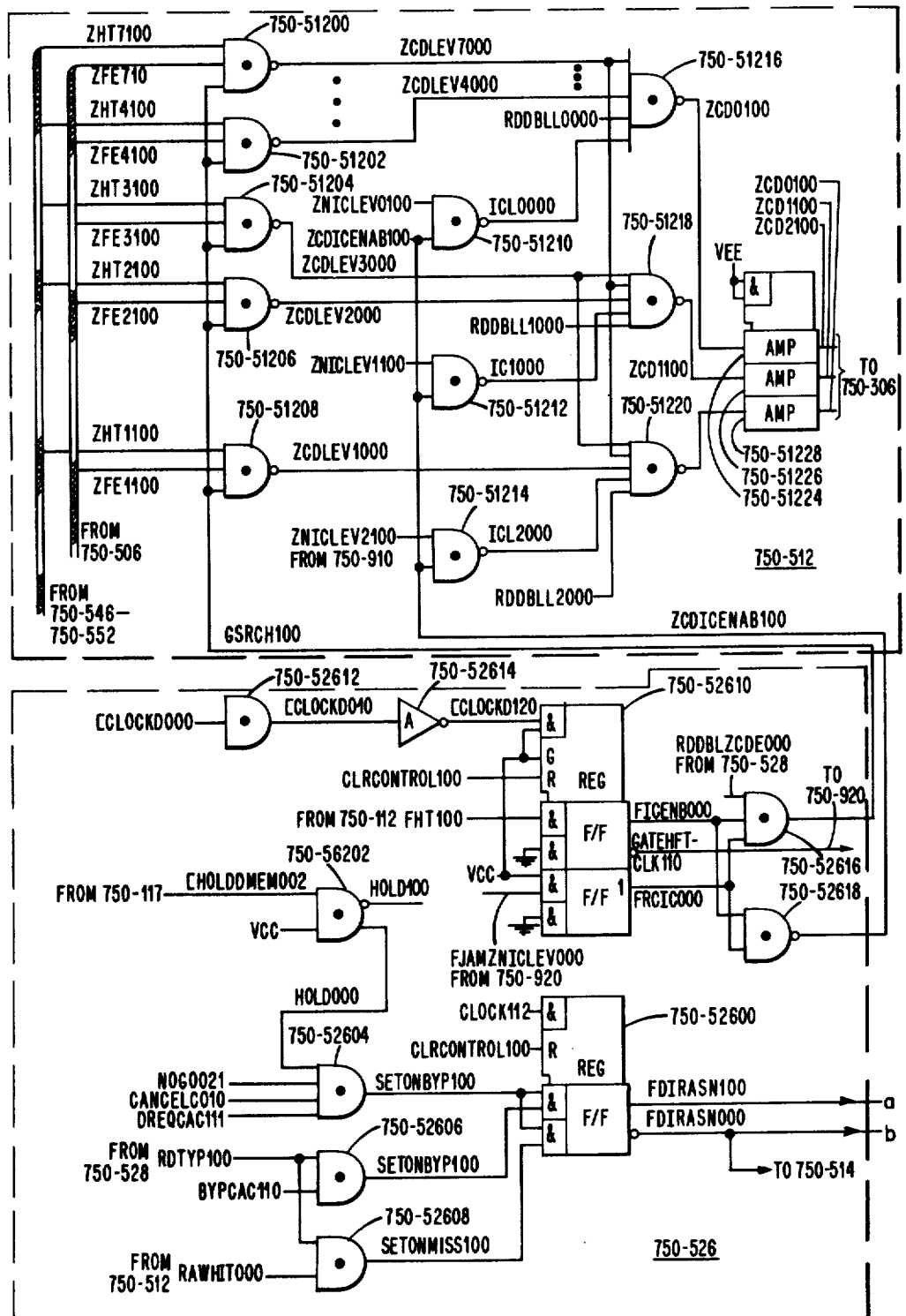
Fig. 7c. (sheet 1 of 3)

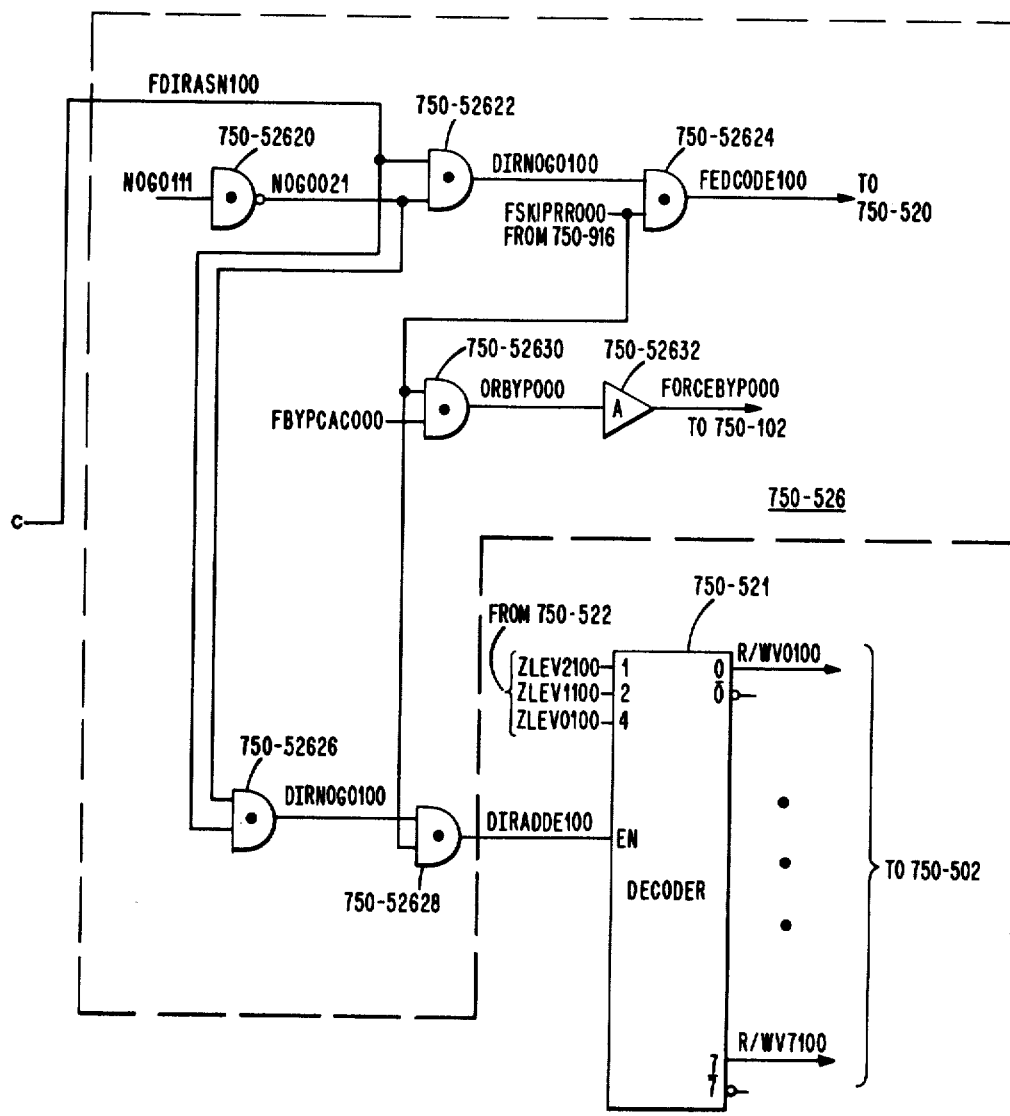
Fig. 7c. (sheet 3 of 3)

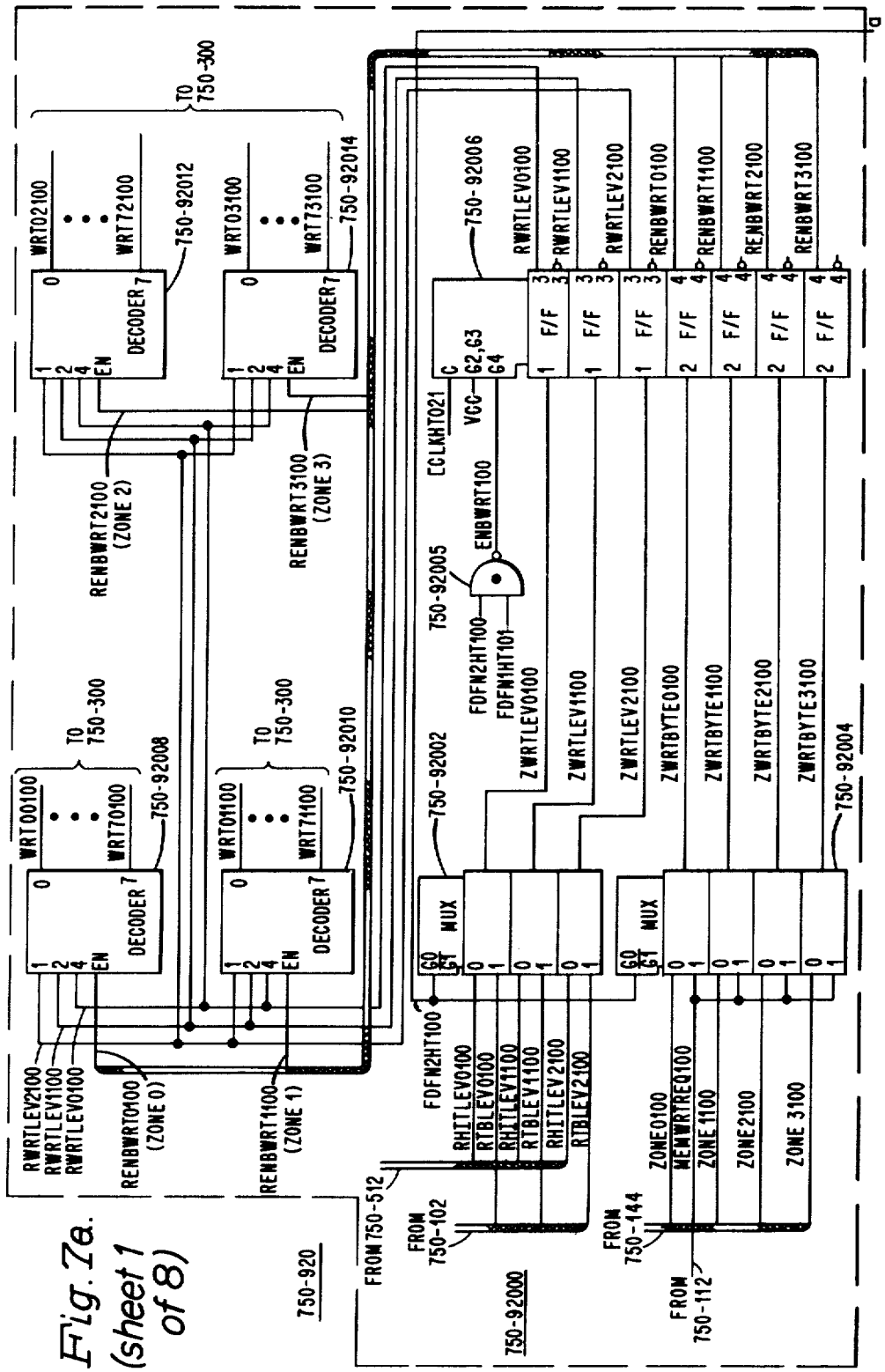
Fig. 7a. (sheet 1 of 8)

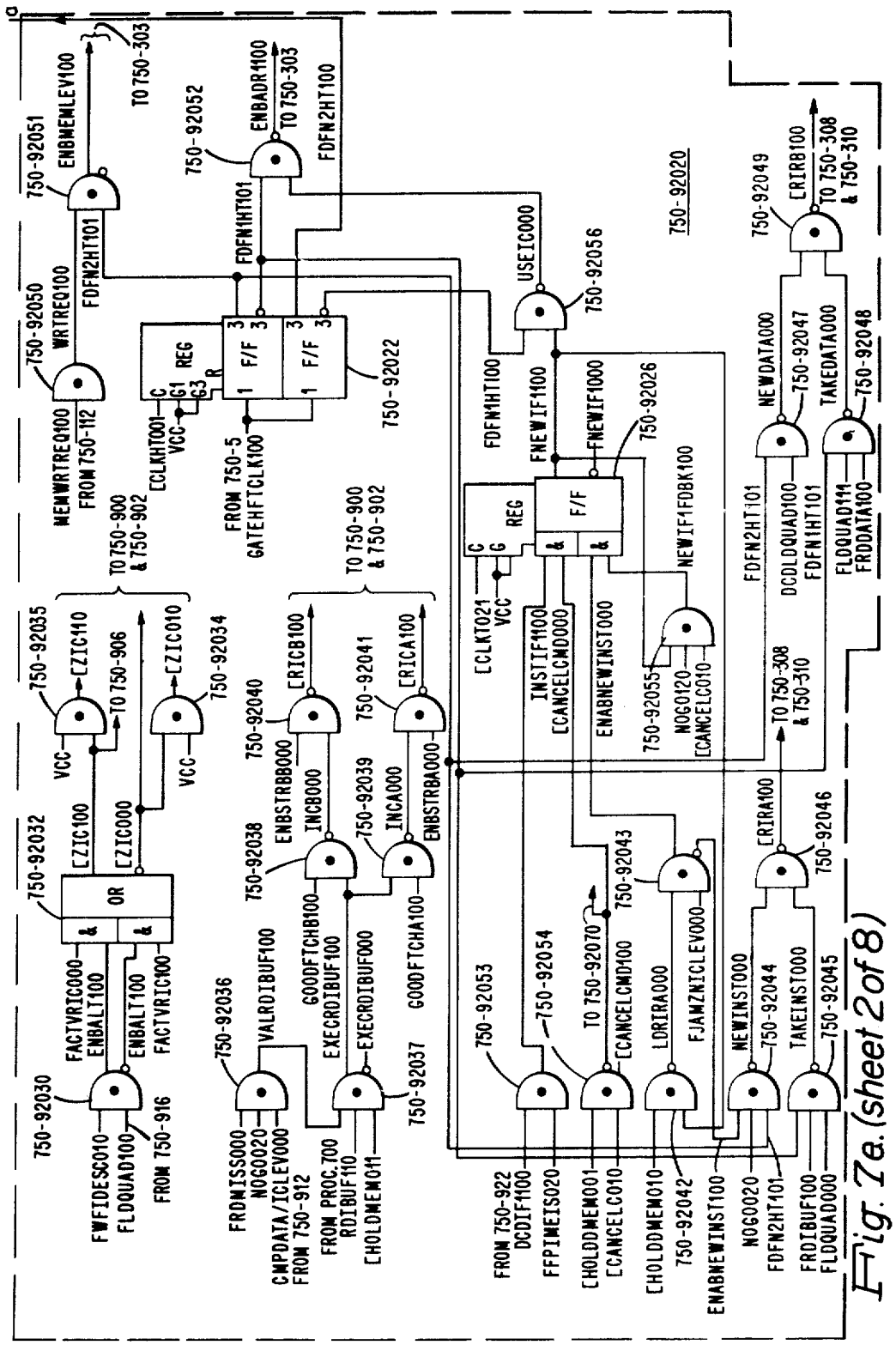
Fig. 7e. (sheet 2 of 8)

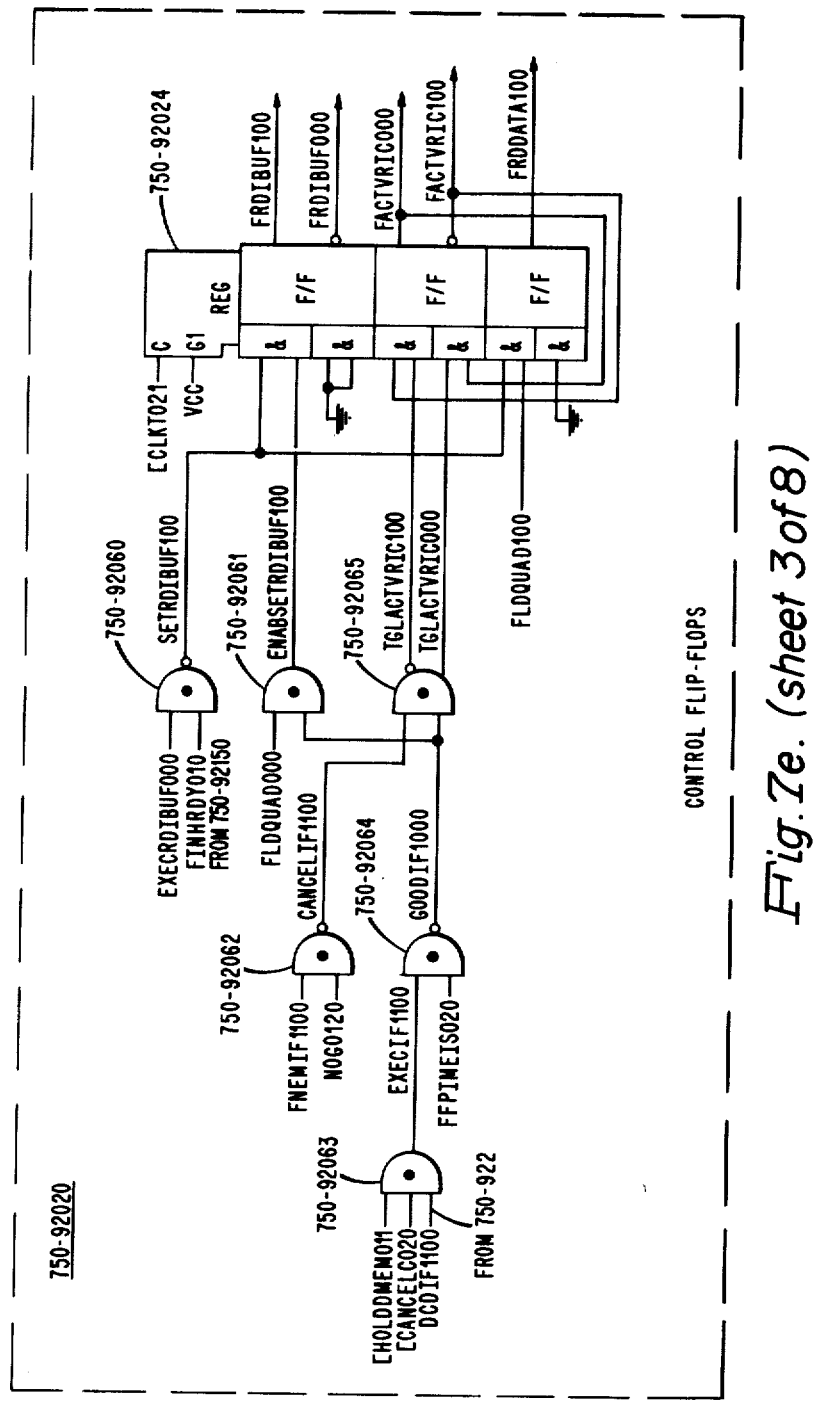
Fig.7e. (sheet 3 of 8)

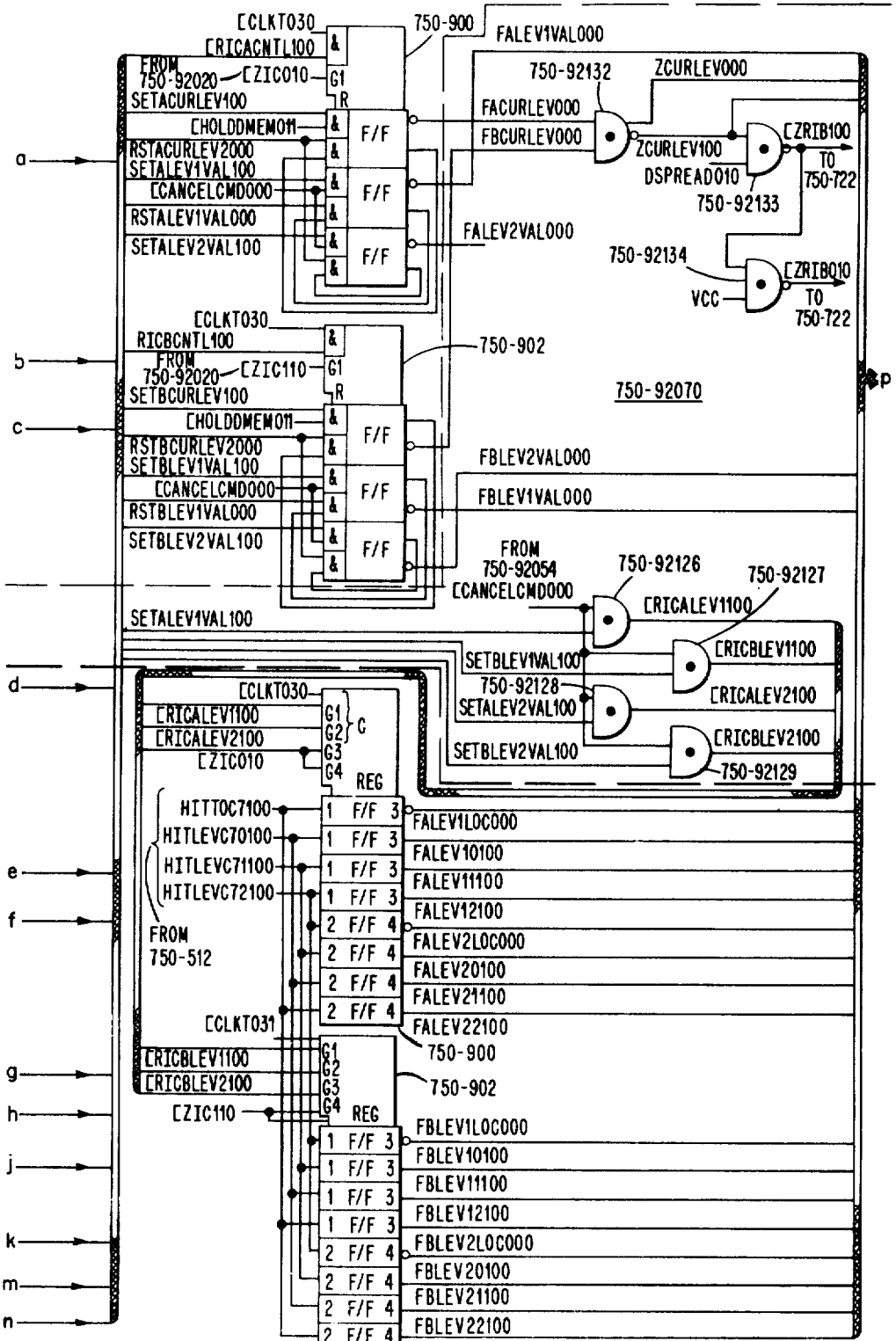
Fig. 7a.(sheet 5 of 8)

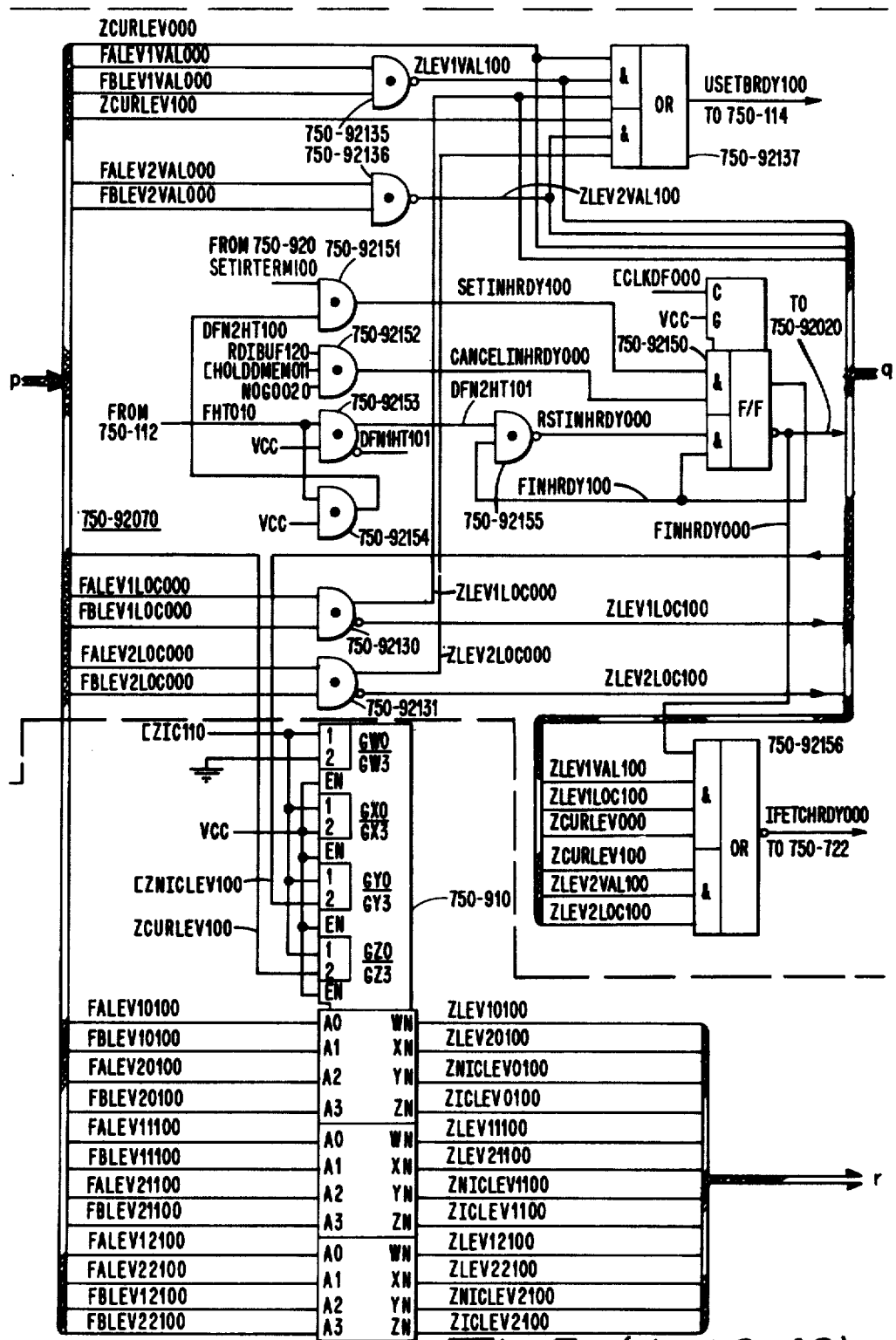
Fig. 7a. (sheet 6 of 8)

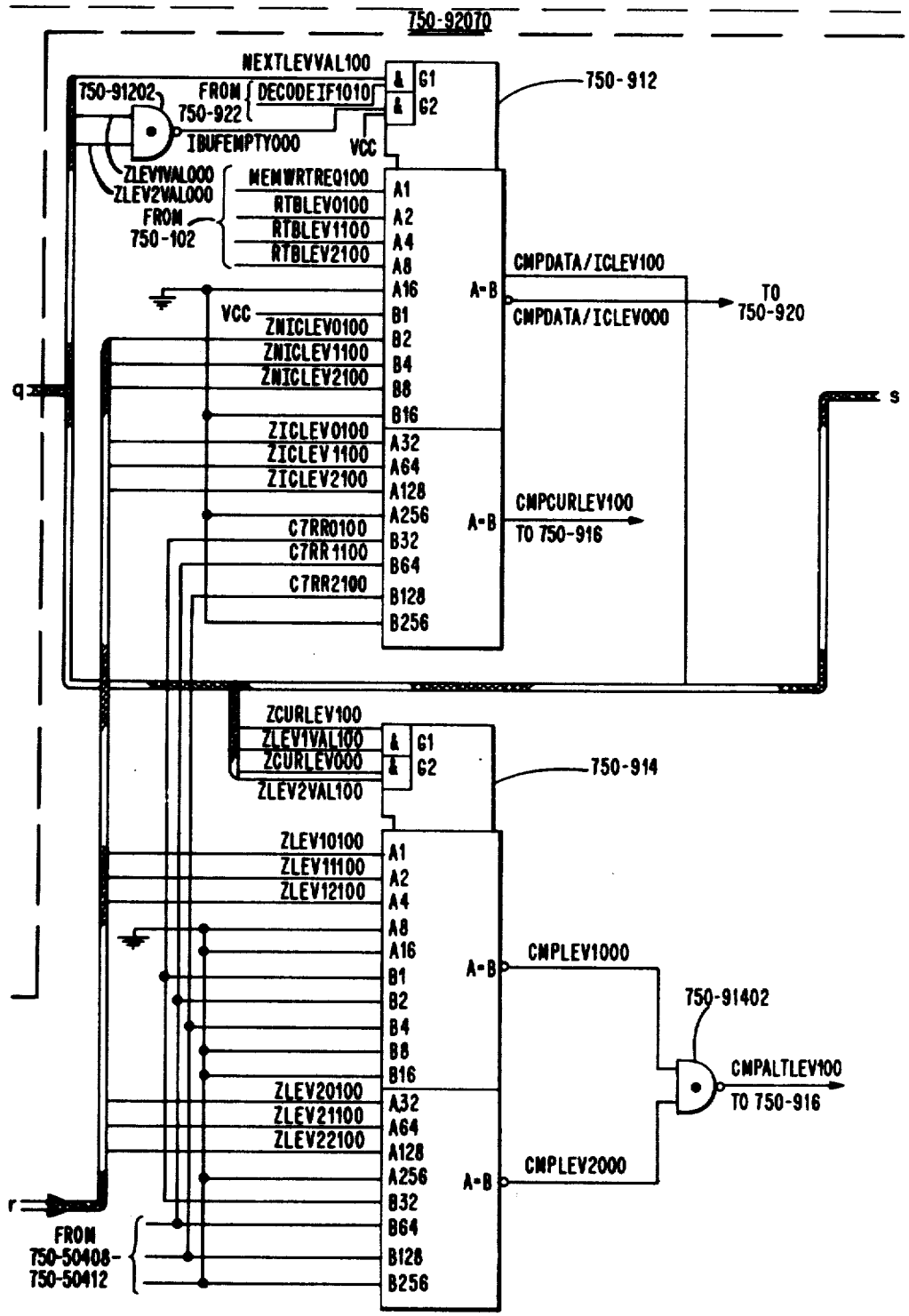
Fig. 7e. (sheet 7 of 8)

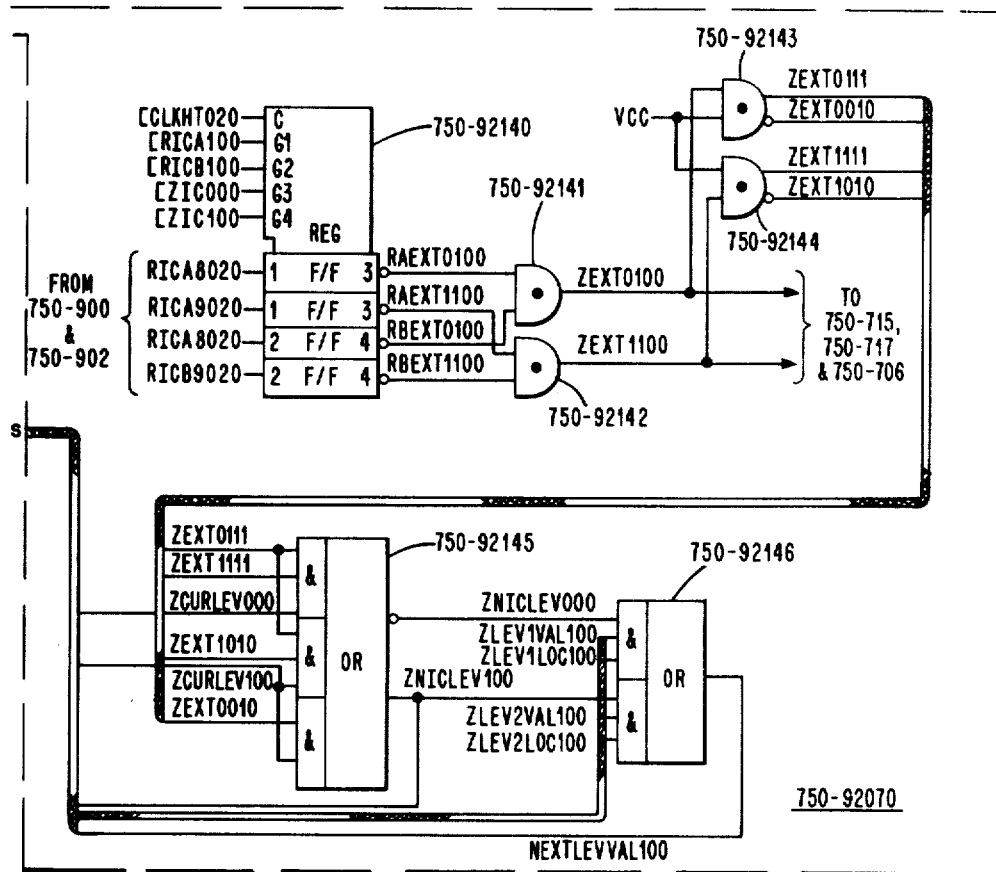
Fig. 7a. (sheet 8 of 8)

CACHE UNIT WITH TRANSIT BLOCK BUFFER APPARATUS

REFERENCED APPLICATIONS

1. "Cache Unit Information Replacement Apparatus" invented by Marion G. Porter, Robert W. Norman, Jr. and Charles P. Ryan, Ser. No. 968,048, filed on Dec. 11, 1978 and assigned to the same assignee as named herein.
2. "Instruction Buffer Apparatus of a Cache Unit" invented by Marion G. Porter and Robert W. Norman, Jr., Ser. No. 968,050, filed on Dec. 11, 1978 and assigned to the same assignee as named herein.
3. "A Cache Arrangement Utilizing A Split Cycle Mode of Operation" invented by Marion G. Porter, Robert W. Norman, Jr. and William A. Shelly, Ser. No. 968,312, filed on Dec. 11, 1978 and assigned to the same assignee as named herein.
4. A Cache Arrangement for Performing Simultaneous Read/Write Operations" invented by Marion G. Porter, William A. Shelly and Robert W. Norman, Jr., Ser. No. 968,521, filed on Dec. 11, 1978 and assigned to the same assignee as named herein.
5. "Cache Apparatus for Enabling Overlap of Instruction Fetch Operations" invented by Marion G. Porter and Charles P. Ryan, Ser. No. 969,049, filed on Dec. 11, 1978 and assigned to the same assignee as named herein.
6. "Command Queue Apparatus Included Within a Cache Unit for Facilitating Command Sequencing" invented by Marion G. Porter, Ser. No. 968,311, filed on Dec. 11, 1978 and assigned to the same assignee as named herein.
7. "Buffer Store Including Control Apparatus Which Facilitates the Concurrent Processing of a Plurality of Commands" invented by Charles P. Ryan, Ser. No. 853,982, filed on Nov. 22, 1977 and assigned to the same assignee as named herein.

BACKGROUND OF THE INVENTION

1. Field of Use

This present invention relates to data processing systems having a memory hierarchy which includes a high speed buffer store or cache unit.

2. Prior Art

It is well known that many data processing systems each include a main memory or main store and high speed low capacity buffer store or cache, each of which is positioned between the system's data processing unit and its main memory. In such systems, an associative memory normally is used to store the block addresses for indicating which blocks are stored or reside in the cache or buffer store. When a fetch or read request occurs, the associative memory is interrogated to determine whether the block containing the addressed word resides in cache. If not, the word together with associated words of a block are fetched from main store and read into cache or buffer store.

Generally recognized are the cost advantages of having the cache or buffer store contain a limited number of blocks to minimize the size of associative memory. However, others have recognized certain disadvantages resulting from such storage limitations in the case of block transfers. In overcoming such disadvantages, one high speed memory system provides a high degree of overlap or concurrency wherein additional accesses to the memory system may be executed after a block transfer has been initiated. U.S. Pat. No. 3,588,829 is an example of one such system.

In providing such overlap, it is possible to receive more than one request specifying fetching data from the same block. To avoid the generation of multiple commands to main memory or backing store, additional comparison circuits or associative memory circuits together with a multiplicity of control bits are included to detect conflicting requests with respect to certain types of commands. Also, the arrangement includes control sequencing circuits which are also responsive to certain control bits to establish the manner in which commands are to be sequenced. During additional cycles, comparisons are made and the results are stored to be used to control the fetching of commands. Such arrangements have found to result in increased cost and complexity. Moreover, such arrangements are unable to process a variety of different types of commands which give rise to increases of overlap. Also, the setting and resetting of various control bits for command sequencing involving establishing necessary priorities have been found to be time consuming.

Another prior art cache unit included a control directory including a plurality of multibit locations corresponding in number to the number of blocks. One of the bit locations identified by a memory command was set to a predetermined state. This occured when the command called for an operation which could not be completed immediately but which remained outstanding for a certain minimum length of time.

During the processing of subsequently received commands, the contents of the control directory are accessed. When a next memory command is received which specifies information requested by previous commands and the contents of control directory bit location indicate whether the operation which has been initiated is still pending or outstanding. When the contents indicate that the operation is outstanding, the control circuits signal the processor to stop its operation in the case where the information requested is needed immediately. When all of the information required to complete the pending operation has been stored in the cache unit, the control sequencing circuits automatically reexecute such next command and enable processor to continue operation.

By referencing the contents of the control directory during the normal command processing, the system is able to detect the presence of conflicting commands and prevent the issuance of duplicate commands.

For further information regarding this arrangement, reference may be made to the copending patent application "Buffer Store Including Control Apparatus Which Facilitates the Concurrent Processing of a Plurality of Commands", invented by Charles P. Ryan, bearing Ser. No. 853,982, filed on Nov. 22, 1977.

In the above prior art arrangement, processor operation was stopped or held up in the case of conflicting read commands. However, with respect to write commands, the processing of such write commands was held up until the execution of all outstanding read commands had been completed. While the arrangement prevented the issuance of duplicate commands, the processing of certain types of commands, such as write commands, was delayed. This could result in decreased processing efficiency.

Accordingly, it is a primary object of the present invention to provide a buffer store or cache arrangement which permits a high degree of overlap with minimal increases in cost and complexity.

It is a further object of the present invention to provide a low cost buffer store or cache capable of executing all types of memory commands without requiring the issuance of duplicate commands with minimum delay in processing.

SUMMARY OF THE INVENTION

The above objects of the present invention are achieved in a preferred embodiment of a cache unit which couples to a data processing unit and to a main store.

The cache unit includes a cache store organized into a number of levels, each for storing a number of blocks of information in the form of data and instructions. Directory circuits store address information for indicating which blocks of information reside in the cache store.

The cache unit further includes control apparatus and a transit block buffer comprising a plurality of locations of a section for storing read commands, each including an address. Another transit block buffer section includes a plurality of registers, each for storing a portion of the read command address. This corresponds to a block address in the preferred embodiment. A corresponding number of valid bit indicator storage elements are included, each of which is set to a binary ONE state when a read command is loaded into the transit buffer location associated therewith.

Comparison circuits, connected to be enabled for operation by the valid bit indicator storage elements, compare the block address of each read command address stored in the register section of the transit block buffer with a corresponding portion of each read or write command address received from the processing unit prior to the acceptance thereof. When there is a conflict between commands, the comparison circuits generate an output signal. This signal conditions hold circuits included within the control apparatus to hold or stop further processing of the processing unit command by the cache unit and the operation of the processing unit. Holding lasts until the valid bit indicator storage element associated with the location storing the outstanding read command causing the conflict is reset to a binary ZERO indicating the execution of the read command has been completed.

The above inhibits the comparison circuits from generating the output signal thereby preventing further holding. At that time, the read/write command is accepted by the cache unit. That is, in the preferred embodiment, when the received command is a read command, it is loaded into a next available location within the transit block buffer. A write command is loaded into one of the locations of a write command buffer. Depending upon the type of command single or double precision, one or two data words received from the processing unit are loaded into successive locations of the write command buffer. After the loading thereof, the cache unit transfers the memory command to main store.

The above arrangement, by determining ahead of time all conflicts an resolving any conflict by holding up further processing of the command received from the processing unit until the conflict is no longer present, eliminates the necessity to generate control linking information specifying the sequence in which the commands are to be processed. This reduces complexity and attendant time delays. It will be noted that the hold control circuits are used to process both read and write types of commands. Hence, this further reduces the amount of circuits.

By comparing the addresses of the commands as soon as the command is forwarded to the cache unit by the processing unit, the conflict is established at the earliest possible time. This time corresponds to the cycle during which the directory is performing a search operation. Accordingly, in the case of a conflict, the search operation is repeated until the compare condition is no longer present. This, in turn, simplifies cache operation as well as reducing complexity.

Additionally, the arrangement of the present invention makes it possible to prevent the processing unit from generating commands required for processing interrupts or fault conditions when there are outstanding read commands as indicated by the contents of the valid bit indicator storage. Also, the arrangement provides circuits which prevent the holding or stopping of the processing unit's operation in situations when the command applied by the processing unit is cancelled.

The novel features which are believed to be characteristic of the invention, both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIG. 2 shows in block diagram form the host processor 700 and the cache unit 750 of FIG. 1.

FIGS. 3a through 3e show in greater detail, certain ones of blocks of FIG. 2.

FIG. 4 shows in block diagram form the cache unit 750 of FIG. 2.

FIGS. 7a through 7e show in greater detail, different ones of the sections of cache unit 750.

DESCRIPTION OF THE PREFERRED EMBODIMENT

General Description

Figure 1:
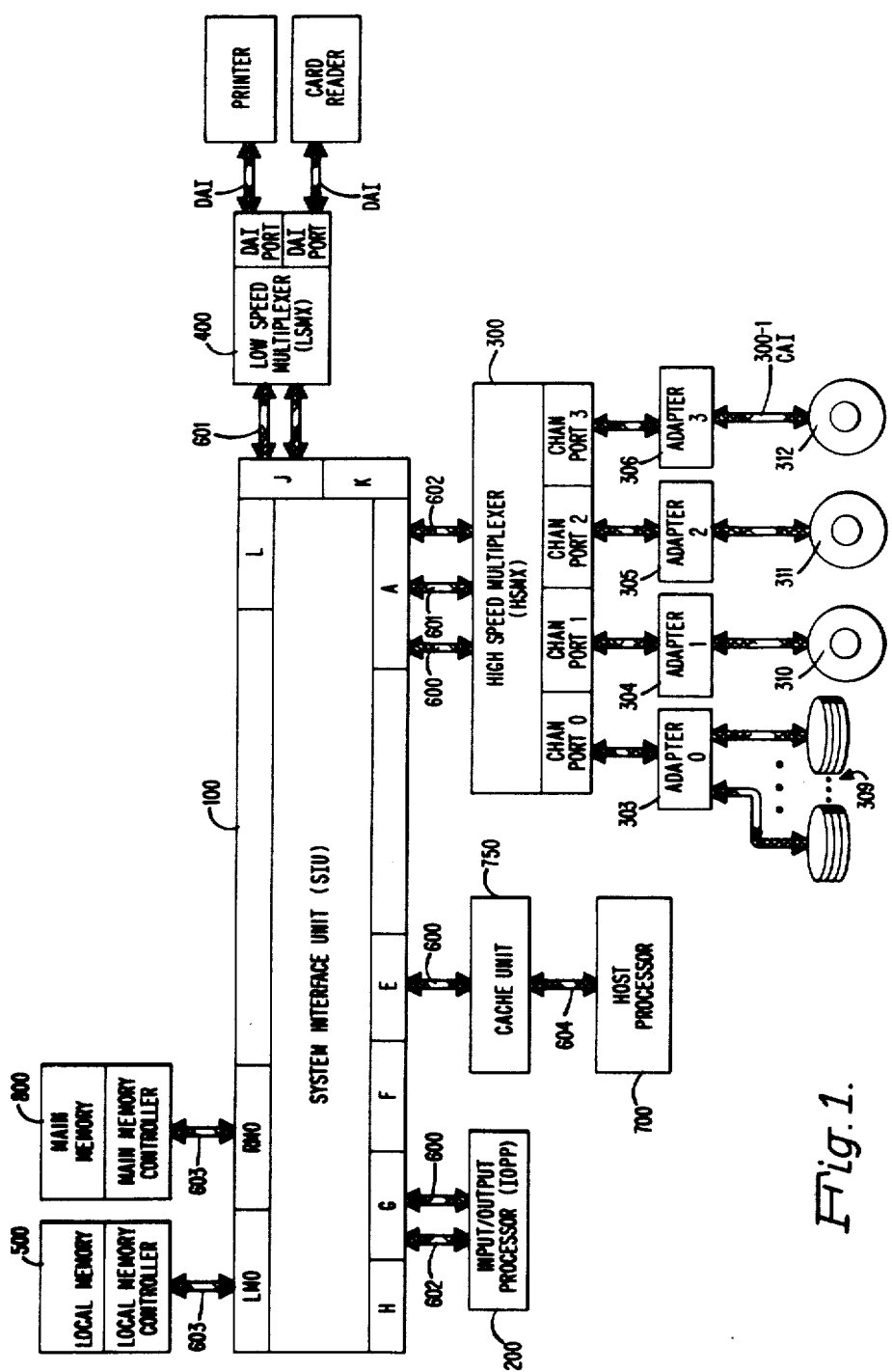
FIG. 1 illustrates in block form a system employing the principles of the present invention.

As seen from FIG. 1, the system which incorporates the principles of the present invention includes at least 1 input/output processor (IOPP) 200, a system interface unit (SIU) 100, a high-speed multiplexer (HSMX) 300, a low-speed multiplexer (LXMX) 400, a host processor 700, a cache memory 750, at least one memory module corresponding to a local memory module 500, and at least one memory module corresponding to a memory module 800. Different ones of these modules connect to one of a number of ports of the system interface unit 100 through a plurality of lines of different types of interfaces 600 through 604. More specifically, the input/output processor 200, the cache memory 750, and the high-speed multiplexer 300 connect to ports G, E and A, respectively, while the low-speed multiplexer 400, local memory module 500, and main memory module 800 connect to ports J, LM0 and RM0, respectively. The host processor 700 connects to the cache memory 750.

System Interfaces

Before describing in detail the processor 700 and cache unit 750, constructed in accordance with principles of the present invention, each of the interfaces 600 through 604 discussed previously will not be described.

The data interface 600 which is one of the interfaces which provides for exchange of information between an active module and system interface unit 100. Exchange is accomplished by controlling the logical states of various signal lines in accordance with preestablished rules implemented through a sequence of signals termed a "dialog".

The interface 601 is a programmable interface which provides for transfer of command information from an active module and a designated module. The transfer is accomplished by controlling the logic of states of the various signal lines in accordance with pre-established rules implemented through a sequence of signals termed a "dialog".

A further interface is the interrupt interface 602 which provides for interrupt processing by the input-/output processor 200. That is, the interface enables the transfer of interrupt information by an active module to the SIU 100 to the input/output processor 200 for processing. Similar to the other interfaces, the transfer of interrupt requests is accomplished by controlling the logical states of the various signal lines in accordance with pre-established rules implemented through a sequence of signals termed a "dialog".

A next set of interface lines utilized by certain ones of the modules of FIG. 1 corresponds to the local memory interface 603. This interface provides for exchanging information between local memory 500 and the modules of the system. The exchange is accomplished by controlling logical states of the various signal interface lines in accordance with pre-established rules implemented through a dialog sequence of signals.

Memory and programmable interface commands are transferred out of the same physical data lines of the interface. The interface does not include a set of lines for processing interrupt requests and therefore the modules connected to the local memory by the SIU 100 cannot directly cause a memory interrupt.

For a more detailed description of the elements of FIG. 1 and each of the interfaces 600 through 603, reference may be made to U.S. Pat. No. 4,006,466.

Figure 5:
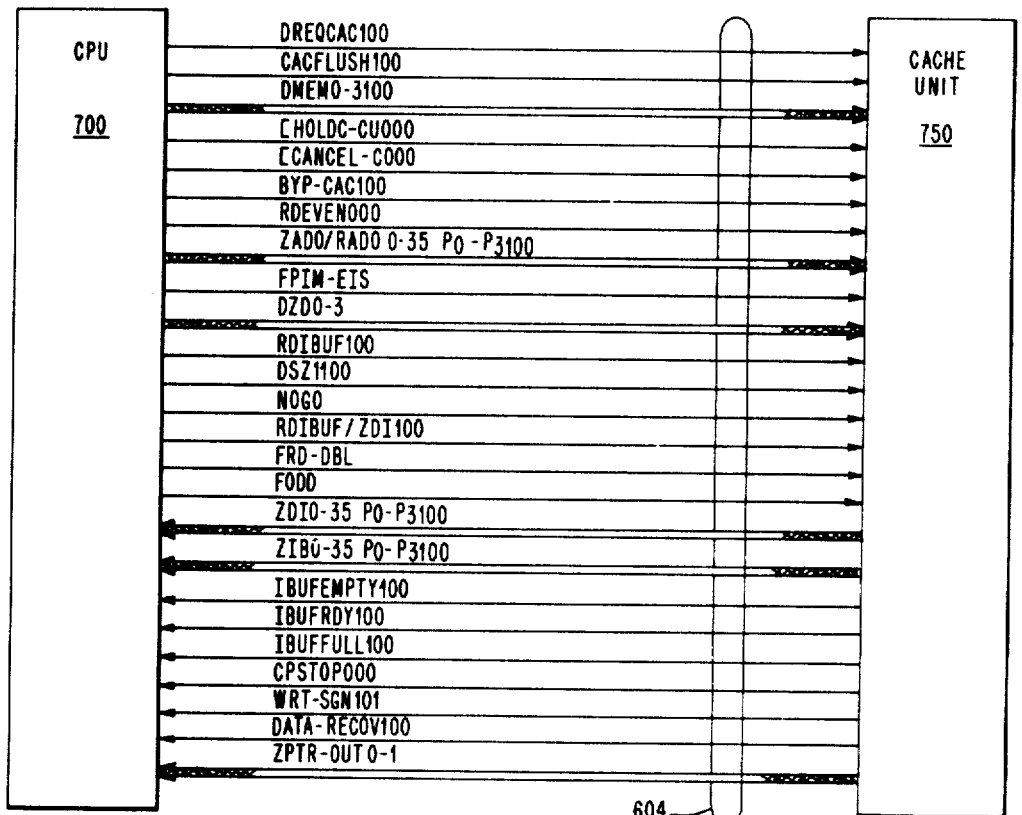
FIG. 5 shows in greater detail, the cache processor interface 604.

The last interface 604 is an internal interface between the cache unit 750 and central processor 700 which corresponds to the cache/CPU interface lines of FIG. 5. This interface provides for exchanging information and control signals between the processor 700 and the cache unit 750. The exchange is accomplished by controlling the logical states of the various signal interface lines. The cache/CPU interface includes a plurality of data to processor lines (ZDI 0-35, P0-P3), a plurality of ZAC and write data lines (ZAD0 0-23, RAD0 24-35, P0-P3), a processor request signal line (DREQ-CAC), a plurality of cache command lines (DMEM-0-3), a hold cache line (HOLD-C-CU), a cancel line (CANCEL-C), a flush line (CAC-FLUSH), a read word line (RD-EVEN), a read instruction buffer line (RD-IBUF), a read double (FRD-DBLE), and odd line (FODD), a plurality of instruction lines (ZIB0-35, P0-P3), a control line (DSZ), a read I-buffer data line (RD-IBUF/ZDI), a plurality of zone bit lines (DZD 0-3), a bypass cache line (BYP-CAC), a write signal line (WRT-SGN), an instruction buffer empty line (IBUF-EMPTY), an instruction buffer ready line (IBUF-RDY), an instruction buffer full line (IBUF-FULL), a CP stop line (CP-STOP), a CP control line (DATA-RECOV), a descriptor control line (FPIM-EIS), a transfer no-go line (NO-GO) and a plurality of word address lines (ZPTROUT0-1).

Instructions, cache commands and data are forwarded to the cache unit 750 via different ones of these lines. Additionally, the operation of the processor 700 is enabled or disabled by certain ones of these lines as explained herein. The description of the CPU/cache interface lines are given in greater detail herein.

| CPU/CACHE INTERFACE LINES | |
|---|---|
| Designation | Description |
| DREQ-CAC | This line extends from processor 700 to cache unit 750. When the DREQ-CAC line is set to a binary ONE, a ZAC command is transferred to cache 750. In the case of a write ZAC command, write data words are transferred in the one or two cycles following the ZAC command and data words are sent from the processor 700 through the cache 750 without modification, to the SIU 100. |
| DMEN 0,1,2,3 | These lines extend from the processor 700 to cache 750. These lines are coded to designate the command that the cache 750 is to exucute. The coding is as follows: DMEN=0000 no op No action is taken and no cache request is generated. DMEM=0001 Direct The direct command enables the processor 700 to perform a direct transfer of an operand value without action on the part of the cache 750. Hence, no cache request is generated by this type of command. DMEM=0010 - Address Wraparound Command (ADD-WRAP) The address wraparound command is executed to return the command given to cache 750 by processor 700. On the same cycle, the command is given to processor 700 via the ZDI lines 0-35. DMEM=0100 - Load Instruction Buffer Instruction Fetch 1 (LD-IBUF-IF1) The load instruction buffer command is used to load the address of the next block of instructions into the alternate instruction register RICA/RICB. There are three possible sequences of operation for this command. 1. In the case of a cache hit when the cache 750 is not being by-passed, the block address and level stored in the cache 750 are loaded into the alternate instruction register. A cache access is made to fetch the desired instruction which is transferred to processor 700 via the ZDI lines 0-35 on the subsequent T clock pulse. The alternate instruction register now becomes the current instruction register. 2. In the case of a cache miss when the cache 750 is not being bypassed, the block address and the level |

| CPU/CACHE INTERFACE LINES | |
|---|---|
| Designation | Description |
| | designated by the round robin circuits are loaded into the alternate instruction register. The processor is turned off or held on the subsequent T clock pulse to determine whether the generation of the IF1 command is in response to a transfer instruction. If it is and the transfer is a NO-GO, the current instruction register is used to access the next instruction and the processor 700 is turned on. If the IF1 command is caused by a transfer instruction which is a GO, then cache 750 sends a memory request to SIU 100 for the desired block of instructions and a directory assignment is made for the missing block. The instructions received from memory are first written into the instruction buffer and then into cache. The requested instruction is transferred to processor 700 via the ZDI lines and the processor 700 is turned on or released on the subsequent T clock pulse. The remaining instructions of the block are transferred to processor 700 from the instruction buffer via the ZIB lines.<br>3. When the cache is to be bypassed and there is a hit, the full-empty bit for that block is reset. All other operations are the same as in the cache miss case, except that no directory assignment is made and the block is not written into cache.<br>DMEM=0101 - Load Instruction Buffer Instruction Fetch 2 (LD-IBUF-IF2) The load instruction buffer command is used to load the level of the second block of the instructions into the current instruction register. The processor 700 is not turned off in the case of a miss condition. There are also three possible sequences of operation for this command.<br>1. In the case of a cache hit condition and no bypass, the level of the second block of instructions is loaded into the current instruction register.<br>2. In the case of a cache miss condition and no bypass, when the IF1 command was found to be the result of a transfer instruction NO-GO condition, the If1 operation is cancelled. In the case of other than a NO-GO condition, a directory assignment is made for the second block of instructions and the level obtained from the round robin circuits are written into the current instruction register. Cache 750 sends a memory request to memory for the block and when the instructions are received they are first written into the instruction buffer and later into cache 750. When the instructions are needed, they are read out from the instruction buffer and transferred to processor 700 via the ZIB lines 0-35.<br>3. In the case of a bypass, when there is a hit condition, the full-empty bit for that block is reset. |

| CPU/CACHE INTERFACE LINES | |
|---|---|
| Designation | Description |
| | All other operations are the same as in the case of a cache miss except that there is no directory assignment and the block is not written into cache 750.<br>DMEM=0110 - Load Quad The load quad command is used to load the block address for data (not instructions) into the alternate instruction register. It is similar to the IF2 except that the address and level (round robin circuits provide level when a cache miss condition) are written into the alternate instruction register. When the data is not in cache 750 and processor 700 requests it before it is received from memory, the processor 700 is held or stopped until the data is received.<br>DMEM=0111 - Pre-read (PR-RD) The pre-read command is used to load cache 750 with data which the processor 700 expects to use in the near future. The three possible sequences of operation are as follows:<br>1. For a cache hit and no bypass, the pre-read command is executed as a no-op.<br>2. For a cache miss and no bypass, the cache 750 generates a memory request for the block and a directory assignment is made for the missing block. When the data is received from memory, it is written into cache. The processor 700 is not held for this condition.<br>3. For a cache bypass, the pre-read command is treated as a no-op.<br>DMEM=1000 - Read Single (RD-SNG) The read single command is used to transfer a single data word to processor 700. There are four possible sequences of operation for this command.<br>1. In the case of a cache hit and no bypass, the addressed word is read from cache 750 and transferred to processor 700 on the next T clock pulse via the ZDI lines 0-35.<br>2. In the case of a cache miss and no bypass, the processor 700 is stopped and missing block is assigned in the directory. Cache 750 transfers the memoey request to main memory. The data words are written into cache as they are received. When the requested data word is received, processor 700 is turned on upon the occurrence of the subsequent T clock pulse.<br>3. In the case of a cache hit and bypass, the full-empty bit of the addressed block is reset and the processor 700 is turned off or held. The cache 750 transfers the request for one word to memory and the processor 700 is turned on upon the subsequent T clock pulse following receipt of the requested data word. The data word is not written into cache 750.<br>4. For a cache miss and bypass, the same operations take place as in the cache hit and bypass case with the exception that the full-empty bit of the addressed block is not changed. |

CPU/CACHE INTERFACE LINES

| Designation | Description |
|---|---|
| | DMEM = 1001 - Read Clear (RD-CLR)<br>The read clear command is used to transfer a data word from memory into processor 700 and also clear it out. There are two possible sequences of operation for this command.<br>1. For a cache hit, the full-empty bit for that block is reset and processor 700 is turned off. The cache 750 makes a memory request for one data word. The memory clears the location. When the word is received, the cache 750 transfers the word to processor 700 and turns on the processor 700 on the next T clock pulse. The word is not written into cache 750.<br>2. For a cache miss, the same operations take place as in the cache hit with the exception of no change in full-empty bits of the addressed block. |
| | DMEM = 1010 - Read Double (RD-DBL)<br>The read double command is used to transfer two data words to processor 700. There are two types of read double commands which differ in the order in which the data words are given to processor 700. When line DSZ1 is a binary ZERO, the order is odd word and even word. When line DSZ1 is a binary ONE, the order is even word and then odd word. There are four possible sequences of operation for this command.<br>1. For a cache hit and no bypass, the first word is transferred to processor 700 on the subsequent T clock pulse via the ZDI lines 0-35. On the next T clock pulse, the second data word is transferred to processor 700 via the ZDI lines 0-35.<br>2. For a cache miss and no bypass, the processor 700 is turned off and a directory assignment is made for the block containing the addressed word pair. The cache 750 transfers the memory request to SIU 100 for the block. As the data words are received they are written into cache. When the requested word pair is available, the first word is transferred to processor 700 and it is turned on or released on the subsequent T clock pulse. The cache 750 transfers the second word to processor 700 on the next T clock pulse.<br>3. For a cache hit and bypass, the full-empty bit of the addressed block is reset and processor 700 is turned off. The cache 750 transfers the request to memory for two data words. As soon as the two words are available, the processor 700 is turned on and the first data word is transferred to it on the subsequent T clock pulse. The processor 700 receives the second data word on the next T clock pulse. The data words are written into cache.<br>4. For a cache miss and bypass, the same operations take place as in the case of the cache hit and bypass, except that there is no change in full-empty bits.<br>DMEM = 1011 - Read Remote (RD-RMT) |
| | The read remote is used to circumvent normal cache read actions. When the command is received, processor 700 is turned off and the request is transferred to the main memory. When the requested word pair has been fetched from memory, the first word is given to processor 700 and it is turned on the subsequent T clock pulse. The second data word is transferred to processor 700 on the next T clock pulse. The order in which the data words are transferred is even word and then odd word. No changes are made within cache 750. |
| | DMEM = 1100 - Write Single (WRT-SNG)<br>The write single command is used to write data into memory. There are two possible sequences of operation for this command.<br>1. For a cache hit, the cache 750 transfers the request to memory. When it is accepted the data word is transferred to memory. The data word is also written into cache 750.<br>2. For a cache miss, the same operations take place as the cache hit except that no change is made to the cache 750. |
| | DMEM = 1110 - Write Double (WRT-DBL)<br>The write double command is used to write two data words into memory. This command is carried out in a manner similar to the write single command except that two words are transferred/written rather than one word. |
| | DMEM = 1111 - Write Remote (WRT-RMT)<br>The write remote command is used to circumvent normal cache write actions in that when the addressed words are in cache 750, they are not updated. The cache 750 transfers the request to memory and when accepted, the two data words are transferred to memory. |
| HOLD-C-CU | This line extends from processor 700 to cache 750. When set to a binary ONE, this control signal specifies that the cache 750 is to assume a HOLD state for requests or data transfers. |
| CANCEL-C | This line extends from processor 700 to cache 750. When set to a binary ONE, this control signal indicates that the cache 750 should abort any processor command which is currently being executed. |
| CAC-FLUSH | This line extends from processor 700 to cache 750. When set to a binary ONE, it starts a flush of the cache 750 (i.e., the cache 750 is forced to look empty by resetting all of the full-empty bits). |
| RD-EVEN | This line extends from processor 700 to cache 750. When the cache makes a double word request to the SIU, the even word is saved in a special register (REVN). When RD-EVEN line is set to a binary ONE, the contents of the REVN register is gated onto the ZDI lines via the ZDIN switch. |
| ZAD0 0-23,<br>RAD0 24-35,<br>P0-P3 | These 40 unidirectional lines extend from processor 700 to cache 750. The lines are used to transfer ZAC commands and write data words to cache 750. When the DREQ CAC line is forced to |

-continued

CPU/CACHE INTERFACE LINES

| Designation | Description |
|---|---|
| | a binary ONE, ZAC command and in the case of a write type of command, the write data words are transferred during the one or two cycles following the ZAC command. The commands encoded onto the DMEM lines may or may not be the same as the ZAC command. |
| RD-IBUF | This line extends from the processor 700 to cache 750. When set to a binary ONE, the line indicates that processor 700 is taking the instruction from the instruction register RIRA. In most cases, it is used to start the fetching of the next instruction to be loaded into RIRA. |
| DZD 0-3 | These four lines extend from processor 700 to cache 750. These lines transfer odd word zone bit signals for write double commands. |
| BYP-CAC | This line extends from processor 700 to cache 750. when set to a binary ONE, this line causes the cache 750 to request data words from main memory for read type instructions. When a cache hit occurs, the block containing the requested data is removed from cache 750 by resetting the full-empty bit associated therewith. For write single or double commands, the data is written into cache 750 when a cache hit occurs. |
| WRT-SGN | This line extends from the cache 750 to processor 700. It is used to signal the processor 700 during write commands that the cache 750 has completed the transfer of ZAC commands and data words to the SIU 100. |
| FPIM-EIS | This line extends from processor 700 to cache 750. When forced to a binary ONE, it signals cache 750 that processor 700 is issuing an IF1 command for additional EIS descriptors. |
| DSZ1 | This line extends from the processor 750 to cache 750. The state of this line specifies to cache 750 the order in which words are to be sent to the processor 700 when a read double command is performed. |
| NO-GO | This line extends from processor 700 to cache 750. When forced to a binary ONE, it indicates that processor 700 executed a transfer instruction which is a NO-GO. This signals cache 750 that it should cancel the IF1 command it received when it was a miss and ignore the IF2 command which is currently applied to the DMEM lines. |
| RD-IBUF/ZDI | This line extends from processor 700 to cache 750. It causes the cache 750 to access the data word at the address contained in the alternate instruction register and put this data on the ZDI lines. For an outstanding LDQUAD command, the cache 750 holds processor 700 when the RD-IBUF/ZDI is forced to a binary ONE. |
| FRD-DBL | This line extends from processor 700 to cache 750. This signals cache 750 in advance that the processor 700 is requesting that a read double operation be performed. |
| FODD | This line extends from processor 700 to cache 750. This line is used in conjunction with the FRD-DBLE line to signal the order of the words being requested. When this line is a binary ONE, this indicates that the order is odd followed by even. |

CPU/CACHE INTERFACE LINES

| Designation | Description |
|---|---|
| ZDI 0-35 $P_0, P_1, P_2, P_3$ | These 40 unidirectional lines extend from cache 750 to processor 700. They apply data from cache 750 to the processor 700. |
| ZIB 0-35 $P_0, P_1, P_2, P_3$ | These 40 unidirectional lines extend from cache 750 to processor 700. They apply instructions to the processor 700. |
| I BUF-EMPTY | This line extends from cache 750 to processor 700. When set to a binary ONE, this line indicates that cache 750 has transferred the last instruction from the current instruction block. |
| I BUF-RDY | This line extends from cache 750 to processor 700. When set to a binary ONE, the line indicates that there is a least one instruction in the current instruction block in cache 750. The line is set to a binary ZERO to indicate a non-ready condition as follows:<br>1. Whenever the instruction address switches from the last instruction of an IF1 block in cache to the first instruction of an IF2 block not in cache and not in the IBUF2 buffer.<br>2. Whenever instructions are being fetched from the IBUF1 or IBUF2 buffer and the next instruction to be fetched is in a two word pair which has not been received from memory. |
| I BUF-FULL | This line extends from cache 750 to processor 700. This line indicates that there are least four instructions in the current instruction block or it has at least one instruction and an outstanding IF2 request. |
| CP STOP | This line extends from cache 750 to processor 700. When forced to a binary ONE state, the line signals that the processor 700 is held or required to wait or halt its operation. In the case of a read miss condition due to a processor command, processor 700 is held on the subsequent T clock cycle pulse. When released, the DATA RECOV line is forced to a binary ONE to restrobe the affected processor register(s). When the RDIBUF/ZDI line is forced to a binary ONE before the data is received from memory, processoer 700 is held prior to the subsequent T clock pulse. When released, the requested data is made available to processor 700 on the ZDI lines and is used on the subsequent T clock pulse. |
| DATA-RECOV | This line extends from the cache 750 to processor 750. It is used to restrobe processor registers following the stopping of the processor 700 in response to the detection of a cache miss condition or read bypass condition. At the end of the cycle in which the DREQ CAC line is forced to a binary ONE, the miss condition is detected but processor 700 cannot be stopped until after the subsequent T clock pulse. Therefore, bad data/instructions are strobed into the processor registers from the ZDI/ZIB lines. When the requested data/instructions become available, the DATA RECOV line is forced to a binary ONE to restrobe the registers which were strobed during the last |

| CPU/CACHE INTERFACE LINES | |
|---|---|
| Designation | Description |
| | cache request. |
| ZPTR-OUT 0-1 | These two lines extend from cache 750 to processor 700. These lines are coded to specify the two least significant bits of the address of the instruction contained in the RIRA instruction register or the I buffer. |

GENERAL DESCRIPTION OF PROCESSOR 700 - FIG. 2

Referring to FIG. 2, it is seen that the host processor 700 includes an execution control unit 701, a control unit 704, an execution unit 714, a character unit 720, an auxiliary arithmetic and control unit (AACU) 722, a multiply-divide unit 728, which are interconnected as shown. Additionally, the control unit 704 has a number of interconnections to the cache unit 750 as shown.

The execution control unit 701 includes an execution control store address preparation and branch unit 701-1, and an execution control store 701-2. The store 701-2 and unit 701-1 are interconnected via buses 701-3 and 701-6 as shown.

The control unit 704 includes a control logic unit 704-1, a control store 704-2, an address preparation unit 704-3, data and address output circuits 704-4, an XAQ register section 704-5 which interconnect as shown.

As seen from FIG. 2, the SIU interface 600 provides a number of input lines to the cache unit 750. The lines of this interface have been described in detail previously. However, in connection with the operation of cache unit 750, certain ones of these lines are specially coded as follows.

1. MITS 0-3 for Reads are coded as follows: bits 0-1=00; bits 2-3=Transit block buffer address containing the ZAC command for current read operation.

For Write Operation bit 0-3=Odd word zone

2. MIFS lines are coded as follows:
   bit 0=0;
   bit 1=0 even word pairs (words 0,1);
   bit 1=1 odd word pairs (words 2,3);
   bits 2-3=Transit block buffer address containing the ZAC command for the data being received.

As concerns the interface lines DFS 00-35, P0-P3, these lines convey read data to cache unit 750. The lines DTS 00-35, P0-P3 are used to transfer data and commands from cache 750 to the SIU 100.

The control unit 704 provides the necessary control for performing address preparation operations, instruction fetching/execution operations and the sequential control for various cycles of operation and/or machine states. The control is generated by logic circuits of block 704-1 and by the execution control unit 701 for the various portions of the control unit 704.

The XAQ register section 704-5 includes a number of program visible registers such as index registers, an accumulator register, and quotient register. Other program visible registers, such as the instruction counter and address registers, are included within the address preparation unit 704-3.

As seen from FIG. 2, the section 704-5 receives signals from unit 704-3 representative of the contents of the instruction counter via lines RIC 00-17. Also, lines ZRESA 00-35 apply output signals from the execution unit 714 corresponding to the results of operations performed upon various operands. The section 704-5 also receives an output signal from the auxiliary arithmetic and control unit via lines RAAUO-8.

The section 704-5 provides signals representative of the contents of one of the registers included within the section as an input to the address preparation unit 704-3. The address preparation unit 704-3 forwards the information through a switch to the execution unit 714 via the lines ZDO 0-35. Similarly, the contents of certain ones of the registers contained within section 704-5 can be transferred to the execution unit 714 via the lines ZEB 00-35. Lastly, the contents of selected ones of these registers can be transferred from section 704-5 to the multiply/divide unit 728 via the lines ZAQ 00-35.

The address preparation unit 704-3 generates addresses from the contents of various registers contained therein and applies the resultant logical, effective and-/or absolute addresses for distribution to other units along the lines ASFA 00-35. The address preparation unit 704-3 receives the results of operations performed on a pair of operands by the execution unit 714 via the lines ZRESB 00-35. The unit 704-3 receives signals representative of the contents of a pair of base pointer registers from the control logic unit 701 via the lines RBASA and RBASB0-1. Outputs from the multiply/divide unit 728 are applied to the address preparation unit 704-3. Lastly, the contents of a secondary instruction register (RSIR) are applied as input to the unit 704-13 via the lines RSIR 00-35.

The data and address output circuits 704-4 generate the cache memory address signals which it applies to the cache unit 750 via the lines RAD0/ZAD0 00-35. These address signals correspond to the signals applied to one of the sets of input lines ZDI 00-35, ASFA 00-35 and ZRESB 00-35 selected by switches included within the circuits of block 704-4. These circuits will be further discussed herein in greater detail.

The control logic unit 704-1 provides data paths which have an interface with various units included within the cache unit 750. As described in greater detail herein, the lines ZIB 00-35 provide an interface with an instruction buffer included within the cache 750. The lines ZDI 00-35 are used to transfer data signals from the cache 750 to the control logic unit 704-1. The ZPTROUT lines are used to transfer address information from cache 750 to unit 704-1. Other signals are applied via the other data and control lines of the cache-CPU interface 604. These lines include the CP-STOP line shown separately in FIG. 2.

As seen from FIG. 2, the control logic unit 704-1 provides a number of groups of output signals. These output signals include the contents of certain registers, as for example, a basic instruction register (RBIR) whose contents are applied as an input to control store 704-2 via the lines RBIR 18-27. The control logic unit 704-1 receives certain control signals read out from control store 704-2 via the lines CCSD0 13-31.

The control logic unit 704-1 also includes a secondary instruction register (RSIR) which is loaded in parallel with the basic instruction register at the start of processing an instruction. The contents of the secondary instruction register RSIR 00-35, as previously mentioned, are applied as inputs to the address preparation unit 704-3. Additionally, a portion of the contents of the secondary instruction register are applied as inputs to the auxiliary arithmetic control unit 722 via the lines RSIR 1-9 and 24-35.

The control store 704-2 as explained herein provides for an initial decoding of program instruction op-codes and therefore is arranged to include a number of storage locations (1024), one for each possible instruction op-code.

As mentioned, signals applied to lines RBIR 18-27 are applied as inputs to control store 704-2. These signals select one of the possible 1024 storage locations. The contents of the selected storage location are applied to the lines CCSD0 13-31 and to CCSD0 00-12 as shown in FIG. 2. The signals supplied to lines CCSD0 00-12 correspond to address signals which are used to address the execution control unit 701 as explained herein.

The remaining sections of processor 700 will now be briefly described. The execution unit 714 provides for instruction execution wherein unit 714 performs arithmetic and/or shift operations upon operands selected from the various inputs. The results of such operations are applied to selected outputs. The execution unit 714 receives data from a data input bus which corresponds to lines RDI 00-35 which have as their source the control logic unit 704-1. The contents of the accumulator and quotient registers included within section 704-5 are applied to the execution unit 714 via the lines ZEB 00-35 as mentioned previously. The signals applied to the input bus lines ZDO 00-35 from the address preparation unit 704-3 are applied via switches included within the execution unit 714 as output signals to the lines ZRESA 00-35 and ZRESB 00-35, as shown in FIG. 2. Additionally, execution unit 714 receives a set of scratch pad address signals from the auxiliary arithmetic and control unit 722 applied via the lines ZRSPA 00-06. Additionally, the unit 722 also provides shift information to the unit 714 via the lines ZRSC 00-35.

The character unit 720 is used to execute character type instructions which require such operations as translation and editing of data fields. As explained herein, these types of instructions are referred to as extended instruction set (EIS) instructions. Such instructions which the character unit 720 executes include the move, scan, compare type instructions. Signals representative of operands are applied via lines ZRESA 00-35. Information as to the type of character position within a word and the number of bits is applied to the character unit 720 via the input lines ZDB 00-07.

Information representative of the results of certain data operations is applied to the unit 722 via the lines ZOC 00-08. Such information includes exponent data and data in hexadecimal form. The character unit 720 applies output operand data and control information to the unit 722 and the unit 728 via the lines RCHU 00-35.

The auxiliary arithmetic and control unit 722 performs arithmetic operations upon control information such as exponents used in floating point operations, calculates operand lengths and pointers and generates count information. The results of these operations are applied to execution unit 714 via the lines ZRSPA 00-06 and lines ZRSC 00-06 as mentioned previously. Information signals corresponding to characters such as 9-bit characters, 6-bit characters, decimal data converted from input hexadecimal data, quotient information and sign information are applied to section 704-5 via the lines RAAU 00-08.

As seen from FIG. 2, the unit 722 receives a number of inputs. Character pointer information is applied via the lines ASFA 33-36. EIS numeric scale factor information and alphanumeric field length information are applied to the unit 722 via the lines RSIR 24-35. Other signals relating to fetching of specific instructions are applied via the lines RSIR 01-09. Exponent signals for floating point data are applied to the unit 722 via the lines ZOC 00-08 while floating point exponent data signals from unit 704-1 are applied via the lines RDI 00-08. Shift count information signals for certain instructions (e.g. binary shift instructions) are applied to the unit via the lines RDI 11-17. As concerns the input signals applied to the line RCHU 00-35, lines 24-35 apply signals corresponding to the length of EIS instruction fields while 18-23 apply address modification signals to the unit 722.

The last unit is the multiply/divide unit 728 which provides for high-speed execution of multiply and divide instructions. This unit may be considered conventional in design and may take the form of the multiply unit described in U.S. Pat. No. 4,041,292 which is assigned to the same assignee as named herein. The unit 728 as seen from FIG. 2 receives multiplier dividend and divisor input signals via the lines RCHU 00-35. The multiplicand input signals from register section 704-5 are applied via the lines ZAQ 00-35. The results of the calculations performed by the unit 728 are applied as output signals to the lines ZMD 00-35.

As mentioned previously, the cache unit 750 transfers and receives data and control signals to and from the SIU 100 via the data interface line 600. The cache unit 750 transfers and receives data and control signals to and from the processor 700 via the lines of interface 604. Lastly, the cache unit 750 receives address and data signals from the circuits 704-4 via the lines RAD0-/ZAD0 00-35.

DETAILED DESCRIPTION OF THE PROCESSOR 700

Certain ones of the sections which comprise the processor 700 illustrated in FIG. 2 will now be discussed in greater detail with respect to FIGS. 3a through 3e.

Figure 3A:
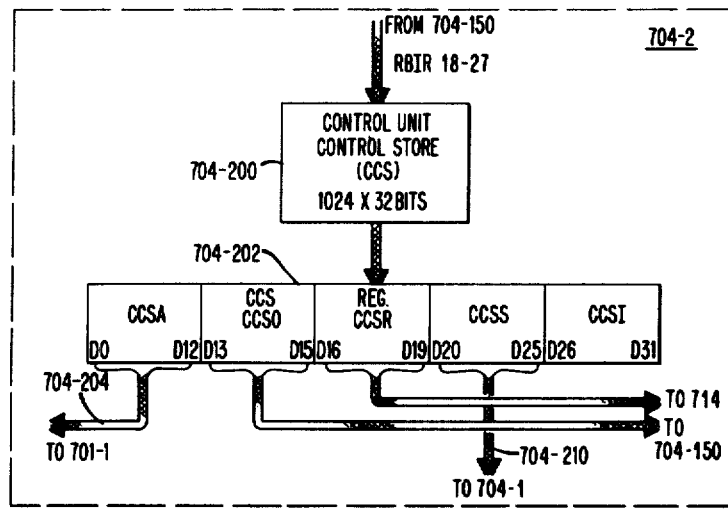
Figure 3E:
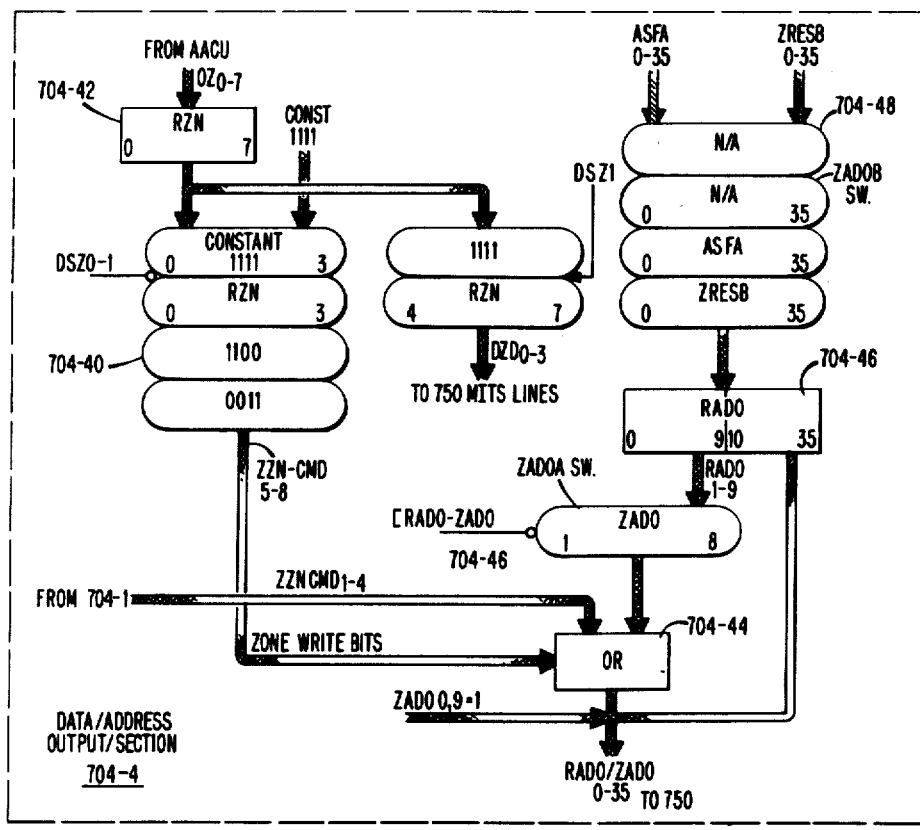
Figure 3B:
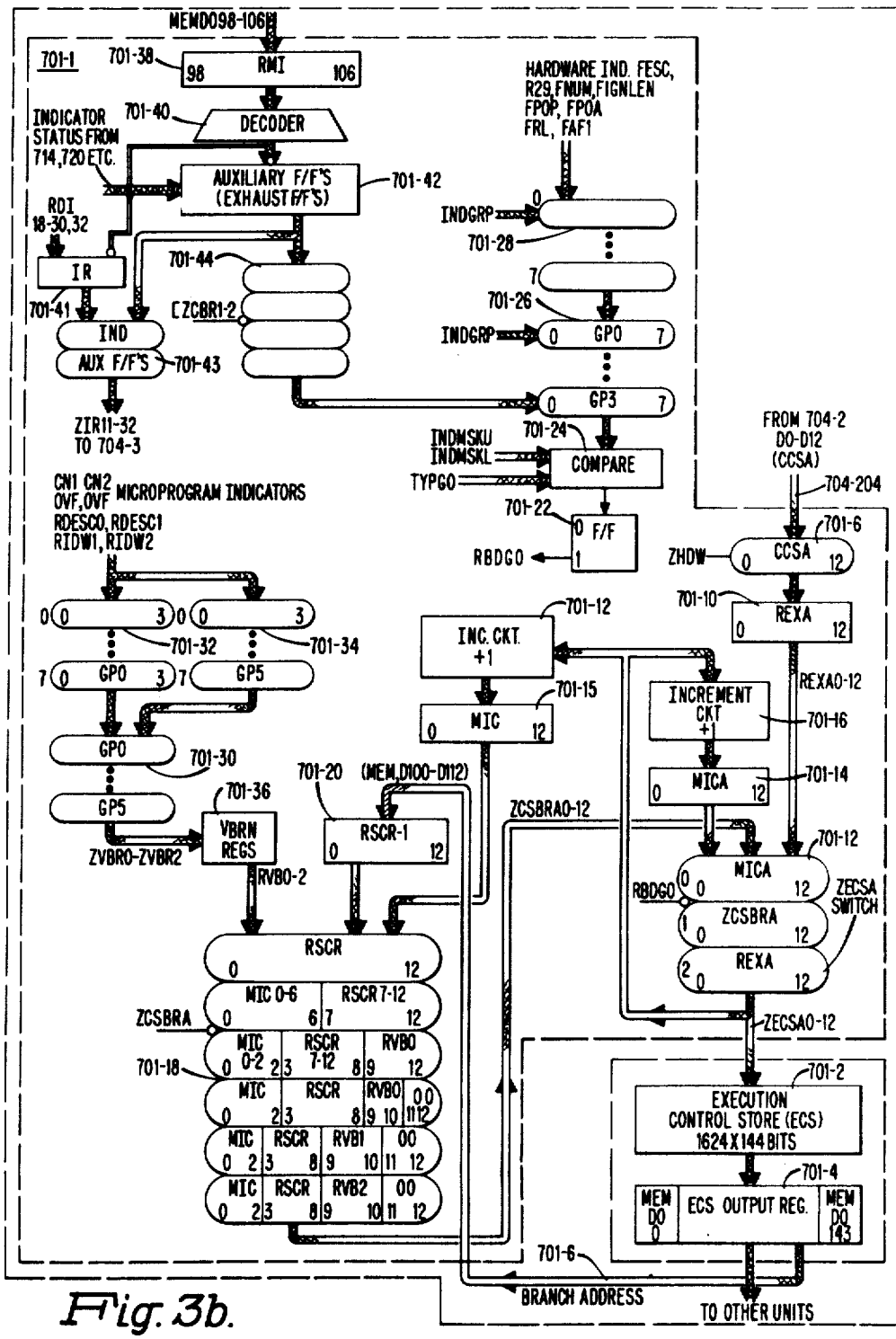

Referring to FIGS. 3a and 3b, it is seen that the processor includes two control stores: (1) the control unit control store (CCS) 704-200 which forms part of the control unit 704; and (2) the execution control store (ECS) 701-3 which is included within the execution control unit 701.

The cache oriented processor 700 of the preferred embodiment of the present invention includes a three stage pipeline. This means that the processor 700 requires at least three processor cycles to complete the processing of a given program instruction and can issue a new instruction at the beginning of each cycle. Hence, a number of program instructions may be in some stage of processing at any given instant of time.

In the preferred embodiment of the processor 700 includes the following stages: an instruction cycle (I) wherein instruction interpretation, op-code decoding and address preparation take place; a cache cycle (C) wherein access to the cache unit 750 is made ensuring high performance operation; and, an execution cycle (E) wherein instruction execution takes place under microprogram control.

As concerns control, during the I cycle, the op-code of the instruction applied via lines RBIR 18-27 is used to access a location within control store 704-2. During a C cycle, the accessed contents from control store 704-2 are applied to lines CCS D0 00-12 and in turn used to access one of the storage locations of the execution control store 701-2. During the C cycle, the microinstructions of the microprogram used to execute the instruction are read out from the execution control store 701-2 into a 144-bit output register 701-4. The signals designated MEMD0 00-143 are distributed to the various functional units of processor 700. During an E cycle, the processor executes the operation specified by the microinstruction.

Figure 6A:
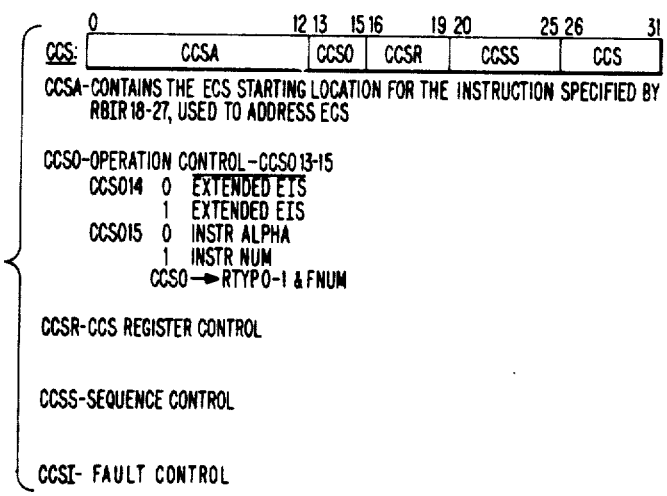
FIG. 6a illustrates the format of the control store control unit of FIG. 1.

Referring specifically to FIG. 2, it is seen that the control store 704-2 includes a control unit control store (CCS) 704-200 which is addressed by the op-code signals applied to the lines RBIR 18-27. The CCS 704-200, as mentioned previously, includes 1024 storage locations, the contents of which are read out into an output register 704-202 during an I cycle of operation. FIG. 6a shows schematically the format of the words stored within the control store 704-200.

Referring to FIG. 6a, it is seen that each control unit control store word includes five fields. The first field is a 13-bit field which contains an ECS starting address location for the instruction having an op-code applied to lines RBIR 18-27. The next field is a three bit field (CCS$\phi$) which provides for the control of certain operations. The bit interpretations of this field depend upon its destination and whether it is decoded by specific logic circuits or decoded under microprogram control. The next field is a 4-bit field which provides for certain register control operations.

The next field is a 6-bit sequence control field which is coded to specify a sequence of operations to be performed under hardwired logic circuit control as well as the type of cache operation. In the present example, this field is coded as $75_8$. The last field is a 6-bit indicator field which is not pertinent to an understanding of the present invention.

As seen from FIG. 3a, signals corresponding to the CCSA field of a control unit control store word are applied via a path 704-204 as an input to the execution generation circuits 701-7. Signals corresponding to the CCSR field are applied as an input to the execution unit 714 via path 704-206. Additionally, the same signals are applied as an input to the address preparation unit 704-3 via another path 704-208.

Signals representative of the sequence control field apply as an input to the sequence control logic circuits 704-100 via path 704-210. As explained herein, these circuits decode the sequence control field and generate signals for conditioning the cache unit 750 to perform the operation designated.

As mentioned previously, the execution address generation circuit 701-1 receives an input address which corresponds to field CCSA from the control store 704-2. As seen from FIG. 3b, these circuits include an input address register 701-10 whose output is connected to one position of a four position switch 701-12 designated ZECSA. The output of the switch serves as an address source for the control store 701-2. The first position of the switch 701-12 is connected to receive an address from the MICA register 701-14. The contents of register 701-14 are updated at the end of each cycle to point to the location within the ECS control store following the location whose contents were read out during that cycle.

The second position selects the address produced from the ZCSBRA branch address selector switch 701-18. The third position selects the address of the first microinstruction in each microprogram provided by the CCS control store which is loaded into the REXA register 701-10. When the CCS output is not available at the termination of a microprogram, a predetermined address (octal address 14) is automatically selected.

The first position of branch switch 701-18 receives signals corresponding to a branch address read out from store 701-2 into register 701-4 which is in turn forwarded to a return control register 701-20. The second, third and fourth positions of switch 701-18 receives signals from RSCR register 701-20, an MIC register 701-15 and the contents of a number of vector branch registers 701-36. The MIC register 701-15 stores an address which points to the microinstruction word following the microinstruction word being executed. This address corresponds to address from switch 701-12 incremented by one by an increment circuit 701-12.

The vector branch registers include a 4-bit vector branch register 0 (RVB0), a 2-bit vector branch register 1 (RVB1) and a 2-bit vector branch register 2 (RVB2). These registers are loaded during a cycle of operation with address values derived from signals stored in a number of different indicator flip-flops and registers applied as inputs to the number of groups of input multiplexer selector circuits 701-32 and 701-34. The outputs of the circuits 701-32 and 701-34 are applied as inputs to two position selector circuits 701-30. These circuits in turn generate the output signals ZVBR0, ZVBR1 and ZVBR2 which are stored in the register 701-36.

The switch 701-36 provides an address based upon the testing of various hardware indicator signals, state flip-flop signals selected via an INDGRP field. The branch decision is determined by masking (ANDING) the selected indicator set with the INDMSKU and INDMSKL fields of a microinstruction word. If a vector branch is selected, INDMSKU is treated as 4 ZERO bits. The "OR" of the 8 bits is compared to the state defined by the TYPG and GO microinstruction fields. The hardware signals are applied via a number of data selector circuits 701-28 only one of which is shown whose outputs are in turn applied as inputs to a further five position multiplexer selector circuit 701-26. The output of the multiplexer circuit 701-26 feeds a comparison circuit which "ands" the indicator signals with the mask signals to produce the resulting signals MSKCBRO-7.

The signals MSKCBRO-7 are applied to another comparison circuit which "ands" the signals with the condition branch test signals TYPGGO to set or reset a branch decision flip-flop 701-22 which produces a signal RBDGO whose state indicates whether branching is to take place. The output signal RBDGO is applied as a control input to the first two positions of switch 701-12. When the branch test condition is not met (i.e., signal RBDGO=0), then the incremented address from the MICA register 701-14 is selected.

In some instances, as seen herein, it is not possible to test the state of an indicator on the cycle following its formation. For this reason, history registers HR0-HR7, not shown, are provided for register storage of the Group 2 indicators. The states of such stored indicators are selected and tested in a manner similar to that of the other indicators (i.e., mask fields).

Additionally, the unit 701-1 includes a number of indicator circuits, certain ones of these are used to control the operation of certain portions of the processor 700 when the strings being processed by certain types of instructions have been exhausted. These indicator circuits are included in block 701-42 and are set and reset under the control of a field within the microinstruction word of FIG. 6a (i.e., IND6 field). The bits of this field read out from the ECS output register 701-4 are applied to an RMI register 701-38 for decoding by a decoder 701-40. Based upon the state of status indicator signals received from the various processor units (e.g. 714, 720, 722, etc.), the appropriate ones of the auxiliary flip-flops are switched to binary ONE states. The outputs of these flip-flops are applied via the different positions of a 4 position switch 701-44 to the GP3 position of switch 701-26 for testing. The same outputs are applied to a second position of a ZIR switch 701-43 for storage via the ZDO switch 704-340. The ZIR switch 701-43 also receives indicator signals from an indicator register (IR) 701-41. This register is loaded via the RDI lines 18-30 and 32 in response to certain instructions.

The indicator status signals for example include the outputs of different adder circuits (AL, AXP) of the unit 720. These signals will set different ones of a number of exhaust flag flip-flops designated FE11, FE12, FE13, FE1E, FE2E, FE2 and FE3. The FE1E and FE2E flip-flops are set during any FPOA cycle of any instruction. These flip-flops in turn cause the FE11, FE12 and FE13 flip-flops to be set when the outputs from the AL or AXP adder circuits of unit 720. The setting and resetting of these indicators will be described herein in further detail in connection with the description of operation. However, the exhaust flag flip-flops pertinent to the example given herein are set and reset in accordance with the following Boolean expressions.

SET: FE1E = FPOA + IND6FLD field.
RESET: FE1E = IND6FLD field.
SET: FE2E = FPOA + IND6FLD field.
RESET: FE2E = IND6FLD field.
SET: FE11 = IND6FLD field·FE1E (ALES + AX-PES + DESC1·AP0 − 4 = 0) + IND6FLD field·FE1E·DESC1·(AP0 − 5 = 0 + APZN + ALZN-) + IND6FLD field.
RESET: FE11 = FPOA + IND6FLD field.
SET: FE12 = IND6FLD field·FE1E·(ALES + AX-PES + FE13).
RESET: FE12 = FPOA + IND6FLD field.
SET: FE13 = IND6FLD field·FE1E·ALES- + IND6FLD field.
RESET: FE13 = FPOA + IND6FLD field.
SET: FE2 = IND6FLD field·FE2E·ALES- + IND6FLD field·FE2E·DESC2·(AP0 − 4 = - 0 + AP0 − 5 = 0 + APZN + ALZN) + (IND6FLD field) FE2E·DESC2 + IND6FLD.
RESET: FE2 = FPOA + IND6FLD field.
SET: FE3 = IND6FLD field·DESC3·(AP0 − 4 = - 0 + AP0 − 5 + APZN + ALZN) + IND6FLD field·DESC3 + IND6FLD.
RESET: FE3 = FPOA + IND6FLD field.
Wherein IND6FLD indicates a particular code;

ALES = AL = 0 or $\overline{AL\text{-}C}$;
AXPES = AXP = 0 or $\overline{AXP\text{-}C}$;
APZN = AP0 − 7 ≦ 0; and,
ALZN = AL0 − 11 ≦ 0.

The ZCSBRA switch 701-18 is normally enabled when the branch decision flip-flop RBD was set to a binary ONE in the previous cycle. The first position selects a 13-bit branch address from the current microinstruction applied via the RCSR register 701-20. The branch address enables any one of the locations of the ECS control store to be addressed directly. The second position selects the concatenation of the 6 low order address bits from the current microinstruction applied via MIC register 701-15 and the 7 upper bits of the branch address from the current microinstruction applied via the RSCR register 701-20. This permits branches within a 64-word page defined by the contents of the MIC register 701-15 (current location +1).

The third position selects the concatenation of 4 low order bits from the RVBO vector branch register, 6 bits from the branch field of the current microinstruction stored in RCSR register and the 3 upper bits of the address stored in the MIC register. This permits 16-way branches. The fourth position selects the concantenation of the 2 low order ZEROS with 4 bits from the vector branch register RVBO with the 4 most significant bits of the branch address field of the current microinstruction and the 3 upper bits of the current address stored in the MIC register. This permits 16-way branches with 3 control store locations between each adjacent pair of destination addresses.

The fifth position selects the concatenation of 2 low order ZEROS with 2 bits from vector branch register RVB1, with the 6 bits of the branch address of the current microinstruction and the upper 3 bits from the MIC register. This permits branches with 4 possible destinations with 3 control store locations between each adjacent pair of destination addresses.

The sixth position selects the concatenation of 2 low order ZEROS with 2 bits from vector branch register RVB2 with the 6 bits of the branch address of the current microinstruction and the upper 3 bits from the MIC register. This permits 4-way branches with 3 control store locations between each adjacent pair of destination addresses.

Figure 6B:
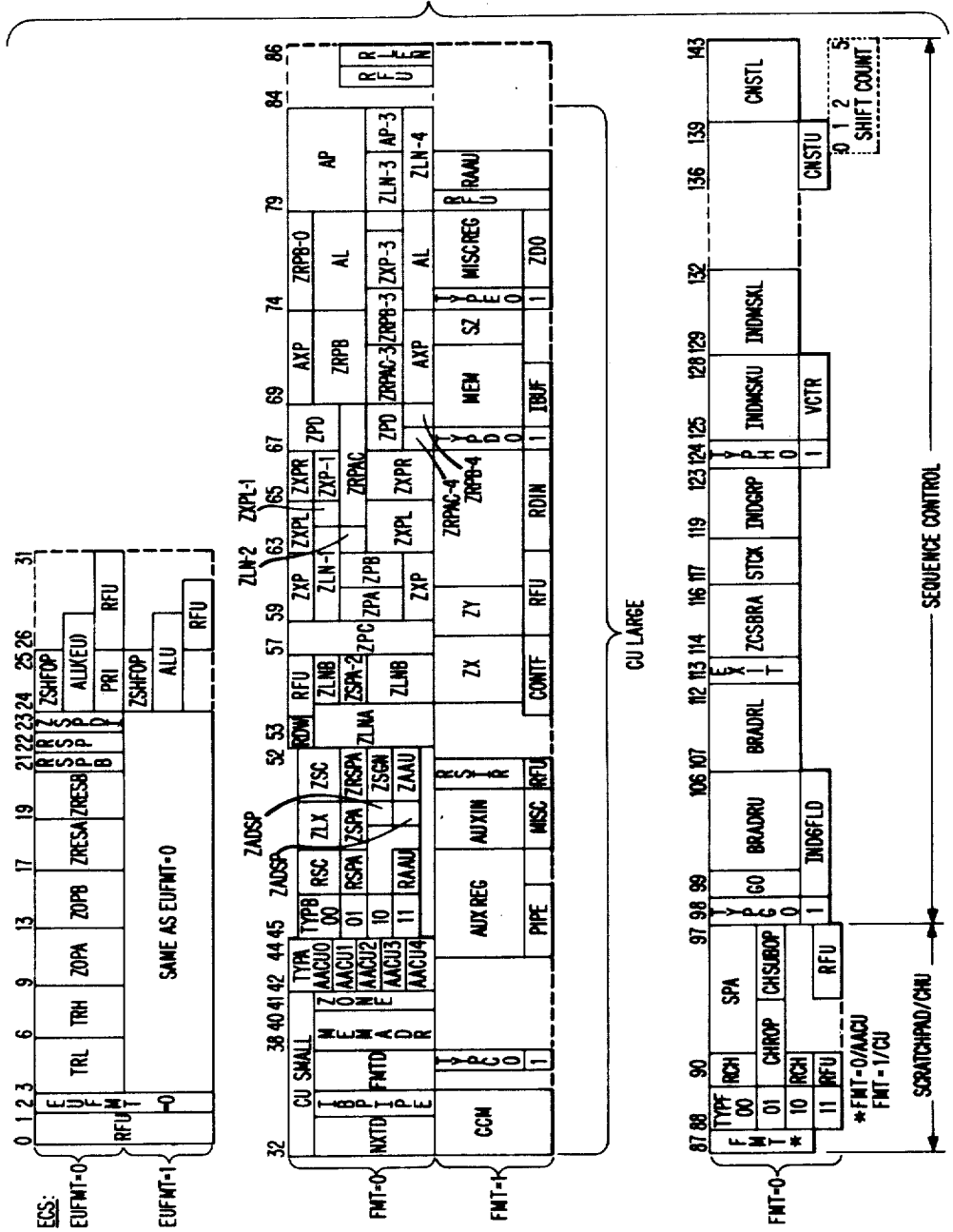
FIG. 6b illustrates the format of the microinstruction words of the execution control store of FIGS. 2 and 3.

The output of switch 701-12 addresses a specific location within control store 701-2 which causes the read out of a microinstruction word having a format illustrated i FIG. 6b. Referring to that Figure, it is seen that this microinstruction word is coded to include a number of different fields which are used to control the various functional units within processor 700. Only those fields which are related to the present example will be described herein.

| Bits 0–1 | | Reserved for Future Use. |
|---|---|---|
| Bit 2 | EUFMT | Defines which format the EU is to operate with. EUFMT-0 specifies a first microinstruction format while EUFMT=1 specifies an alternate microinstruction format. |
| Bits 3–5 | TRL | TR Low Write Control. Write control of EU temporary registers TR0-TR3. |
| | | OXX No change |
| | | 100 Write TR0 |
| | | 101 Write TR1 |
| | | 110 Write TR2 |
| | | 111 Write TR3 |
| Bits 6–8 | TRH | TR High Write Control. Write control of EU temporary registers TR4-TR7. |
| | | OXX No change |
| | | 100 Write TR4 |
| | | 101 Write TR5 |
| | | 110 Write TR6 |
| | | 111 Write TR7 |
| Bits 9–12 | ZOPA | ZOPA Switch Control. Selects the output of ZOPA switch. |
| | (0) 0000 | TR0 |
| | (1) 0001 | TR1 |
| | (2) 0010 | TR2 |
| | (3) 0011 | TR3 |
| | (4) 0100 | TR4 |
| | (5) 0101 | TR5 |

-continued

|  |  |  |  |
|---|---|---|---|
|  | (6) | 0110 | TR6 |
|  | (7) | 0111 | TR7 |
|  | (8–11) | 10XX | RDI |
|  | (12) | 1100 | ZEB |
|  | (13) | 1101 | ZEB |
|  | (14) | 1110 | ZEB |
|  | (15) | 1111 | 0 (disable) |

Bits 13–16 ZOPB ZOPB Switch Control.
Selects the output of ZOPB switch.

Bits 17–18 ZRESA ZRESA Switch Control.
Selects the output of ZRESA switch.
    00 ALU
    01 Shifter
    10 Scratchpad/RDI switch
    11 ZDO Bits 19–20 ZRESB ZRESB Switch Control.
Selects the output of ZRESB switch.
    00 ALU
    01 Shifter
    10 Scratchpad/RDI switch
    11 ZDO Bit 21 RSPB Scratchpad Buffer Strobe Control.
Strobes RSPB with ZRESB data.
    0 No strobe
    1 Strobe RSPB Bit 22 RSP Scratchpad Write Contro.
    0 Read scratchpad
    1 Write scratchpad Bit 23 ZSPDI Scratchpad/RDI Switch Control.
Selects the output of the Scratchpad/RDI switch.
    0 Scratchpad output
    1 RDI Bits 24–25 ZSHFOP Shifter Operand Switch Control.
Selects the left operand to the Shifter
    00 ZOPA output
    01 EIS output
    10 0
    11 Select 0 or −1 depending on bit 0 of right operand to Shifter.

Bits 24–27 ALU ALU Function Control.
Selects the operation applied to the two inputs (A and B) to the ALU.

Bits 24–29 N/a

Bits 26–31 RFU Reserved for Future Use.

Bits 30–31 ZALU ALU Switch Control.
Selects the output of ZALU switch.

Bits 32–33 NXTD Next Descriptor Control.
Strobes RBASB and RDESC registers.

|  |  |  |
|---|---|---|
| 00 | RBASB | 00 |
|  | RDESC | 00 |
| 01 | RBASB | 01 |
|  | RDESC | 01 |
| 10 | RBASB | Alt |
|  | RDESC | 10 |
| 11 | No strobes (default) |  |

Bits 32–35 CCM Control constant field referenced by the CONTF field.

Bits 34–35 IBPIPE IBUF/Pipeline Control.
Selects the reading of IBUF or the pipeline operation.
    00 No operation
    01 Read IBUF/ZDI (Alt)
    10 Type 1 Restart Release or
    11 Type 4 Restart Wait Bits 36–37 FMTD
Selects the loading of various CU registers and indicates the interpretation to be given to the MEMADR field for small CU control.
    00 No operation
    01 RADO    ASFA
    10 RADO    ZRESB
    11 RADO    ASFA Bits 38–40 MEMADR Cache Control.
Selects cache operations. The complete interpretation for this control is a function of the FMTD control.

000 No operation
    001 Read Sgl
    010 Load Quad
    011 Preread
    100 Write Sgl
    101 Write Dbl
    110 Read Sgl Trans (for FMTD = 11 only)
    111 Write Sgl Word (for FMTD = 11 only)

Bit 41 ZONE Zone Control.
Indicates zone or no zone for small CU control.
    0 No zone
    1 Zone Bits 42–44 TYPA Type A Flag.
Indicates the type A overlayed fields being used.
    000 Type A=0 fields
    .
    .
    .
    100 Type A=4 fields Bits 44–46 PIPE Pipeline Control
Selects the type of restart to be initiated.

|  |  |  |
|---|---|---|
| 000 | No operation |  |
| 001 | Type 1 | Restart and Release |
| 010 | Type 2 | Restart |
| 011 | Type 3 | Restart |
| 100 | Type 4 | Restart |
| 101 | Type 5 | Release |
| 110 | Type 6 | Restart |

Bits 44–47 AUXREG Auxiliary Register Write Control
Selects an auxiliary register or combinations to be strobed with data selected by the AUXIN control field.

|  |  |  |
|---|---|---|
| (0) | 0000 | No strobe |
| (1) | 0001 | RRDXA |
| (2) | 0010 | R29 |
| (3) | 0011 | R29, RRDXA, FRL, RID |
| (4) | 0100 | RRDXB |
| (5) | 0101 | RTYP |
| (6) | 0110 | RBASA |
| (7) | 0111 | RBASA, RTYP |
| (8) | 1000 | RBASB |
| (9) | 1001 | RDESC |
| (10) | RBASA, R29, RRDXA |  |

Bits 45–46 TYPB Type Flag.
Indicates the Type B overlayed fields being used.
    00 Type B = 0 fields
    .
    .
    .
    11 Type B = 3 fields Bit 47 RSC RSC Strobe Control.
Strobes the RSC register. (Shift Count)

Bit 47 RSPA RSPA Strobe Control.
Strobes the RSPA register.

Bits 47–48 N/A

Bit 47 RAAU RAAU Strobe Control.
Strobes RAAU register.

Bits 48–49 ZLX ZLX Switch Control.
Selects the output of the ZLX switch.

Bits 48–49 ZSPA ZSPA Switch Control.
Selects the output of the ZSPA switch.

Bits 48–50 AUXIN Auxiliary Register Input Control.
Selects data to be strobed into auxiliary register(s).

Bit 49 ZADSP ZADSP Switch Control.
Selects the output of ZADSP switch.

Bits 50–52 ZSC ZSC Switch Control.
Selects the output of ZSC switch.

Bits 50–52 ZRSPA ZRSPA Switch Control.
Selects the output of ZRSPA switch.

| Bits | Name | Description |
|---|---|---|
| Bits 50-52 | ZAAU | ZAAU Switch Control. |
| Bit 51 | RSIR | RSIR Register Strobe. Strobes the RSIR register as a function of the AUXIN field. |
| Bit 53 | RDW | R1DW, R2DW Register Strobe. Strobes the R1DW or R2DW register a a function of the RDESC register. |
| Bits 53-54 | ZLNA | ZLNA Switch Control. Selects output of ZLNA switch. |
| Bits 54-57 | CONTF | Miscellaneous Flip-Flop Control. Selects one of four groups of control flip-flops to be set or reset by the control constant field (CCM). The flip-flops include those of blocks 704-104 and 704-110. |
| Bits 55-56 | ZLNB | ZLNB Switch Control. Selects the output of ZLNB switch. |
| Bits 55-56 | ZSPA (2) (Type A=2 | ZSPA Switch, RSPA Register Control. Selects ZSPA switch output and strobes RSPA register. |
| Bits 57-58 | ZPC | ZPC Switch Control. Selects the output of ZPC switch. |
| Bits 59-62 | ZXP | ZXP Switch, RXP Register Bank Control. Selects ZXP switch output and the RXP register into which it will be written. |
| Bits 59-63 | ZLN (1) (Type A=1) | ZLN Switch, RLN Register Bank Control. Selects ZLN switch output and the RLN register into which it will be written. |
| Bits 59-60 | ZPA | ZPA Switch Control. Selects the output of ZPA switch. 00 = RP0 . . . 11 = RP3 |
| Bits 61-62 | ZPB | ZPB Switch Control. Selects the output of ZPB switch. 00 = RP0 . . . 11 = RP3 |
| Bits 63-64 | ZXPL (Type A=0) | ZXPL Switch Control. Selects the output of ZXPL switch. 00 = RXPA . . . 11 = RXPD |
| Bit 63 | ZLN (2) (Type A=2) | ZLN Switch, RLN Register Bank Control. Selects ZLN switch output and the RLN register into which it will be written. |
| Bits 63-66 | RDIN | RDI In Control. Selects the data to be strobed into the RDI register and selects one of the modification control fields (MF$_1$-MF$_3$, TAG) of an instruction word. RDI strobe may also be controlled by the MISCREG field. |
| Bit 64 | ZXPL (1) (Type A=1) | ZXPL Switch Control. Selects the output of ZXPL switch. |
| Bits 64-68 | ZRPAC (Type A=2) | ZRPA Switch, ZRPC Switch, RP0-3 Register Bank Control. Selects ZRPC and ZRPA switch outputs and the RP0-3 register into which the ZRPA output will be written. |
| Bits 64-66 | ZXPR (Type A=0) | ZXPR Switch Control. Selects the output of ZXPR switch. |
| Bits 65-66 | ZXP (1) (Type A=1) | ZXP Switch, RXP Register Bank Control. Selects ZXP switch output and the RXP register into which it will be written. |
| Bits 67-68 | ZPD (Type A=0) | ZPD Switch Control. Selects the output of ZPD switch. |
| Bit 67 | ZRPAC (4) (Type A=4) | ZRPA Switch, ZRPC Switch, RP0-3 Register Bank Control. Selects CP4 from ZRPA switch and strobes the RP1 register. |
| Bit 67 | TYPD | Type D Flag. Type D Flag which indicates D overlayed fields. |
| Bit 68 | ZRPB (4) (Type A=4) | ZRPB Switch, RP4-7 Register Bank Control. Selects 0 from ZRPB switch and strobes the RP4 register. |
| Bits 68-71 | MEM | Cache Memory Control. Selects the cache operation in conjunction with the SZ control. |
| | (0) | 0000 No operation |
| | . | |
| | . | |
| | . | |
| | (15) | 1111 Write Remote |
| Bits 68-70 | IBUF | IBUF Read Control. Selects the destination of IBUF data when reading IBUF. |
| Bits 69-73 | AXP (Type A=0) | ZXPA Switch, ZXPB Switch, AXP Adder, ZAXP Switch, RE Register Control. Selects ZXPA and ZXPB switch outputs, the AXP adder function applied to them, and the ZAXP switch output. Also strobes the RE register. |
| Bits 69-73 | ZRPB (Type A=1) | ZRPB Switch, RP4-7 Register Bank Control. Selects ZRPB switch output and the RP4-7 register into which it will be written. |
| Bits 69-71 | ZRPAC-3 (Type A=3) | ZRPA Switch, ZRPC Switch, RP0-3 Register Bank Control. Selects ZRPC and ZRPA switch outputs and the RP0-3 register into which the ZRPA output will be written. |
| Bits 72-74 | ZRPB (3) (Type A=3) | ZRPB Switch, RP4-7 Register Bank Control. Selects ZRPB switch output and the RP4-7 register into which it will be written. |
| Bits 72-73 | SZ | Size/Zone Cache Control. Controls cache operations in conjunction with the MEM control field. |
| Bits 74-78 | ZRPB (3) (Type A=0) | ZRPB Switch, RP4-7 Register Bank Control. Selects ZRP switch output and the RP4-7 register into which it will be written. |
| Bits 74-78 | AL (Type A=1) | ZALA Switch, ZALB Switch, AL Adder Control. Selects ZALA and ZALB switch outputs and the AL adder function applied to them. |
| Bit 74 | TYPE | Type E Flag. Type E flag which indicates the type E overlayed fields. |
| Bits 75-77 | ZXP (3) (Type A=3) | ZXP Switch, RXP Register Bank Control. Selects ZXP switch output and the RXP register into which it will be written. |
| Bits 75-78 | MISCREG | Miscellaneous Register Con- |

-continued

| Bits | Name | Description |
|---|---|---|
| | | trol. Selects various operations on miscellaneous registers (e.g. RBIR, RDI, RLEN, R8PP). |
| Bits 75–78 | ZDO | ZDO Switch Control. Selects the output of the ZDO switch. |
| Bit 78 | ZIZN | ZIZN Switch Control. Selects the output of ZIZN switch. |
| Bits 79–83 | AP | ZAPA Switch, ZAPB Switch, AP Adder Control. Selects ZAPA and ZAPB switch output and the AP adder function applied to them. |
| Bits 79–81 | ZLN (3) (Type A=3) | ZLN Switch, RLN Register Bank Control. Selects ZLN switch output and the RLN register into which it will be written. |
| Bits 79–83 | ZLN (4) (Type A=4) | ZLN Switch, RLN Register Bank Control. Selects ZLN output and the RLN register into which it will be written. |
| Bits 80–81 | RAAU | RAAU/RE Register Strobe. Selects the data to be strobed into the RAAU and RE registers by controlling several switches and adders in the unit 722. |
| Bits 82–83 | AP (3) (Type A=3) | ZAPA Switch, ZAPB Switch, AP Adder Control. Selects ZAPA and ZAPB switch outputs and the AP adder function applied to them. |
| Bit 84 | ZRSC (Type A=0) | ZRSC Switch Control. Selects the output of ZRSC Switch. |
| Bits 85–86 | N/A | |
| Bit 86 | RLEN (Type A=3) | RLEN Strobe Control. RLEN strobes are also controlled by hardware or by the MISCREG field. |
| Bit 87 | FMT | Format Flag. Indicates the type of format. |
| Bits 88–89 | TYPF | Indicates the type of overlayed fields. 00 = Scratchpad Address 01 32 Character Unit Control 10 = Multiply/Divide Control 11 = N/A |
| Bit 90 | RFU | Reserved for Future Use. |
| Bits 90–93 | CHROP | Character Unit Op Code. Selects main operation to be performed by Character Unit and the interpretation to be given to the CHSUBOP field. |

| (0) | 0000 | No operation |
|---|---|---|
| (1) | 0001 | Load Data |
| (2) | 0010 | MOP Execute |
| (3) | 0011 | Compare Single |
| (4) | 0100 | Compare Double |
| (5) | 0101 | Load Register |
| (6) | 0110 | Update CN |
| (7) | 0111 | Undefined |
| (8) | 1000 | Set RCH Operation A |
| (9) | 1001 | Set RTF1 |
| (10) | 1010 | Set RTF2 |
| (11) | 1011 | Set RTF3 |
| (12) | 1100 | Set RCN1 |
| (13) | 1101 | Set RCN2 |
| (14) | 1110 | Set Edit Flags |
| (15) | 1111 | CH Unit Clear |

| Bits | Name | Description |
|---|---|---|
| Bit 90 | RCH | RCH Register Strobe. Strobes the OP1 RCH register. |
| Bit 90 | RFU | Reserved for Future Use. |
| Bits 91–97 | SPA | Scratchpad Address. Contains the address that may be used to address the EU scratchpad. |
| Bits 91–93 | N/A | |
| Bits 94–97 | | CHSUBOP Character Unit Sub-Op Code. Selects the detailed function of the Character Unit or it may contain a constant. The interpretation of this field is a function of the CHROP control as shown below. |

CHROP = 0000 No Operation

| CHSUBOP$_{0-3}$ | |
|---|---|
| XXXX | No interpretation |

CHROP = 0001 Load Data Operation

| CHSUBOP$_{0-1}$ | (Suboperation) |
|---|---|
| 00 | OP1 Load by CN1 and TF1 |
| 01 | OP1 Load in Reverse by CN1 and TF1 |
| 10 | OP2 Load by CN2 and TF2 and Test Character |
| 11 | Load Sign |
| CHSUBOP$_{2-3}$ | (Fill Control) |
| 1X | Fill character loaded to ZCU |
| X1 | Fill character loaded to ZCV |

CHROP = 0010 MOP Execute Operation

| CHSUBOP$_{0-1}$ | (Suboperation) |
|---|---|
| 00 | MOP set by CN2 |
| 01 | MOP Execute |
| 10 | Undefined |
| 11 | Undefined |
| CHUBOP$_{2-3}$ | |
| XX | No interpretation |

CHROP = 0101 Load Register Operation

| CHSUBOP$_{0-1}$ | (Selects output of RCH) |
|---|---|
| CHSUBOP$_{2-3}$ | (Selects output of ZOC switch) |

CHROP = 1011 Set RTF3 Operation

| CHSUBOP$_{0-1}$ | (Selects data to be inspected for 00, indicating a 9-bit character.) |
|---|---|
| CHSUBOP$_{2-3}$ | (Constant Field) |

CHROP = 1110 Set Edit Flags Operation

| CHSUBOP$_{0-3}$ | (Constant selecting flags to be set) |
|---|---|
| 1XXX | Set ES (End suppression) |
| X1XX | Set SN (sign) |
| XX1X | Set Z (zero) |
| XXX1 | Set BZ (Blank When Zero). |

| Bits | Name | Description |
|---|---|---|
| Bits 94–97 | RFU | Reserved for Future Use. |
| Bits 97–97 | N/A | |
| Bit 98 | TYPG | TYPE G FLAG. Indicates the type of overlayed fields. 0 = BRADRU field 1 = IND6 field |
| Bit 99 | GO | State of Conditional Branch Test. |
| Bits 99–106 | BRADRU | Branch Address Upper. |
| Bits 99–106 | IND6FLD | Indicator Control. Selects an indicator. |
| Bits 99–106 | | Bit 99 = 0 specifies a change indicators instruction. Bit 99 = 1 specifies a set/reset indicators instruction (set or reset indicated by X bit 0 or 1 respectively. |

| Bits 100–104 | 105=1 | 106=1 |
|---|---|---|
| 0000 | | |
| . | | |
| . | | |
| . | | |
| 1100X | Exhaust 1 | Exhaust 2 |
| 1101X | Exhaust 3 | N/A |
| 1110X | Exhaust 1 Eff. | Exhaust 2 Eff. |

| Bits | Name | Description |
|---|---|---|
| Bits 107–112 | BRADRL | BRANCH ADDRESS LOWER. Contains lower portion of an ECS address used for branching. |
| Bit 113 | EXIT | Selection of Exit Switch Control. Selection of Exit indicates end of microprogram. |
| Bits 114–116 | ZCSBRA | ZCSBRA Switch Control. Defines the position to be selected in a Control Store Branch Address Switch. |

-continued

| | | |
|---|---|---|
| Bits 117-118 | N/A | |
| Bits 119-123 | INDGRP | Conditional Branch Indicator Group Control. The first two bits (119-120 select the "group" of microprogram indicators. The last three bits (121-123 select the "set" of indicators within each "group"). |
| Bit 124 | TYPH | Type H field. Indicates the type H overlayed fields. 0 = INDMSKU 1 = VCTR field |
| Bits 125-128 | INDMSKU | Conditional Branch Indicator Mask Upper. Contains the upper 4 bits of the indicator mask in type H = 0 field. |
| Bits 125-129 | VCTR | Vector Select. Selects the branching vectors to be strobed into the RVB0, RVB1 and RVB2 registers. The most significant bit (125) determines which of two groups 0 or 1, 2 or 3 and 4 or 5 will be strobed into the RVB0, RVB1 and RVB2 registers respectively. The remaining 3 bits select the vector within each group. |
| Bits 129-132 | INDMSKL | Conditional Branch Indicator Mask Lower. Contains the lower 4 bits of the indicator mask. |
| Bits 113-135 | N/A | |
| Bits 136-139 | CNSTU | Constant Upper. Contains the upper 4 bits of the constant field. |
| Bits 140-143 | CNSTL | Constant Lower. Contains the lower 4 bits of the constant field. |

Control Logic Unit 704-1

This unit includes the sequence decode logic circuits 704-100 as mentioned whose outputs feed a plurality of I cycle control state flip-flops of blocks 704-102. These flip-flops in response to signals from the circuits 704-100 as well as microinstruction signals from register 701-4 (DMEMR038-40 which corresponds to the mem address field MEMADR of FIG. 6b) generate the various required I cycle control states required for the execution of program instructions. It is assumed that block 704-102 also includes gate circuits which generate register hold signals (HOLDE00 which are distributed throughout the processor 700.

As seen from FIG. 3c, the I cycle control state flip-flops receive control input signals via control lines including a line CPSTOP00 from cache unit 750. As explained herein, the state of the CPSTOP00 line determines whether processor operation continues in that when the line is forced to a binary ZERO, the hold or enabling signals for the I cycle control state flip-flops and other storage registers are also forced to ZEROS. The hold signals corresponding to signals [HOLDI00 and [HOLDE00 operate to hold or freeze the state of the processor 700. Since no incrementing of the control store address can take, the ECS control store reads out the same microinstruction word. The signals [HOLDI and [HOLDE are set in accordance with the following Boolean expressions: [HOLDI=HOLD+TERMB (DREQ-IF-DIR)+HOLD REL wherein the state of signal CACHE HOLD corresponds to the state of signal CPSTOP, the states of signals TERMB (DREQ-IF-DIR) are binary ONES during control state FPOA when the cache command specifies an I fetch or direct operation and the signal HOLD REL is a binary ONE until switched to a binary ZERO by the generation of a microprogram release signal; and [HOLD E=[HOLD I.

As seen from FIG. 3c, signals corresponding to the I cycle control states are applied as inputs to a plurality of control flip-flops of block 704-104, decoder circuits of block 704-106, a number of control logic circuits of block 704-108 and to a plurality of control flag indicator flip-flops of block 704-110. It is also seen that the various indicator flip-flops of block 704-110 also receive microinstruction input signals via lines MEMD054-57 from execution control unit 701-4.

As seen from FIG. 3c, signals generated by the hardware control logic circuits 704-108 fall into one of three groups as a function of the units whose operations are being controlled. That is, the groups are instruction buffer control, hardware control and hardware memory control.

In each case, each group of signals are ored together with equivalent signals generated by other sources and then decoded. The other sources correspond to fields within the two different formats of the microinstruction word of FIG. 6a which are loaded into RCSR register 704-112 from the ECS output register 701-4.

One field corresponds to bits 32-83 of one format (large CU) and another field (short CU) corresponds to bits 32-41 of another format. These fields are decoded by a decoder 704-114 into the sets of bits indicated and combined within the decoders 704-116, 704-124, 704-126 and 704-128 as shown. Further decoding is done by the circuits of blocks 704-118, 704-135 and 704-120. The results of decoding such fields are either distributed throughout processor 700 or are stored in an RMEM register 704-130, an RSZ flip-flop 704-132, an FREQDIR flip-flop 704-136 and an FREQCAC flip-flop 704-134.

Additional decoding of the large and short CU fields and signals from the I cycle state circuits of block 704-112 is done via a decoder 704-106 and 704-107. The decoder 704-106 generates control signals for loading different ones of the registers and for enabling various multiplexer/selector switches within the processor 700. The decoder 704-107 operates to generate signals for setting and resetting a pair (RBASB) of base pointer B flip-flops 704-144. Other combinations of these signals are used to set and reset the descriptor number flip-flops of blocks 704-140 and 704-142.

As seen from FIG. 3c, the decoder 704-116 receives a control signal [EXH00 generated by the decoder circuits of block 704-117. These circuits receive signals from the RDESC register 704-140 and signals from the exhaust flip-flops of block 701-1. In accordance with the states of these signals, the circuits force signal [EXH000 to a binary ZERO to inhibit the generation of a cache memory command upon the occurrence of an exhaust condition. The signal [EXH000 is generated in accordance with the following Boolean expression:

[EXH000=DESCO·FE11+DESC1·FE2+DESC-2·FE3.

The flip-flop FNUM is normally set in response to the CCS-OP field of the microinstruction word. When set to a binary ONE, this indicates that the descriptor being processed in a numeric type.

The different flip-flops of block 704-104 will now be discussed in greater detail. In greater detail, the flip-flop FCHAR provides certain changes in the control of address generation. When the FCHAR flip-flop is set to a binary ONE during the processing of a load type instruction specifying character modification, then the contents of the RDI register is not changed under hardware contro. This allows the RDI register to be loaded with data under microprogram control prior to starting the pipeline. Also, if the FCHAR flip-flop is set to a binary ONE during a store type instruction specifying character modification, then the execution address for this instruction is modified under hardware control to point to a unique address of the microinstruction sequence in the ECS control store that is to process this type of instruction.

The flip-flop FDT-FOUR provides additional control on the readout of the address register (ZAR$_{0-19}$) of block 704-304. Flip-flop FADR-WD provides additional control for the ZDO switch 704-340. When this flip-flop is set to a binary ONE, then the ZAR position of the ZDO switch is forced to select a word address. The flip-flop FADR-B provides additional control for the ZDO multiplexer switch. When set to a ONE, then the ZAR position of the ZDO switch is forced to select a byte address. The flip-flop FNUM is normally set in response to the CCS-OP field of the microinstruction word. When set to a binary ONE, this indicates that the descriptor being processed is a numeric type. The flip-flop FIG-LEN provides additional control over the loading of registers within the unit 722 (length registers) and over memory operations. When set to a binary ONE, the RXP and RLN registers within unit 722 are not loaded from the RSIR register 704-154 during certain processor control states FPOP.

The FINH-ADR flip-flop inhibits the operation of the address preparation unit 704-3. When set to a binary ONE, an address cycle (FPOA/FPOP) consists of adding the contents of a temporary effective address register REA-T+ZERO. The register REA-T will have been loaded with the address prior to doing a FPOA/FPOP cycle. The FABS flip-flop enables the generation of absolute addresses. When set to a binary ONE, a 24-bit absolute address is used. As concerns the flag or indicator flip-flops of block 704-110, flip-flop FID when set to a binary ONE provides an indication that indirect address modification during an instruction is required on the descriptor loaded into the RSIR register.

The FRL flip-flop when set to a binary ONE indicates that the length is specified in a register associated with the instruction loaded into various instruction registers. The three flip-flops FINDA, FINDB and FINDC provide indications used in processing memory type instructions. Flip-flop FINDA is set to a binary ONE when length is specified in a register or when flip-flop FAFI is set to a ONE. Flip-flop FINDB is set to a binary ONE when the descriptor does not include nine bit characters. The flip-flop FINDC is set to a binary ONE when the descriptor does include six bit characters.

The FAFI flip-flop is set to a binary ONE when the processor circuits detect that indicator bit 30 of IR register 701-41 was set to a binary ONE during the execution of an EIS instruction indicative of a mid instruction interrupt (required to adjust pointer and length values because of interrupt). The FTRGP, TTNGO and FTRF-TST flip-flops are set to binary ONES in conjunction with transfer type instructions. More specifically, the FTRGP flip-flop provides a microprogram indication of being set to a binary ONE when the processor circuits detect the read out of a transfer type of instruction during the execution of an execute double (XED) or repeat (RPTS) instruction.

The FTNGO flip-flop provides a microprogram indication of being set to a binary ONE when the condition of transfer signalled by the execution control unit 701 was transfer NO GO (i.e., transfer did not take place). The output of this flip-flop is applied to the NO GO line of interface 604. The FTRF-TST flip-flop of this group indicates when set to a binary ONE that the previous instruction executed by processor 700 was a transfer type instruction and that the curret I cycle is to be executed conditioned upon the presence of a transfer GO (TRGO) signal from control unit 701.

Additionally, the circuits of block 704-110 include a number of flip-flops used in performing indirect addressing operations under hardwired control for other than EIS instructions. These include FIR, FIRT, FIRL and FRI flip-flops which are switched to binary ONES as functions of the different types of indirect address modifications required to be performed. For example, the FRI flip-flop signals a register then indirect address modification and is switched to a binary ONE when a register indirect (RI) indicator is a binary ONE. The FIR flip-flop is switched to a binary ONE when an indirect then register (IR) indicator is a binary ONE. This flip-flop signals the beginning of an indirect then register address modification. The FIRL flip-flop is switched to a binary ONE when an indirect then tally indirect (IT-I) indicator is a binary ONE. This flip-flop signals a last indirect operation. Another flip-flop TSX2 provides an indication used in processing transfer and set index instructions while a STR-CPR flip-flop is used during the processing of store instructions.

As seen from FIG. 3c, the output from the control flag flip-flops of block 704-110 are applied as inputs to the branch indicator circuits of block 701-1. Also, output signals from the control flag flip-flops are also applied as inputs to the I cycle flip-flops of block 704-102.

Register Section 704-150

As seen from FIG. 3c, the control logic unit 704-1 further includes a register section 704-150. This section contains the basic instruction register (RBIR) 704-152, the secondary instruction register (RSIR) 704-154, a base pointer A register (RBASA) 704-156 used for selecting one of the address registers RARO through RAR7 of block 704-304, a read index register A (RRDXA) 704-158 used for selection of index registers included within section 704-5 (not shown) and for selection of outputs from the ZDO multiplexer switch 704-340, a read index A save (RRDXAS) register 704-159, and a descriptor type register (RTYP) 704-160 indicating the type of data characters being pointed to by the descriptor value (e.g. 9-bit, 6-bit, 4-bit). The section 704-150 further includes a 1-bit instruction/EIS descriptor register designated R29 of block 704-162. The state of this bit in conjunction with the contents of the RBAS-A register 704-158 are used to select the particular address register used for address preparation. When register R29 of block 704-162 is set to a binary ZERO, this indicates that none of the address registers of block 704-304 are used during address preparation. The last registers of section 704-150 include the data in register (RDI) of block 704-164 and a read index register B (RRDXB) pointing to registers used by execution unit 714.

As seen from FIG. 3c, the RBIR register 704-152 is loaded via a two position switch 740-170 connected to receive signals from the sources indicated (i.e., a switch ZIB-B 704-172 and lines ZDI 0-35). The RSIR register 704-154 similarly receives signals from the ZDI lines and switch 704-172. The RBASA register 704-156 receives signals from the ZDI line 0-2 in addition to a further switch ZBASA of block 704-174. The RRDXA register and RTYP register receive signals from the ZDI lines as well as a switch 704-176 and 704-178 as shown. Also, the RRDXA register receives signals from the RRDXAS register 704-159.

The switch 704-172 is a two position switch which receives inputs from the switches ZIB and ZRESB from the cache unit 750 and execution unit 714 respectively. The switch 704-174 is a three input switch which receives two inputs from the execution units 714 and the output of the ZIB switch of cache unit 750.

Switch 704-176 is a four input switch which receives two of its inputs from the execution unit 714 and a single input from cache unit 750. The first position of the ZRDXA switch 704-176 selects the output of a ZRDXM switch 704-185. One position of this switch provides a tag field value from bit positions 5-8, 14-17, and 32-35 of the RBIR register 704-152 and bit positions 32-35 of the RSIR register 704-154 selected from ZIDD switch 704-180 and a two position ZMF switch 740-176.

The second position of switch 704-185 provides a constant value from the output of the ECS output register 704-1 (CCM field 32-34). The signals from the lines ZIDD 27-35 are applied as inputs to control flag flip-flops of block 704-110. The switch 704-178 receives an input from the control store 704-2, an input from cache unit 750 and an input from execution unit 714.

The data input register 704-164 receives a series of input signals from a ZIDD switch 704-180 which connects in series to a ZDIA switch 704-181 whose output provides one input of a further switch 704-182 which directly loads into the RDI register 704-164. The ZDIA switch 704-181 provides a further input to a three input switch 704-183 which receives the other inputs indicated from cache unit 750 and execution unit 714.

The ZIDD switch 704-180 receives an effective address via switch 704-186 from the address preparation unit 704-3 as well as inputs from the RBIR register 704-152, the RSIR register 704-154 and a two position ZMF switch 704-187. The positions 18 through 35 of the REA position of switch 704-180 are derived from the ZDIA switch 704-181 as shown. The ZDIA switch 704-181 receives signals from the ZDI lines 0-35, a constant value generated from the inputs to a first switch position in addition to signals from the output of the ZIDD switch 704-80 and the ZRESB switch in execution unit 714. The switch 704-182 receives the output of the ZDIA switch and signals from ZDI lines 0-35. The RRDXB register 704-189 is loaded by a three position switch 704-188. The switch receives via a first position signals from a RREG register included in the execution unit, a constant value from control store 701-2 via a second position and signals from the ZIDD switch via a third position.

The section 704-150 further includes a two position switch 704-185 and a scratchpad pointer register 704-186 whose output is used by the AACU 722 to form addresses for access to the scratchpad memory of the EU 714. The first switch position provides a constant value and is selected under hardware control (FPOA.$\overline{R29}$). The second switch position applies as an output the contents of the RBASA register 704-156. This position is selected under both hardware and microprogram control (i.e., FPOA.R29 or MISCREG field).

It will be appreciated that the required timing signals for operating section 704 as well as other sections of processor 700 and cache unit 750 are provided by centrally located clock circuits. For example, in the preferred embodiment of FIG. 1, the clock circuits are located within the input/output processor system. Such clock circuits can be considered as conventional in design and can comprise a crystal controlled oscillator and counter circuits. The timing or clocking signals from such clock circuits are distributed in a conventional manner to the various portions of the system of FIG. 1 for synchronized operation. From such timing signals, circuits within processor 700 derive additional clocking signals as required. This will be described in greater detail with respect to the cache unit 750 of FIG. 4.

Address Preparation Unit 704-1

The address preparation unit 704-3 includes a number of registers and adders. The registers include a number of base registers (i.e., TBASE0 through TBASEB) of block 704-300 used for storing descriptor values of an instruction, a pair of temporary effective address registers (TEAO, TEAL) and a pair of instruction counters (ICBA, ICBB) included within block 704-302 used for addressing the instruction buffer and eight address registers (RAR0 through RAR7) of 704-304 used during address preparation operations. The unit 704-3 also includes an instruction counter 704-310.

The adders include adder 704-312 used to update instruction counter 304-310 via switches 704-311 and 704-314 and a pair of adders 704-320 and 704-322. The adder 704-322 is used to generate an effective address value which is stored in a register 704-342 applied as an input of the control unit 704-1. The effective address is generated from a number of sources which include ZY switch 704-326 whose output is applied via a number of AND gates of block 704-327, selected address registers of block 704-304 or selected temporary address registers TEAO and TEAL of block 704-302 applied via another switch 704-328 or the index address signals ZX0-20 from unit 704-5. Additionally, adder 704-322 is used to update the contents of the instruction counter of the cache instruction buffer.

Figure 3D:
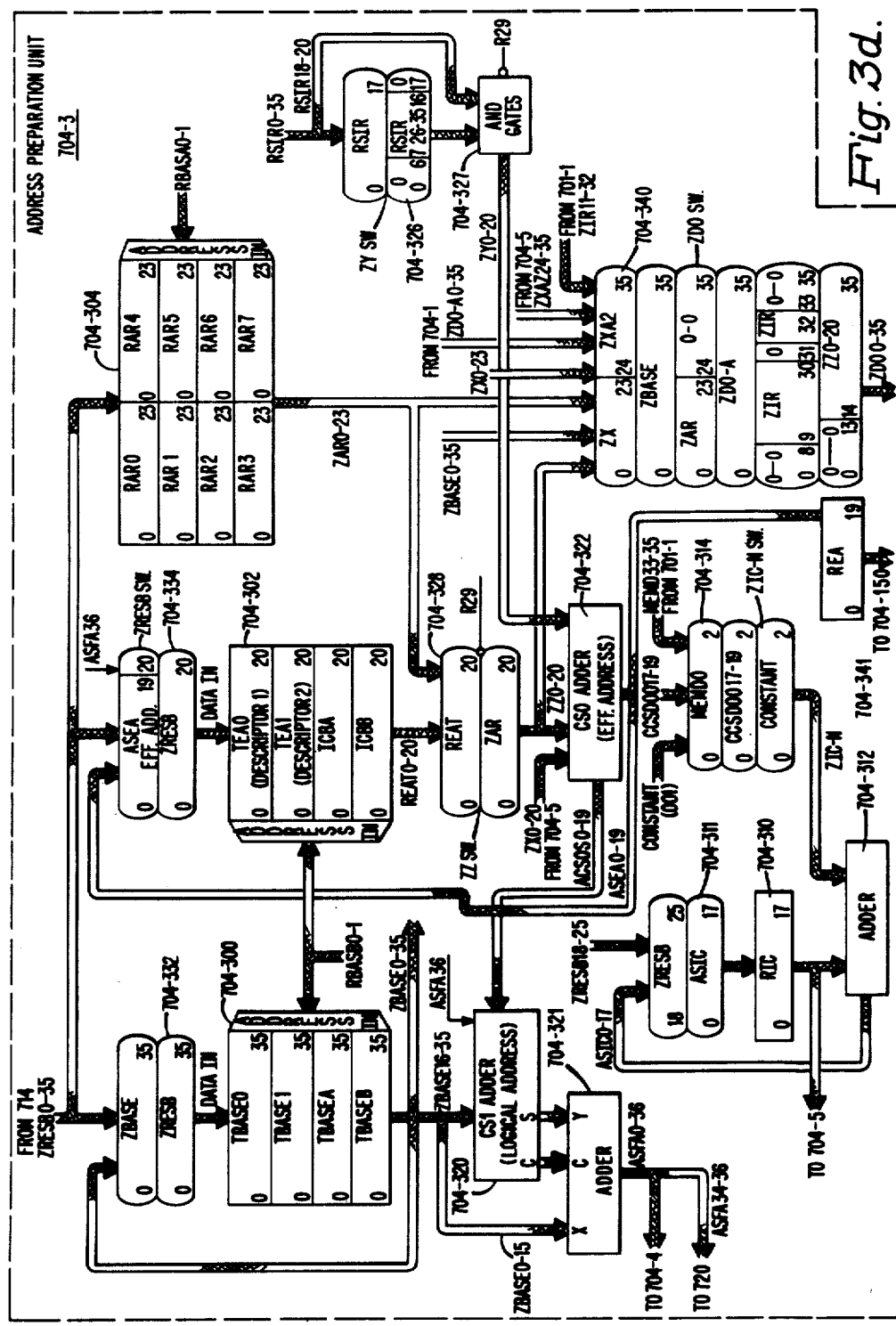
Figure 3A:
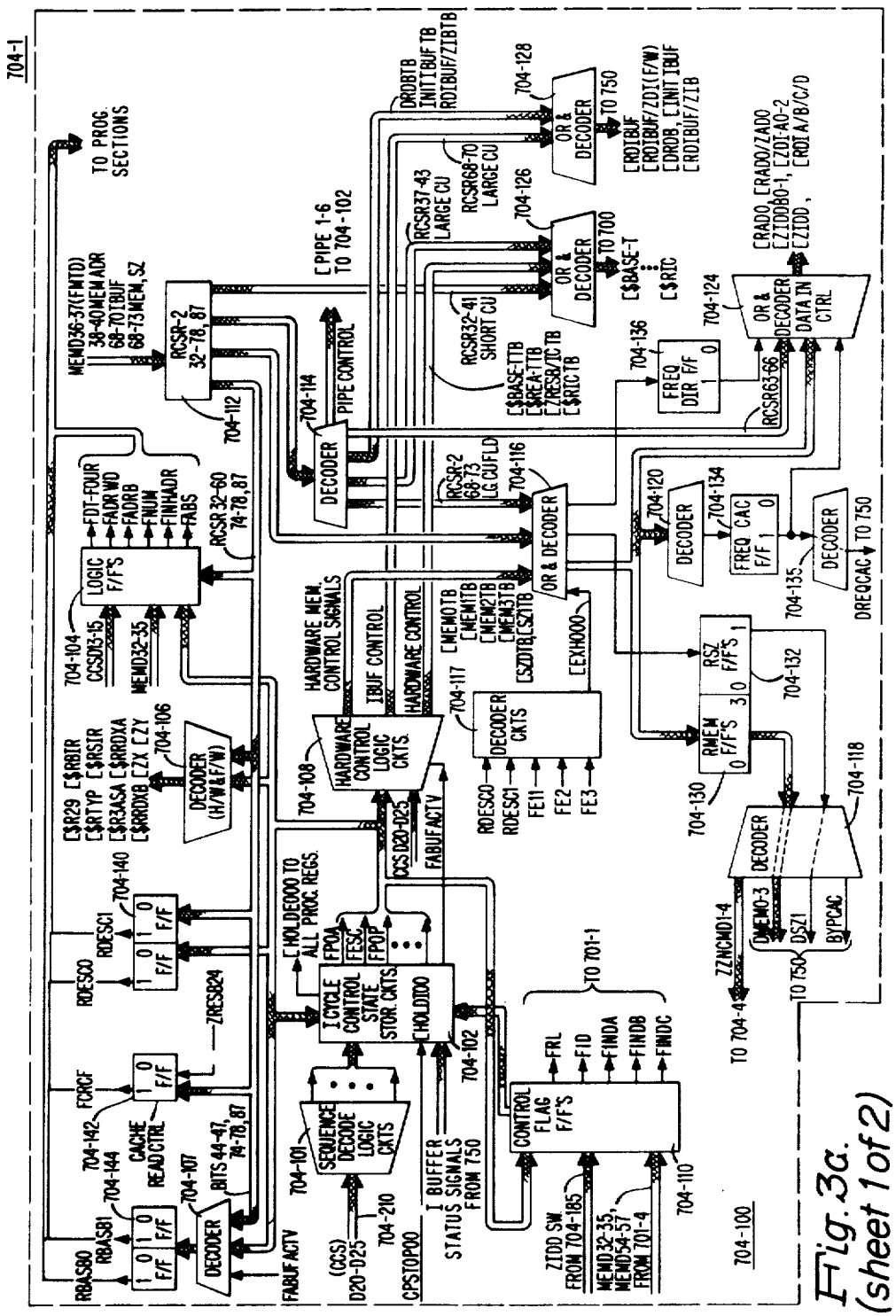

As seen from FIG. 3d, the outputs from adder 704-322 are also applied as an input to the adder 704-320. The adder 704-320 is used to combine base value stored in any one of the temporary base register TBASE0 through TBASEB with the address signals ACS0S0-19 from adder 704-322. The resulting bits are applied as an input to a further adder network 704-320 which generates a logical address which is applied to the lines ASFA0-36 via an adder 704-321. This adder sums the operand inputs together with the carry inputs from blocks 704-300 and 704-320. The effective address is used to obtain an absolute address when the system is operated in a paged mode. Since this operation is not pertinent to the present invention, it will not be discussed further herein. For further information regarding such address development, reference may be made to U.S. Pat. No. 3,976,978.

The temporary base registers of block 704-300 are loaded via a switch 704-332. The switch receives an input from the execution unit 714 and the output from block 704--300. The execution unit 714 applies further inputs to the registers of block 704-302 via a switch 704-334 as well as to the address registers of block 704-304. An output multiplexer (ZD0) switch 704-340 enables the selection of the various registers within the address preparation unit 704-3 and unit 704-5 for transfer of their contents to the execution unit 714 via lines ZDO 0-35. Also, the ZDO switch 704-340 enables the contents of various ones of the registers and control flip-flops of unit 704-1 to be read out via a fourth position (ZDO-A). The fifth position enables the states of various indicators within the control store circuits of block 701-1 to be selected for examination.

DATA/ADDRESS OUTPUT SECTION 704-4 FIG. 3e

The section 704-4 includes the registers and switches used for transferring commands and data to the cache 750. Such transfer operations normally require at least two cycles, one for sending an address and another for sending the data. Bits 5-8 of a command word are derived from the output of a four position switch 704-40. This switch receives a first constant value via a first position, the contents of a RZN register 704-42 via a second position, a second constant value via a third position and a third constant value via a fourth position.

Bits 1-4 of a command are applied by the circuits of block 704-1 to an OR gate circuit 704-44 together with bits 5-8. The OR gate 704-44 also receives via a ZADO switch 704-46 bits 1-8 of an RADO register 704-48. The RADO register 704-48 is an address and data out register which receives via a first position of a ZADOB switch 704-48 a logical (virtual) address from address preparation unit 704-3 via the lines ASFA0-35 and data output signals from the EU 714 via lines ZRESB0-35. The positions of the ZADOB switch 704-48 is under the control of the FMTD field for small CU format and the RADO field in the case of large CU format.

As seen from the Figure, either the ZZN1-8 bits or the ZADO bits 1-8 are applied as outputs to the RADO/ZADO lines as a function of the state of control signal [RADO-ZADO. Bits O and I are always binary ONES while bits 10-35 are furnished by the RADO register 704-46.

For additional information regarding the remaining sections of processor 700 as well as the sections of FIGS. 3a through 3e, reference may be made to the copending applications referenced in the introductory portion of this application.

CACHE UNIT 750 - FIG. 4

General Description

The cache unit 750 is divided into five primary sections: a transit buffer and command queue section 750-1 a cache section 750-3, a directory and hit control section 750-5, an instruction buffer section 750-7 and an instruction counter section 750-9.

TRANSIT BUFFER AND COMMAND QUEUE SECTION 750-1

The transit buffer and command queue section 750-1 includes as major elements a four word write command buffer 750-100 and a four word transit block buffer read command buffer 750-102 which are addressed via a pair of counter circuits 750-104 and 750-106 in addition to a command queue 750-107 with associated in and out address pointer and compare circuits of blocks 750-108 through 750-110. The write buffer 750-100 provides storage for two write single or one write double command while the transit block 750-102 provides storage for up to four read type commands. The transit block buffer 750-102 also stores information associated with such read commands used in controlling the writing of memory data words into assigned areas (i.e., levels) of cache section 750-3. The four registers allow up to four memory reads to be in progress at any given time.

Section 750-1 also includes a control section 750-112. This section includes sets of different control circuits such as the command decoder and control circuits of blocks 750-113 and 750-114, the interface control circuits of blocks 750-115 and 750-116 and hold control circuits of block 750-117.

The circuits of blocks 750-113 and 750-114 decode the signals applied to the DMEM lines representative of commands transferred by processor 700 via the RADO/ZADO lines of interface 604 and generate the control signals for making entries in the command queue 750-107, incrementing and setting values into the in pointer and out pointer circuits of blocks 750-108 and 750-109. Also, the circuits generate control signals for storing commands into either write buffer 750-100 or transit block buffer 750-102.

The interface control circuits of blocks 750-115 and 750-116 geneiate signals for controlling the transfer of data signals received from SIU 100 into section 750-7 and for commands including the transfer of such commands to the SIU respectively. The hold circuits of block 750-117 which receive signals from decoder circuit 750-113 generate control signals for holding the execution of commands in appropriate situations (e.g. directory section busy) and controlling the loading of data into section 750-7.

As seen from FIG. 2, the transfer of write command control words proceed from buffer 750-100 via the third position of four position (ZDTS) switch 750-118, a data register 750-119 and the first position of two position switch 750-120. The write data words are transferred from buffer 750-100 to SIU 100 via a write data register 750-121 and the second position of switch 750-120. The RWRT position of switch 750-120 is selected for one (write single command) or two (write double command) clock intervals following receipt of a signal from SIU 100 via the ARA line made in response to a signal placed on line AOPR by cache 750 for transfer of the write command. Read commands are transferred from the read command portion of transit block buffer 750-102 to SIU 100 via the fourth position (ZTBC) of the ZDTS switch 750-118, register 750-119 and the first position of switch 750-120.

The multiport identifier lines MITS receive zone bit signals via a RMITS register 750-124 and a two position switch 750-125 for the second data word in the case of a write double command. As seen from the Figure, this switch receives signals from command queue 750-107 and processor 700. That is, when cache 750 issues a read command, transit block number signals from queue 750-107 are loaded into bit positions 2 and 3 of RMITS register 750-124.

The transit block number signals are returned by SIU 100 on the MIFS lines with the read data word. These signals are loaded into an RMIFS register 750-127 via a multiposition switch 750-126. Thereafter, the contents of bit positions 2 and 3 are applied via the first position of a two position switch 750-128 to a pair of address input terminals of transit block buffer 750-102. A second RMIFSB register 750-129 primarily provides temporary storage of the transit block number signals for multiword transfers (i.e., quad read commands).

The output signals from switch 750-128 are also applied to the control input terminals of a four position ZTBA switch 750-130 for selecting the appropriate address signals to be applied to cache section 750-3 for storage of the data words. The address contents of the transit block buffer 750-102 are also applied to one set of input terminals of a predetermined one of a group of compare for circuits 750-132 through 750-135 for comparison with the address portion of a next command applied to a second set of input terminals of the comparator circuits via the RADO/ZADO lines. The result of the comparisons generated by a NAND gate 750-136 is applied to the hold control circuits of block 750-117.

As seen from FIG. 4, the zone bit signals of the ZAC commmand applied to the ZADOB lines 5-8, in the case of a write single command, or for the even word of a write double command, are loaded into a RZONE register 750-140 when the write command is loaded into write command data buffer 750-100. The output of RZONE register 750-140 is applied to the first position of a two position ZONE switch 750-114. The zone bit signals, applied to the lines DZD0-3 by processor 700 for the odd word of a write double command are loaded into a RDZD register 750-142. The output of RDZD register 750-142 is applied to the second position of ZONE switch 750-144. The output signals ZONE0-3 are applied to the circuits of section 750-9 for controlling the writing of processor data into cache 750-300 as explained herein.

CACHE SECTION 750-3

The section 750-3 includes a cache store 750-300 having 8192 (8K) 36-bit word locations organized into 128 sets of eight, eight word blocks. The unit 750-300 is constructed from bipolar random access memory chips, conventional in design.

The cache storage unit 750-300 is addressed by a 10-bit address RADR 24-33 applied via any one of a number of 4×4 crossbar switches (e.g. 750-302a), conventional in design and the address registers associated therewith. As seen from the Figure, the crossbar switch receives address signals from several sources which include section 750-5, ZTBA switch 750-130 and section 750-7. The address signals appearing at the output of the crossbar switch are temporarily stored in the associated address register and applied to the address input terminals of cache storage unit 750-300.

During a write cycle of operation, the four sets of write control signals (WRT00100-WRT70100 through WRT03100-73100) generated by section 750-9, are applied to the cache storage unit 750-300 and are used to apply or gate clocking signals to the write strobe input terminals of the memory chips. This enables from one to four bytes of either a processor 700 data word from the ZADO/RADO lines or a memory data word from section 750-7 to be written into the addressed one of eight levels of cache storage unit 750-300. For processor data, the write signals are generated by decoding signals ZONE0-3 from switch 750-144. For memory data words, all of the zone signals are forced to binary ONES.

The appropriate level is established by the states of signals RTBLEV0100-2100 from transit block buffer 750-102 when writing memory data and by the hit level detected by directory circuits of block 750-512 when writing processor data. These signals are decoded by a decoder circuit 750-303 when enabled by a signal ENB-MEMLEV100 from section 750-9.

During a read cycle of operation, the 36-bit word of each of the eight blocks (levels) is applied as an input to a 1 of 8 ZCD switch 750-306. The selection of the appropriate word is established by the states of a set of hit level signals ZCD010-210 generated by section 750-5. These signals are applied to the control input terminals of ZCD switch 750-306.

As seen from the Figure, the selected word is applied to a pair of registers 750-308 and 750-310, a 1 of 8 ZDI switch 750-312 and a 1 of 4 ZIB switch 750-314. The RIRA and RIRB registers 750-308 and 750-310 apply their contents to different positions of the ZIB and ZDI switches 750-312 and 750-314. The ZIB switch 750-314 selects instructions which are applied to the instruction bus (ZIB) of processor 700 while the ZDI switch 750-312 selects data or instructions which are applied to the data in bus (ZDI) of processor 700.

In addition to applying instruction word signals read out from cache 750-300, the ZIB switch 750-314 also applies instruction word signals received from section 750-7 to processor 700. The ZDI switch 750-312 also applies data signals received from the ZCDIN switch 750-304 and section 750-7 to processor 700. The states of the control signals [ZIB010-110 and [ZDI010-210 applied to the control input terminals of switches 750-314 and 750-312 select the sources of instructions and data words to be transferred to processor 700 by such switches. The control signals are generated by the circuits of section 750-9.

In greater detail, the [ZIB010-110 signals are coded to select position #2 of switch 750-314 for a first instruction transfer in response to the detection of a directory hit for an I fetch 1 command or a directory hit for an I fetch 2 command following an I fetch 1 command to the last word in a block. The control signals are coded to select the RIRA position #1 for subsequent instruction transfers following a directory hit generated in response to an I fetch 1 or I fetch 2 command.

Where the I fetch 1 or I fetch 2 command results in a directory miss, the [ZIB010-110 signals are coded to select position #3 of ZIB switch 750-314 for transfer of instruction words received from section 750-7.

As concerns the ZDI switch 750-312, the ZCD position #1 is selected in response to the detection of directory hits and signals applied to the RDIBUF/ZDI line in response to a directory hit generated for a LDQUAD command. Memory data words are transferred to processor 700 via the ZDIN position #3 of the switch 750-312 following a directory miss. Following holding processor 700 for an instruction fetch from main memory, the signals [ZDI010-210 are coded to select the ZDIN position of switch 750-312 for transfer of the first instruction upon its receipt by section 750-7. The remaining instructions are transferred via ZIB switch 750-314.

The ZCDIN position #2 of switch 750-312 is used for diagnostic purposes to transfer signals from the ZADO-B/RADO lines. The remaining positions of ZDI switch 750-312 are used for display purposes (i.e., positions RIRB, ZRIB and RIRA). Also, position RIRB is selected to transfer data words to processor 700 in the case of a LDQUAD command when there is a directory hit.

DIRECTORY AND HIT CONTROL SECTION 750-5

This section includes an eight level control directory 750-500 and eight level set associative address directory 750-502. The directory 750-502 contains 128 locations, each location containing a 14-bit associative address for each level. A four position ZDAD switch 750-530 provides the random access memory (RAM) addresses for addressing directories 750-500 and 750-502 in addition to cache storage unit 750-300.

During a directory search cycle of operation, switch 750-530 under the control of signals SELZDADC0100-1100 generated by circuits within a block 750-526 selects RAD0 position 0. This applies the 14-bit address signals of a ZAC command from lines RAD0 24-33 from processor 700 to the output terminals of the ZDAD switch 750-530. These signals are applied to the address input terminals of directories 750-500 and 750-502. During the search cycle, the contents of eight block/level addresses are read out and applied as one input of each of a group of eight comparator circuits 750-536 through 750-543. Each comparator circuit compares its block/level address with bits 10–23 of the ZAC command to determine a hit or miss condition. The results generated by the circuits 750-536 through 750-543 are applied to corresponding inputs of a group of AND gates 750-545 through 750-552. Each comparator circuit is made up of four sections, the results of which are combined in one of the AND gates 750-545 through 750-552. The final result hit signals ZHT0100 through ZHT7100 are applied as inputs to hit/miss network circuits of block 750-512 as explained herein.

The ZAC address signals are also saved in an RDAD register 750-532 when no hold condition is detected (i.e., signal [HOLD-DMEM from 750-112 is a binary ZERO). During the directory assignment cycle following the search cycle which detected a miss condition, signals SELZDADC0100-100 select RDAD position 1 of ZDAD switch 750-530. Also, a RDRIN register 750-534 is loaded with the 14-bit associative address signals from the ZADO-B lines 10-23 when the directory search cycle is completed for writing into the directory 750-502.

The control directory 750-500 also includes 128 locations, each having a predetermined number of bit positions for storing control information. Such information includes the full-empty (F/E) bits for the eight levels and a round robin (RR) count bits in addition to parity check bits (not shown).

The full-empty bits indicate whether the particular directory addresses have any significance (i.e., are valid). For a cache hit to occur, the F/E bit must be set to a binary ONE. A binary ZERO indicates the presence of an empty block or portion thereof. The round robin bits provide a count which indicates which block was replaced last. This count when read out via one of the two sets of AND gates of block 750-504 into a register 750-506, is normally incremented by one by an increment adder circuit 750-508. The resulting signals NXTRR0-RR2 are written into directory 750-500 to identify the next block to be replaced.

As seen from the Figure, the F/E bit contents of the location are read out via the positions of a two position ZFER selector switch 750-506 and applied as inputs to the directory hit/miss and hit control circuits of block 750-512. The ZFER switch 750-506 selects which half of a group of F/E bits are to be used by the circuits of block 750-512 for a hit/miss indication and which half of the group of F/E bits are to be used by such circuits for an alternate hit determination. An address bit signal ZDAD31 controls the selection of switch positions.

The circuits of block 750-510 include a multisection multiplexer circuit which generates the output signals FEDAT0100 and FEDAT1100 as a function of the hit and miss data pattern. Accordingly, these signals are set in response to the ALTHIT signal from the circuits of block 750-512. A pair of decoder circuits 750-520 and 750-521 operate to decode the level information signals ZLEV0100-2100 for generating appropriate sets of write enable strobe signals R/WFE010-210 and R/WLV010-710 for control directory 750-500 and address directory 750-502. Thus, level (ZLEV) switch 750-522 operates to control the level at which F/E bits are set or reset and the level in the address directory 750-502 at which new addresses are written during a directory assignment cycle of operation.

As seen from the Figure, the first position of ZLEV switch 750-522 when selected, applies to its output terminals signals OLDRR010-210 from directory 750-500. The second position of switch 750-522 when selected applies to its output terminals signals RLEVR0-R2 from a level register 750-524. The level register 750-524 is used to save the last set of hit level signals generated by the hit/miss level network circuits of block 750-512. This permits the hit level value to distribute to other sections of cache 750 for subsequent use (i.e., signals RHITLEV0-2).

The third position of switch 750-522 when selected applies to its output terminals, signals LEVR0-R2 generated by the circuits of block 750-512. The switch 750-522 is controlled by signals from control flip-flops included within block 750-526 (i.e., signals FBYPCAC and DIRBUSY). As seen from the Figure, the complements of the level signals stored in register 750-524 corresponding to signals RHITLEV010-210 are applied via a group of AND gates to control circuits within section 750-9.

During the search cycle of operation, the hit/miss level network circuits detect which level, if any, contains an address which matches the ZAC address. In the case of a match, it forces signal RAWHIT100 to a binary ONE and generates therefrom the sets of hit level signals ZCD010-210 and HITLEVC7010-7210 through an encoding circuit. The signals are generated in accordance with the states of the F/E bit signals ZFE010-710. That is, for a cache hit to occur at a given level, the F/E bit must be a binary ONE. As mentioned above, a binary ZERO indicates the presence of an empty block level. Each encoder circuit includes AND/OR gating circuits, conventional in design which generate the level signals in accordance with the Boolean expression L $i=_{e=0}^{2}|E_{j=0}$ ZHTj·ZFEj. Additionally, the signals ZCD010-210 also may be generated from the level signals ZNICLEV000-2100 provided by section 750-9 during instruction fetches.

The block 750-512 also includes an alternate hit network which can also be used in the assignment of an eight word block by generating an alternate hit signal ALTHIT100 and a set of signals ALTHITLEV0100-2100 for loading into register 750-504 in place of the round robin assignment signals C7RR0100-2100. For the purpose of the present invention, such arrangements can be considered conventional in design. Reference may be made to U.S. Pat. No. 3,820,078 listed in the introductory portion of this application.

As seen from the Figure, the circuits of block 750-512 generate other hit signals HITTOTB100, HITTOC7100 and HITTOIC100. These signals are derived from signal RAWHIT100 in accordance with the following Boolean expressions:
1. HITTOC7100 = RAWHIT100·BYPCAC000.
2. HITTOIC100 = HITTOC7100.
3. HITTOTB100 = RAWHIT100·BYPCAC000+-PRERD100·BYPCAC100.

The circuits of block 750-512 receive the cache bypass signals BYPCAC000 and BYPCAC100 from block 750-526. As mentioned, this block includes a number of control state flip-flops which generate signals for sequencing the section 750-5 through various required operations for the processing of the various types of commands. Additionally, block 750-512 includes logic circuits for generating required control signals during such operations. For the purpose of the present invention, these circuits may be implemented in a conventional manner. Therefore, in order to simplify the description herein, only a brief description and the Boolean expressions will be given for certain control state flip-flops and control logic circuits as required for an understanding of the operation of the present invention.

CONTROL STATE FLIP-FLOPS

The FJAM1 flip-flop is set in response to a hit condition at the end of a directory search cycle for a read double command. The flip-flop holds the lower address bits in register(s) 750-32 enabling the accessing of the second word from cache storage unit 750-300 in the case of a read double command. Also, the flip-flop is set in response to a write single command to cause the selection of the RDAD position of the ZDAD switch 750-530 for providing or causing the same address to be applied to cache storage unit 750-500 for one more clock interval or cycle. In the absence of a hold condition (signal [HOLDDMEM = 1), the FJAM1 flip-flop remains set for one cycle in accordance with the following Boolean expression: SET = FJAM1 = REQCOMB·RAWHIT·BYPCAC·(RDDBL+WRTSNG)-+HOLDDMEM·FJAM2+HOLDDMEM·FJAM1.

The FJAM2 flip-flop is set in response to a hit condition at the end of a directory search cycle for a write double command. The setting of the FJAM2 flip-flop causes the setting of the FJAM1 flip-flop at the end of the next clock interval. The control state of the FJAM2 flip-flop together with the FJAM1 flip-flop causes the selection of the RDAD position of ZDAD switch 750-530 for providing the proper address for writing data into cache storage unit 750-300.

The FJAM2 flip-flop also remains set for one cycle in accordance with the following Boolean expression: SET = FJAM2 = REQCOMBO·RAWHIT·BYP-CAC·WRTDBL+HOLDDMEM·FJAM2.

A flip-flop NRMPTC1 directly controls the ZDAD switch 750-530 and is set in accordance with the states of signals generated by the other control state flip-flops.

The NRMPTC1 flip-flop normally remains set for one cycle in accordance with the following Boolean expression:
SET = NRMPTC1 = (WRTDBL·REQCOMBO·RA-WHIT·BYPCAC) + FJAM2 + SETFJAM1 + REQ-COMBO·(RDTYPE·BYPCAC+RDTYP·RA-WHIT)·(FJAM1·FJAM2+HOLD).

The FDIRASN flip-flop specifies a directory assignment cycle of operation wherein associative address entry is written into address directory 750-500 in the case of miss conditions or cache bypass operations for read type commands.

The FDIRASN flip-flop is set for one cycle in accordance with the following Boolean expression: SET = -FDIRASN = REQCOMBO·RDTYP·(BYPCAC·RA-WHIT).

The FICENAB flip-flop enables the loading of the instruction register and is set for one cycle in response to a ↓ T clock pulse in accordance with the following Boolean expression. SET = FHT100.

The FRCIC flip-flop is set for one cycle in response to a ↓ T clock pulse in accordance with the following Boolean expression. SET = FJAMZNICLEV.

CONTROL LOGIC SIGNALS

1. The ALTHIT signal indicates the presence of a psuedo hit condition.
   ALTHIT = ALTLEV0 + ALTLEV + . . . ALTLEV7.
2. The signals ALTHITLEV0, ALTHITLEV1 and ALTHITLEV2 provide a three bit code which specifies the level at which a psuedo hit condition occurred. The signals are coded as follows:
   a. ALTHITLEV0 = ALTLEV4 + ALTLEV5-+ALTLEV6 + ALTLEV7.
   b. ALTHITLEV1 = ALTLEV2 + ALTLEV3-+ALTLEV6 + ALTLEV7.
   c. ALTHITLEV2 + ALTLEV1 + ALTLEV3-+ALTLEV5 + ALTLEV7.
3. The signals ALTLEV0 through ALTLEV7 indicate which one of the eight levels, if any, has detected a psuedo hit condition.

a. $ALTLEV0 = ZHT0 \cdot \overline{ZFE0}.$ b. $ALTLEV7 = ZHT7 \cdot \overline{ZFE7}.$ 4. The DIRADDE signal is an enabling signal for decoder 750-521 which allows the generation of write strobe signals applied to address directory 750-500.
   DIRADDE = $\overline{NOGO}$·FDIRASN.
5. The DIRBUSY signal indicates when the directories 750-500 and 750-502 are busy.
   DIRBUSY = FLSH + FJAM2 + FJAM1 + -FDIRASN.
6. The FEDCODE signal is an enabling signal for decoder 750-520 which allows the generation of write strobe signals applied to control directory 750-500.
   FEDCODE = FDIRASN·$\overline{NOGO}$.
7. The FORCEBYP signal enables a cache bypass operation to take place.
   FORCEBYP = FSKIPRR + FBYPCAC.
8. The GSRCH signal indicates when a search cycle of operation is to take place.
   GSRCH = $\overline{RDDBLZCDE}$·FICENAB·FRCIC.
9. The signals HITLEVC70, HITLEVC71 and HITLEVC72 provide a 3-bit code which specifies the level at which hit condition has occurred.
   a. HITLEVC70 = HITLEV4 + HITLEV5 + HITLEV6 + HITLEV7.
   b. HITLEVC1 = HITLEV2 + HITLEV3 + HITLEV6 + HITLEV7.
   c. HITLEVC72 = HITLEV1 + HITLEV3 + HITLEV5 + HITLEV7.

10. The signals HITLEV0 through HITLEV7 indicate which one of the eight levels, if any, has detected a hit condition.

a. $HITLEV0 = ZFE0 \cdot ZHT0$.

b. $HITLEV7 = ZFE7 \cdot ZHT7$.

11. The RAWHIT signal indicates the detection of a hit condition.
    RAWHIT=HITLEV0+...+HITLEV7.
12. The HITTOC7 and HITTOIC signals each indicates the detection of a hit condition to certain circuits within section 750-9.
    HITTOC7=HITTOIC=RAWHIT·$\overline{BYPCAC}$.
13. The HITTOTB signal indicates the detection of a hit condition or a pre-read command when in the bypass mode to the transit block buffer circuits.
    HITTOTB=RAWHIT·$\overline{BYPCAC}$+PRERD·BYPCAC.
14. The LDRAD signal enables the loading of the RDAD register 750-532.
    LDRDAD=$\overline{HOLDDMEM}$.
15. The LDRDRIN signal enables the loading of RDRIN register 750-534.
    LDRDRIN=$\overline{FDIRASN}$.
16. The signal RDDBLZCDE is used to enable the ZCD switch 750-306 in the case of a read double command.
    RDDBLZCDE=$\overline{FICENAB}$·(FDIRASN+FJAM1+FJAM2).
17. The REQCOMBO signal indicates the presence of a cache request.
    REQCOMBO=$\overline{NOGO}$·$\overline{HOLDDMEM}$·[$\overline{CANCELC}$·DREQCAC.
18. The ZCD0, ACD1 and ZCD2 signals are used to control the operation of the ZCD switch 750-306.

a. ZCD0=ZCDL4+ZCDL5+ZCDL6+ZCDL7+ZNICLEV0. ZCDICENAB+RDDBLLO.

b. ZCD1=ZCDL2+ZCDL3+ZCDL6+ZCDL7+ZNICLEV1. ZCDICENAB+RDDBLL1.

c. ZCD2=ZCDL1+ZCDL3+ZCDL5+ZCDL7+ZNICLEV2. ZCDICENAB+RDDBLL2
    wherein the term(s) ZCDLi is ZCDLEVi.
19. The ZFEDATWT1 signal is a data write strobe signal used for writing F/E bit signals FEDAT0100 and FEDAT1100 into directory 750-500.
    ZFEDATWT1=FDIRASN·ZDAD31.
20. The FEDAT0100 signal corresponds to the first full/empty bit.
    FEDAT0100=FBYPCAC000+FALTHIT100.
21. The FEDAT1100 signal corresponds to the second full/empty bit.
    FEDAT1100=FALTHIT100+FBYPCAC000.
22. The SELZDADC1 signal controls the operation of the ZDAD switch 750-530.
    SELZDADC1=NRMPTC1.
23. The RWRR signal is a round robin write signal used for writing the RR bit signals back into directory 750-500.
    RWRR=FDIRASN·$\overline{NOGO}$·$\overline{SCLOCK}$.

It will be seen from the Figure that the different decoded command signals are generated by a decoder circuit 750-528 in response to the signals applied to the DMEM lines 0–3 by processor 700. The decoder 750-528 is enabled by a signal from the DREQCAC line. The decoded command signals (e.g. WRTDBL, WRTSNG, PRERD, RDTYPE) together with other control signals such as [HOLDDMEM, FSKIPRR00 and those from the lines [CANCELC and BYPCAC are applied as inputs to the circuits of blocks 750-526.

INSTRUCTION BUFFER SECTION 750-7

This section receives memory data and instructions from the DFS lines which are transferred to processor 700 via the ZDI switch 750-312 and ZIB switch 750-314 respectively. The memory signals are loaded into an RDFS register 750-702 via one position of a two position switch 750-700.

Memory data fetched as a result of a miss condition upon receipt applied to the ZDI switch 750-312 via the RDFS position #0 of a 1 of 4 position (ZDIN) switch 750-708. In the case of a load quad command, memory data is loaded into the 4 location (LQBUF) buffer 750-706 when the [LQBUF signal is forced to a binary logical ONE. The write/read address signals [WRTBUF010-110/[RDBUF010-110 from section 750-112 control the writing and reading of data into and from the locations of buffer 750-706.

The memory data stored in the LQBUF buffer 750-706 is then transferred to the ZDI via the RLQBUF position #2 of the ZDIN switch 750-708.

In the case of a read double command, the even word of the pair is transferred into a REVN register 750-710. Thereafter, the even word is transferred to the ZDI switch 750-312 via position #1 of ZDIN switch 750-708 for execution of a read double odd command request or upon receipt of a RD-EVEN signal from processor 700.

As seen from the Figure, each memory data word is also loaded in the RDFSB register 750-712 and thereafter written into cache storage unit 750-300 via the ZCDIN switch 750-304 at the level specified by the contents of the RADR register 750-32.

In the case of instruction transfers, each instruction received from memory is loaded into one of the 4 storage locations of a specified one (IBUF1/IBUF2) of a pair of instruction buffers 750-715 and 750-717. The IBUF1 and IBUF2 buffers 750-715 and 750-717 are used to buffer up to two four word blocks that can be accessed from memory in response to I fetch 1 or I fetch 2 commands from which a miss condition has been detected.

The instructions are written into the location of one of the IBUF1 and IBUF2 buffers 750-715 and 750-717 specified by signals [WRTBUF0100-1100 under the control of write strobe signals [IBUF1/[IBUF2. Read control signals [RDBUF0100-1100 enable the read out of such instructions for transfer to processor 700 whenever the IBUF1 or IBUF2 location specified by the signals [ZEXT0100-1100 contains an instruction. The instruction is transferred to processor 700 via positions 1 or 2 of a two position switch 750-720 and the ZRIB switch position of the ZIB switch 750-314.

The IBUF1 and IBUF2 buffers 750-715 and 750-717 apply output valid signals IBUF1V100 and IBUF2V100 to IBUFREADY circuits of block 750-722. These circuits force IBUFRDY line to a binary ONE indicating that there is at least one instruction in the I buffer being addressed (current instruction block). As seen from the Figure, the IBUFREADY circuits receive input signals (e.g. USETBRDY, IFETCHRDY) from control circuits within section 750-9.

INSTRUCTION COUNTER SECTION 750-9

This section stores cache address signals (24-33) for indicating the next instruction to be accessed, in one of two instruction address registers (RICA/RICB) 750-900 and 750-902. The cache address signals 24-33 are loaded into the instruction register RICA/RICB not being used when an IFETCH1 command is received from processor 700. The cache address is transferred via the RADO position of ZDAD switch 750-530 and a ZDAD position #0 of a 4 position ZICIN switch 750-904.

Each time processor 700 accesses an instruction, the contents of the instruction register RICA/RICB read out via one position of a two position ZIC switch 750-906 is incremented by one via an increment circuit 750-908. The incremented contents are returned to the instruction register RICA/RICB via the RNIC position #1 of ZICIN switch 750-904.

As seen from the Figure, each instruction register stores two level fields for fetching first and second blocks of instructions in response to IFETCH1 and IFETCH2 commands. The two pairs of level field signals are applied to the different switch positions of a 4 position crossbar switch 750-910. The selected level signals ZNICLEV0100-2100 applied as inputs to block 750-512 are used to control the operation of ZCD switch 750-306 for accessing the instructions specified by the instruction register RICA/RICB. The level field signals correspond to signals HITLEVC70100-2100 which are generated by the circuit of block 750-512. These signals are loaded into one of the instruction registers following a directory assignment cycle of operation.

In addition to the level field signals, the RICA and RICB instruction address registers store other signals used for various control purposes which will be discussed herein to the extent necessary.

The incoming cache address signals from the ZDAD switch 750-530 is incremented by one via another increment circuit 750-912. The incremented address signals are loaded into the RICA/RICB instruction register via the INC position #3 of ZICIN switch 750-904. The least significant two bit 32-33 of the cache address provide the IBUF1 or IBUF2 address (i.e., signals ZEXT0100-1100) to read out instruction blocks accessed from memory.

It will be noted that the pair of level field signals LEV1 and LEV2 from other outputs of switch 750-910 are applied as inputs to a pair of comparator circuits 750-912 and 750-914. The circuits 750-912 and 750-914 compare the level signals LEV1 and LEV2, of the current instruction block from switch 750-910 with the input level signals C7RR0100-2100 corresponding to the round robin count for the next available block. Also, the comparator circuit 750-912 receives as inputs memory level signals RTBLEV0100-2100 and instruction level signals ZNICLEV0100-2100 from swtich 750-910 for comparison in addition to level signals ZIC0100-2100 for comparison with signals C7RR0100-2100. The cache address signals are incremented by 4 by an increment circuit 750-918 and applied as an input to the round robin skip control circuits of block 750-916. These circuits receive as another pair of inputs the input cache address signals 24-30 from ZDAD switch 750-530 and the cache address signals of the current instruction block from ZIC switch 750-906 for comparison by circuits included therein.

The results of the pairs of cache address signals and level signal comparison are combined within other circuits within the round robin skip control circuits of block 750-916. The circuits of block 750-916, in response to decoded signals from a decoder circuit 750-922, generate output control signals which avoid addressing conflicts. For a further discussion of the operation of such circuits, reference may be made to the copending application of Marion G. Porter, et al titled "Cache Unit Information Replacement Apparatus" referenced in the introduction of this application.

The output control signals from block 750-916 are applied as inputs to the circuits of IC control block 750-920. Additionally, the control circuits of block 750-920 receive the results of the decoding of command signals applied to the DMEM lines by the decoder circuit 750-922 when it is enabled by a signal from the DREQCAC line. Together with the other signals from sections 750-1 and 750-5 are applied to block 750-920, the control circuits of block 750-920 generate address and control signals for sequencing section 750-9 through the required cycles of operation for processing certain types of commands (e.g. IFETCH1, IFETCH2, and LDQUAD commands).

The block 750-920 includes a number of control state flip-flops and logic circuits for generating the required control signals. For the same reasons mentioned in connection with section 750-5, only a brief description and the Boolean expressions will be given for certain state flip-flops and control circuits.

CONTROL STATE FLIP-FLOPS

FABCURLEV1 flip-flop defines the current level for the RICA/RICB instruction register. This flip-flop is set and reset in response to a T clock timing signal in accordance with the following Boolean expressions. The set condition overrides the reset condition. When FA/FBCURLEV is a binary ZERO, it selects level 1 and when a binary ONE, it selects level 2.

SET = DECODEIF1·F − $\overline{\text{PPIMEIS}}$·[$\overline{\text{HOLDD-MEM}}$·[$\overline{\text{CANCELC}}$. ZDAD08·ZDAD0-9·HIT·FACTVRIC100/000 + ZEXTO. ZEXT1·R-DIBUF·HOLDEXECRDIBUF·FA/FBCUR-LEV000. $\overline{\text{DECODELDQUAD}}$·FL-DQUAD·$\overline{\text{DECODEEIS}}$·FACTVRIC100/000. $\overline{\text{NOGO}}$ + ZEXTO·ZEXT1·FLDQUAD·R-DIBUF·$\overline{\text{HOLDEXECRDIBUF}}$·FACTVRIC100/0-00·$\overline{\text{NOGO}}$.

RESET = DECODEIF1·$\overline{\text{FFPIMEIS}}$·[$\overline{\text{HOLDD-MEN}}$·[$\overline{\text{CANCELC}}$. FACTVRIC100/000-+$\overline{\text{DECODELDQUAD}}$·[HOLDDMEM. [CAN-$\overline{\text{CELC}}$·FACTVRIC100/000 + ZEXTO·ZEXT1. $\overline{\text{DECODELDQUAD}}$·FLDQUAD·$\overline{\text{DECODEIF-1}}$·FA/PBCMPLEV100. FACTVRIC000/100·R-DIBUF·$\overline{\text{HOLDEXECRDIBUF}}$·$\overline{\text{NOGO}}$.

The FACTVRIC flip-flop specifies the currently active instruction register RICA/RICB. When the flip-flop is set to a binary ONE, it specifies the RICA register and when a binary ZERO, it specifies the RICB register. It is set and reset in response to a T clock timing pulse signal in accordance with the following Boolean expressions. $\overline{\text{FACTVRIC}}$ = FACTVRIC·T-GLACTVRIC wherein TGLACTVRIC = DECODEIF1·[$\overline{\text{HOLDDMEM}}$·[$\overline{\text{CANCELC}}$. $\overline{\text{FFPI-MEIS}}$ + FNEWIF1·$\overline{\text{NOGO}}$.

FACTVRIC=$\overline{FACTVRIC}\cdot\overline{TGLACTVRIC}$ wherein TGLACTVRIC=$(\overline{DECODEIF1}+[HOLDD-MEM+[CANCELC+FFPIMEIS)\cdot(\overline{FNEWIF1}+\overline{NOGO})$. The FCPUWRTREQ flip-flop defines the time during which processor data is to be written into cache. It is set and reset in response to a T clock timing pulse in accordance with the following Boolean expressions.

SET=(DECODEWRTSNGL+DECODEWRTDBL) · HIT · [$\overline{HOLDDMEM}$·[$\overline{CANCELC}$.

RESET=FWRTDBL·$\overline{HOLDCACHECPUWRT}$·$\overline{SEQ}$.

The FDBLMISS flip-flop defines a read double type miss condition and is used to select the ZDIN position of ZDI switch 750-312 during the cycle following data recovery. It is set and reset in response to a T clock timing pulse in accordance with the following Boolean expressions.

SET=(DECODERDDBL+DECODERDRMT)·[$\overline{HOLDDMEM}$. [$\overline{CANCELC}$·MISS.

RESET=FRDMISS.

The FEVENODD flip-flop specifies which word of the two word pairs processor 700 is waiting for when a read single type miss condition occurs. The flip-flop also defines the order that the data words are to be returned to processor 700 in the case of a read double type miss condition.

Further, the flip-flop is used during a read double hit condition to access the second data word. It is set and reset in response to a T clock timing pulse in accordance with the following Boolean expressions.

SET=(DECODERDSNGL+DECODEIF1·FF-PIMEIS). [$\overline{HOLDDMEM}$·[$\overline{CANCELC}$·ZDAD09+DECODERDDBL. [$\overline{HOLDDMEM}$·[$\overline{CANCEL}$·$\overline{C}$·DSZ1.

RESET=(DECODERDSNGL+DECODEIF1)·[$\overline{HOLDDMEM}$. [$\overline{CANCELC}$·ZDAD09+DECODERDDBL·[$\overline{HOLDDMEM}$. [$\overline{CANCEL}$·$\overline{C}$·DSZ1+DECODERDRMT·[$\overline{HOLDDMEM}$. [$\overline{CANCELC}$.

THe FFPIMEIS flip-flop specifies that the last processor state was an FPIMEIS state which means that the IF1 command on the DMEM lines is a request for additional EIS descriptors. This flip-flop is set and reset in response to a T clock pulse in accordance with the following Boolean expressions.

SET+FPIMEIS.

RESET=DECODEIF1·[$\overline{CANCELC}$·[$\overline{HOLDD-MEM}$.

The FHOLDIF1 flip-flop defines when processor 700 is being held because of an IF1 miss condition so that when the instruction is received from memory, the current instruction register RICA/RICB can be updated by the FDATARECOV flip-flop. The flip-flop is set and reset in response to a T clock pulse in accordance with the following Boolean expressions.

SET=DECODEIF1·IFPIMEIS·[$\overline{HOLDDMEM}$·[$\overline{CANCELC}$·MISS.

RESET=FNEWIF1·NOGO+FDATARECOV.

The FINHRDY flip-flop is used to inhibit the signaling of an IBUFRDY condition to processor 700 when a conflict occurs between the instruction (IC) level and memory data level at the time processor 700 took the instruction loaded into RIRA/RIRB from cache. It is set in response to a T clock pulse and is reset unconditionally on the next T clock pulse when no set condition is present. It is set in accordance with the following Boolean expression.

SET=SETIRTERM·READIBUF·[$\overline{HOLDD-MEM}$·$\overline{NOGO}$. wherein SETIRTERM=CMP-DATAICLEV+MEMWRTREQ· (ZEXTO·ZEXT1·IF2·[$\overline{CANCELCMD}$+DECODEIF1·FFPIMEIS+FINHRDY).

RESET=$\overline{SET}$.

The FJAMZNICLEV flip-flop is used to force the level signals ZNICLEVOOO-2100 of the next instruction to be applied to the control input terminals of ZCD switch 750-306 (i.e., signals ZCD010-210) following an IF1 command which did not specify the last word in the block. The flip-flop is set in response to a T clock pulse in accordance with the following Boolean expression. It is reset on the occurrence of the next T clock pulse.

SET=DECODEIF1·FFPIMEIS·HIT·[$\overline{HOLDD-MEM}$·[CANCELC·[$\overline{CANCELC}$·(ZDAD08·Z-DADO9).

The FNEWIF1 flip-flop defines the cycle after an IF1 command is received from processor 700. It is set for one cycle in response to a T clock pulse in accordance with the following Boolean expression.

SET=DECODEIF1.FFPIMEIS·[$\overline{HOLDDMEM}$·[$\overline{CANCELC}$.

The FRDIBUF flip-flop is used to specify that a signal on the RDIBUF line was received from processor 700 during the last cycle of operation. It is set in accordance with the following Boolean expression. It is reset during the next cycle in the absence of a set condition.

SET=RDIBUF·$\overline{HOLDEXECRDIBUF}$·$\overline{NOGO}$.

The FRDMISS flip-flop is used to cause the holding of processor 700 upon detecting a miss condition for any read type command. It is set and reset in response to a T clock pulse in accordance with the following Boolean expressions.

SET=(DECODERDSNGL+(DECODEIF1·$\overline{FF-PIMEIS}$)+DECODERDRMT +DECODERDCLR+DECODERDDBL)·[$\overline{HOLDD-MEM}$·[$\overline{CANCELC}$·MISS.

RESET=FDATARECOV+FNEWIF1·NOGO.

The FRDREQ flip-flop defines when the second word fetched in response to a RDDBL command for a hit condition is to be read out from cache. It is set and reset in response to a T clock pulse in accordance with the following Boolean expressions.

SET=DECODERDDBL·HIT·[$\overline{HOLDDMEM}$·[-$\overline{CANCELC}$. RESET=[$\overline{HOLDDMEM}$.

The FDATARECOV flip-flop inhibits the incrementing of the instruction register RICA/RICB when the IF1 command is to the last word in the block and the IF2 command is cancelled. It is set and reset in response to a T clock pulse in accordance with the following Boolean expressions:

SET=DATARECOV·FLASTINST·[HOLDD-MEM·[CANCELC+DATARECOV ·FLASTIN-ST·[CANCELC·[$\overline{HOLDDMEM}$+-DATARECOV·$\overline{FLASTINST}$.

RESET=[HOLDDMEM·FDATARECOV.

CONTROL LOGIC SIGNALS

1. The FA/FBLEV1VAL signal is used to define the state of a first valid bit position of the RICA/RICB instruction register. It is set and reset on a T clock pulse in accordance with the following Boolean expressions. The reset condition overrides the set condition.

a. FA/FBLEV1VALSET=DECODEIF1·$\overline{FF-PIMEIS}$·[$\overline{HOLDDMEM}$·[$\overline{CANCELC}$·FACT- VRIC100/0000+DECODEIF1 ·FFPIMEIS·[-HOLDDMEM·[CANCELC·EISIF2·FACT-VRIC000/100+DECODELDQUAD ·[HOLDD-MEM [CANCELC FACTVRIC100/ 000.

b. FA/FBLEV1VAIRESET=DECODEIF1·FF-PIMEIS·[HOLDDMEM·[CANCELC·HIT·Z-DADO8·ZDADO9·FACTVRIC100/000-+ZEXT0·ZEXT1. DECODEIF1·DECODELD-QUAD·FLDQUAD·RDIBUF·HOLDEXECR-DIBUF·FACTVRIC000/ 100·FA/FBCM-PLEV000·NOGO+ZEXT0. ZEXT1·FL-DQUAD·RDIBUF·HOLDEXECRDIBUF·FACTVRIC100/000 NOGO. wherein RICA=-FACTRIC=1 and RICB=FACTVRIC=1.

2. The FA/FBLEV2VAL signal is used to define the state of a second valid bit position of the RICA/RICB instruction register. It is set and reset on a T clock pulse in accordance with the following Boolean expressions.

a. FA/FBLEV2VALSET=DECODEIF2·[-HOLDDMEM·[CANCELC·FACTVRIC000/1-00·NOGO+DECODEIF1·FFPIMEIS·[-HOLDDMEM·[CANCELC·FACTVRIC000/1-00·EISIF2.

b. FA/FBLEV2VALRESET=DECODEIF1·FF-PIMEIS·[HOLDDMEM·[CANCELC·FACT-VRIC100/000 +DECODELDQUAD·[HOLDD-MEM·[CANCELC ·FACTVRIC100/000 +ZEXT0·ZEXT1·DECODEIF1·DECODELD-QUAD·FLDQUAD·FA/FBCURLEV·FACT-VRIC000/100·RDIBUF·HOLDEXECR-DIBUF·NOGO. wherein RICA=FACT-VRIC=1 and RICB=FACTVRIC=1.

3. The [ZIB0 and [ZIB1 signals control the ZIB switch for transfers of instructions from cache 750 to processor 700 via the ZIB lines.
a. [ZIB0=IFETCHRDY·FNEWIF1.
b. [ZIB1=IFETCHRDY.

4. The [ZDI0, [ZDI1 and [ZDI2 signals control the ZDI switch for transfers of instructions and data from cache 750 to processor 700 via the ZDI lines. Control signal [ZDI0, which corresponds to the most significant bit of the three bit code, can be assigned to be a binary ZERO unless positions 4 through 7 are being used for display purposes.
a. [ZDI1=DATARECOV+FDBLMISS+-RDEVEN.
b. [ZDI2=RDIBUF/ZDI·(HITTOIC+FFDREQ).

5. The [ZICIN0 and [ZICIN1 signals control the ZICIN switch for loading address signals into the RICA and RICB instruction address registers 750-900 and 750-902.
a. [ZICIN0=ALTCMD100·FDFN2HT·[HOLDD-MEM.
b. [ZICIN1=FDFN1HT·FNEWIF1+FDFN2HT.

6. The signals ENABRIC1 and ENABRIC2 are used to enable the loading RICA and RICB registers.
a. ENABRIC1=FHOLDIF1·FNEWIF1·FJAMZ-NICLEV·[HOLDDMEM·FDATARECOV+-FHOLDIF1·DATARECOV.
b. ENABRIC2=FINHRDY·SETINH-RDY·DFN2HT wherein SETINH-RDY=DFN2T=[MEMWRTREQ (ZEXT-0·ZEXT1·EXECIF2·[CANCLCMD+FINH-RDY+PSUEDOIF1+PSUEDOIF2) +CMPDATA/ICLEV].

7. The signal DATARECOV defines the time that new data has been loaded into the processor's registers (e.g. RDI or RBIR) and when the processor is released. This signal is generated by a flip-flop of section 750-1 which is set to a binary ONE in response to a T clock pulse upon detecting an identical comparison between the address signals specifying the word required to be accessed by processor 700 and signals indicating the word being transferred to cache unit 750. The comparison indicates that signals DATA, MIFS2, MIFS3, MIFS1 and DATAODD are identical to signals FHT, FFHOLDTB0, FHOLDTB1, RADR32 and DOUBLEODD respectively wherein signal FHOLDTB0=FRDMISS·LDTBVALID·FIF-2ASSIGN·FTBPTR0;

signal FHOLDTB1=FRDMISS·LDT-BVALID·FIF2ASSIGN·FTBPTR1;
signal DOUBLEODD=FEVENODD·FDPFS; and
signal DATA=FARDA+FDPFS.

DETAILED DESCRIPTION OF SECTION 750-1

FIG. 7a shows in greater detail different ones of the blocks of section 750-1. It will be noted that for the purpose of facilitating understanding of the present invention, the same reference numbers have been used to the extent possible for corresponding elements in FIG. 4. In many cases, a single block depicted in FIG. 4 includes several groupings of circuits for controlling the operation thereof and/or for generating associated control signals. Therefore, some blocks with appropriate reference numbers are included as part of the different blocks of section 750-1.

Referring to the Figure, it is seen that certain portions of block 750-102 are shown in greater detail. The transit block buffer 750-102 is shown as including a first group of circuits for keeping track of data words received from memory in response to a read quad type command. These circuits include a plurality of clocked pair count flip-flops which comprise a four-bit position register 750-10200, a multiplexer circuit 750-10202, a plurality of NAND gates 750-10204 through 750-10210 and a decoder circuit 750-10212. It will be noted that there is a pair count flip-flop for each transit buffer location.

Additionally, the first group of circuits includes a plurality of clocked transit block valid flip-flops which comprise a four-bit position register 750-10214. The binary ONE outputs of each of the flip-flops are connected to a corresponding one of the four pair count flip-flops as shown.

In response to a read quad command, a first pair of words is sent to cache 750. This is followed by a gap and then the second pair is sent to cache 750. The pair count flip-flop associated with the transit block buffer location being referenced as specified by the states of signals MIFS2110 and MIFS3110 is switched to a binary ONE via a first AND gate in response to T clock signal [CLKT022 when signal DATAODD100 is forced to a binary ONE by the circuits of block 750-114. Signal RESETTBV100 is initially a binary ZERO and decoder circuit 750-10212 operates to force one of the first four output signals SETPC0100 through SETPC3100 in accordance with the states of the MIFS2110 and MIFS3110 from switch 750-128.

The pair count flip-flop is held in a binary ONE state via the other input AND gate by a transit block valid signals associated therewith being forced to a binary ONE. The appropriate one of the transit block valid bit flip-flops designated by decoder circuit 75010601 (i.e., signals IN0100 through IN3100) is set to a binary ONE via a first AND gate when switching takes place to increment signal INCTBIN100 is forced to a binary ONE state in response to T clock signal [CLKT022.

The multiplexer circuit 750-10202 in accordance with the states of the signals DMIFS2100 and DMIFS3100 from switch 750-128 select the appropriate binary ONE out of the four pair count flip-flops to be applied to NAND gate 750-10204. This causes NAND gate 750-10204 to force signal LASTODD100 to a binary ZERO. This results in NAND gate 750-10206 forcing signal LASTDTAODD000 to a binary ONE.

When the next pair of data words are received, this causes NAND gate 750-10206 to force signal LASTDTAODD000 a binary ZERO. This, in turn, causes NAND gate 750-10210 to force reset signal RESETTBV1100 to a binary ONE. The decoder circuit 750-10212 is conditioned by signal RESETTBV100 to force one of the four output terminals 4 through 7 to a binary ONE. This, in turn, resets the appropriate one of the transit block valid bit flip-flops via the other AND gate. As soon as the TB valid flip-flop resets, it resets the pair count flip-flop associated therewith via its other AND gate. It will be appreciated that such switching occurs in response to T clock signal [CLKT022.

As seen from FIG. 7a, the first group of circuits of block 750-102 further includes a plurality of NAND gates 750-10216 through 750-10222, each of which is connected to receive a different one of the binary ONE outputs from register 750-10214. The binary ONE outputs FTBV0100 through FTBV3100 are also connected to the control input terminals of the transit block address comparator circuits 750-132 through 750-136.

Each of the NAND gates 750-10216 through 750-10222 also are connected to receive a different one of the signals IN0100 through IN3100 from decoder circuit 750-10601. The outputs from these gates are applied to an AND gate 750-10224. The signals VALID000 through VALID3000 are used to indicate when a transit block register location is available for writing. That is, when a selected transit block valid bit flip-flop is in a reset state, AND gate 750-10224 maintains signal VALIDIN000 in a binary ONE state.

The VALIDIN000 signal conditions a further AND/NAND gate 750-10226 to force a control signal [RTB100 to a binary ONE during the second half of a cycle of operation (i.e., signal FHT020 is a binary ONE) in the case of a read command (i.e., signal DREQREAD100 is a binary ONE) at the time a directory assignment is not being made (i.e., signal FLDTBVALID000 is a binary ONE).

As seen from FIG. 7a, control signal [RTB100 is applied via a driver circuit 750-10228 to a decoder circuit 750-10230. The control signal [RTB110 causes the decoder circuit 750-10230 to force an appropriate one of the output signals [RTB0100 through [RTB3100 designated by the states of signals FTBPTR0100 and FTBPTR1100 applied via a pair of driver circuits 750-10232 and 750-10234 to a binary ONE state. This in turn causes bit positions 24-31 of one of the transit block register locations to be loaded with address signals applied via the RADO lines 24-31. The complement signal [RTB000 is applied as an input to block 750-107 for controlling the loading of command queue 750-107.

A second group of circuits of block 750-102 shown in greater detail includes the transit block buffer flag storage section 750-10238 of buffer 750-102. This section as well as the section of buffer 750-102, not shown, is constructed from a 4×4 simultaneous dual read/write memory. The memory is a 16-bit memory organized as 4 words of 4 bits each, only three bits of which are shown. Words may be independently read from any two locations at the same time as information is being written into any location. The signals FTBPTR0100 and FTBPTR1100 are applied to the write address terminals while the read addresses are enabled by the VCC signal applied to the G1 and G2 terminals. The Y bit locations are selected in accordance with the states of read address signals MIFS3100 and MIFS2100 from switch 750-128. The Z bit locations are selected in accordance with the states of signals DMIF3100 and DMIF2100 from switch 750-128. Since these locations are not pertinent they will not be discussed further herein.

The memory may be considered conventional in design, for example, it may take the form of the circuits disclosed in U.S. Pat. No. 4,070,657 which is assigned to the same assignee as named herein. Upon the receipt of memory data, the flag bit contents of the transit block location specified by signals MIFS2100 and MIFS3100 are applied to the Y output terminals. These signals are in turn applied to blocks 750-102, 750-115 and 750-117, as shown. During the directory assignment cycle for a cache read miss, the flag bit positions of the transit block location specified by signals FTBPTR0100 and FTBPTR1100 are loaded with the signals FORCEBYP000, FRDQUAD100 and FLDQUAD100 generated by the circuits of blocks 750-5 and 750-114.

Additionally, as seen from FIG. 7a, the transit block buffer valid bit flip-flops of register 750-10214 are reset to binary ZEROS when processor 700 causes signal INITTB100 to be forced to a binary ONE. The binary ZERO outputs from each of the flip-flops connect to the inputs of a NAND gate 750-10215. The NAND gate 750-10215 forces output signal RDBSY100 to a binary ONE whenever any one of the signals FTBV0000-FTBV3000 or signal FLDTBVALID000 switches to a binary ZERO. The signal RDBSY100 is applied via one of the interface lines of interface 600 as an input to processor 700 for signalling the presence of outstanding read commands.

It is also seen from FIG. 7a that block 750-102 further includes a group of instruction fetch flag circuits which are associated with the operation of transit block buffer 750-102. These circuits include two sets of input AND gates 750-10240 through 750-10243 and 750-10250 through 750-10253, a pair of multiplexer selector circuits 750-10255 and 750-10256, an IF1 and IF2 flag storage register 750-10258 and an output multiplexer circuit 750-10260 arranged as shown.

The binary ONE outputs of the individual IF1 and IF2 flip-flops are connected to corresponding ones of the sets of AND gates 750-10240 through 750-10243 and 750-10250 through 750-10253. These AND gates also receive input signals from the circuits of block 750-106 generated in response to the in pointer signals FTBPTR0000 and FTBPTR1000 used for addressing the different register locations within the buffer 750-102 as mentioned previously.

The multiplexer circuit 750-10255 is connected to receive as a control input, signal FIF1ASSIGN100 from FIF1ASSIGN flip-flop 750-11418. The multiplexer circuit 750-10256 is connected to receive as a control input signal FIF2ASSIGN100 from FIF2ASSIGN flip-flop 750-1410. This enables the setting and/or resetting of the IF1 and IF2 flip-flops of register 750-10258 in response to the signals FIF1ASSIGN100 and FIF2ASSIGN100. The switching occurs in response to T clock signal [CLKT022 during the loading of a transit block register location when a control signal LDTBVALID100 is switched to a binary ONE via an AND gate 750-11428.

It will be noted that register 750-10258 contains an IF1 and IF2 flag bit position for each transit block register location. That is, the register includes flip-flops FIF10, FIF20 through FIF13, FIF23 for transit block register locations 0 through 3 respectively. Each of the binary ONE outputs from the IF1 and IF2 flag flip-flops are also applied to the different input terminals of the output multiplexer circuit 750-10260. The circuit 750-11450 contains two sections. This permits DMIFS2100 and DMIFS3100 signals applied to the control terminals of the multiplexer circuit 750-10260 from block 750-128 to select as outputs, input signals from both an IF1 and IF2 flag flip-flop. The selected pair of signals, in turn, provide flag signals ZIF1FLG100 and ZIF2FLG100 which are applied to block 750-115. These signals are used to control the writing of memory information into the IBUF1 and IBUF2 buffers 750-715 and 750-717. Additionally, the complements of the outputs from multiplexer circuit 750-10260 which correspond to signals ZIF1FLG000 and ZIF2FLG000 are applied to a pair of input terminals of a multisection comparator circuit 750-110/750-11435.

It will be noted that the last section of each of multiplexer circuits 750-10255 and 750-10256 are connected in series for generating the enable transit block buffer ready signal ENABTBRDY100 applied to block 750-114. As shown, the "0" input terminal of the last section of multiplexer circuit 750-10255 connects to a voltage VCC (representative of a binary ONE) while the "1" input terminal connects to ground (representative of a binary ZERO). The output terminal of the last section of multiplexer circuit 750-10255 connects to the "0" input terminal of the last section of multiplexer circuit 750-10256 while the "1" input terminal connects to ground. The multiplexer circuits 750-10255 and 750-10256 operate to force signal ENABTBRDY100 to a binary ONE only after the completion of an instruction fetch assignment cycle when both signals FIF1ASSIGN100 and FIF2ASSIGN100 are binary ZEROS. Therefore, the "0" input terminals are selected as outputs by the multiplexer circuits 750-10255 and 750-10256 which results in signal ENABTBRDY100 being forced to a binary ONE. This presents the inadvertent generation of the IBUFRDY100 signal as explained herein.

As seen from FIG. 7a, the circuits of the transit buffer in pointer block 750-106 includes a clocked two-bit position register 750-10600 and a decoder circuit 750-10601. The register 750-10600 has associated therewith a NAND/AND gate 750-10602 and a two input AND/OR gate 750-10604 connected in a counter arrangement. That is, the NAND gate 750-10602 in response to load signal FLDTBVALID111 from block 750-114 and signal NOGO020 force an increment signal INCTBIN100 to a binary ONE. This causes the address value stored in register 750-10600 to be incremented by one. The increment signal INCTBIN100 is applied to the circuits of block 750-102.

The most significant high order bit position of register 750-10600 is set to a binary ONE via the gate 750-10604 in response to either signals FTBPTR0100 and FTBPTR0100 or signals FTBPTR1100 and FTBPTR000 being forced to binary ONES. The complemented binary ONE output signals of the register bit positions corresponding to signals FTBPTR0000 and FTBPTR1000 are decoded by decoder circuit 750-10601. The circuit 750-1061 in response to the FTBPTR0000 and FTBPTR1000 signals forces one of the four pairs of output terminals to a binary ONE.

The command control circuit block 750-114 includes an instruction fetch 2 search (FIF2SEARCH) synchronous D type flip-flop 750-11400. The flip-flop 750-11400 is set to a binary ONE state in response to T clock signal [CLKT020 when a two input AND/OR gate 750-11402 and an AND gate 750-11404 force a set signal SETIF2-SEARCH100 to a binary ONE. This occurs when either an IF1 command which is a hit or an IF2 command is received from processor 700 during an IF1 assignment cycle.

In the case of an IF1 command, this presumes that there is no hold condition (i.e., signal [HOLDD-MEM000 from block 750-117 is a binary ONE) and that a directory search generated a hit (i.e., signal HIT-TOTB100 is a binary ONE) indicating that the requested instruction block resides in cache store 750-300. For an IF2 command, it is assumed that there has been a directory assignment cycle following a directory search in which there was a miss made in response to the IF1 command (i.e., signal FIF1ASSIGN100 is a binary ONE).

In either of the situations mentioned, the gate 750-11402 forces the signal SETIF2TIME100 to a binary ONE. When the instruction fetch command was caused by a transfer or branch instruction, which is not a NOGO (i.e., signal NOGO030 is a binary ONE) indicating that it should process the IF2 command currently being applied to the command lines (i.e., indicated by signal DREQCAC112 being forced to a binary ONE), AND gate 750-11404 forces signal SETIF2-SEARCH100 to a binary ONE. This switches flip-flop 750-11400 to a binary ONE when signal [CANCEL012 is a binary ONE.

As seen from FIG. 7a, the binary ZERO output from flip-flop 750-11400 is applied as an input to the hold circuits of block 750-117. The signal FIF2SEARCH000 is delayed by a buffer circuit 750-11406 and applied to one input of an input NAND gate 750-11408 of an instruction fetch 2 assignment (IFIF2ASSIGN) flip-flop 750-11410.

The signal FIF2SEARCH010 together with the signal EISIF2000 (indicates a non-EIS type instruction) causes the NAND gate 750-11408 to switch FIF2AS-SIGN flip-flop 750-11410 to a binary ONE in response to a gating signal SETBVALID100 and T clock signal [CLKT020. The state of this flip-flop as the others is gated as an output when signal FLDTBVALID111 is a binary ONE.

It will be noted that signal FLTBVALID111 is switched to a binary ONE via an AND gate 750-11412, a clocked flip-flop 750-11414 and a delay buffer circuit 750-11416 in the case of a miss condition (i.e., signal HITTOTB010 is a binary ONE) generated in response to a directory search made for a read type command (e.g. IF2). This assumes that there is no hold condition (i.e., signal [HOLDDMEM000 is a binary ONE), that in the case of an IF2 command it was not due to a transfer NOGO (i.e., signal NOGO020 is a binary ONE) and that there is no cancel condition (i.e., signal [CANCEL010 is a binary ONE) for a read type operation decoded by the circuits of block 750-113 in response to the read command applied to the command lines (i.e., signal DREQREAD100 is a binary ONE wherein DREQREAD100=READ100·DREQCAC112).

Under similar conditions, an instruction fetch 1 assignment (FIF1ASSIGN) flip-flop 750-11418 is switched to a binary ONE via an input AND gate 750-11420 in response to an IF1 command (i.e., when signal IF1100 is a binary ONE) in which there was a miss detected (i.e., signal SETTBVALID100 is a binary ONE). The load transit buffer valid flip-flop 750-11414 remains set until signal SETLDTBVALID100 switches to a binary ZERO. It will be noted that the binary ZERO output signal FLDTBVALID000 is applied to circuits included as part of block 750-102.

The other pair of flip-flops are 750-11422 and 750-11424 set in response to signal SETLDTBVALID100 in the case of a miss condition. The load quad flip-flop 750-11424 is set to a binary ONE state when the command applied to the DMEM command lines is decoded as being a LDQUAD command (i.e., signal LDQUAD100 from decoder 750-113 is a binary ONE) and that the ZAC command applied to the ZADOB lines is coded as requiring a read quad operation (e.g. IF1, IF2, LDQUAD, PRERD and RDSNGLE commands specified by signal ZADOB04100 being set to a binary ONE).

The RDQUAD flip-flop 750-11422 is set to a binary ONE via an AND gate 750-11426 when a signal CQIN1100 from the circuits included within command queue block 750-107 is a binary ONE indicative of a double precision command (i.e., signal ZADOBO2100 is a binary ONE).

As seen from FIG. 7a, block 750-114 further includes a comparator circuit 750-11435. This circuit may be considered conventional in design and, for example, may take the form of the circuits disclosed in U.S. Pat. No. 3,955,177.

The comparator circuit 750-11435 is enabled by signals USETBRDY100 and DATA100. The signal USETBPDY100 indicates that the cache is waiting for instructions from memory to be loaded into the IBUF1 or IBUF2 buffers. The signal DATA100 is forced to a binary ONE by a NAND gate 750-11436 indicating receipt of information from memory. The comparator circuit includes two sections. One section compares the command queue input pointer signals and output pointer signals from blocks 750-108 and 750-109 respectively. This section forces signals CQCMP100 and CQBMP000 to a binary ONE and binary ZERO respectively when the pointer signals are equal. The section corresponds to block 750-110 in FIG. 4.

The other section compares input terminals A1, A2 and B1, B2, the control signals [ZRIB100, [ZRIB010 applied to input terminals A1, A2 to the states of the I fetch 1 and I fetch 2 flag signals ZIF1FLG000, ZIF2FLG000 applied to terminals B1, B2. When equal, this indicates that the information being received from memory at this time is either in response to an I fetch 1 or I fetch 2 command. It will be noted that control signal [ZRIB100 controls ZRIB switch 750-720.

The input terminals A4, A8 compare signals ZEXT0100, ZEXT1100 against signals MIFS1100 and DATAODD100 applied to the B4, B8 terminals. This indicates whether the information being addressed within the instruction buffer equals the information being received. More specifically, signals ZEXT0100 and ZEXT1100 are generated by the circuits of block 750-920 from the least two significant bit address of the instruction stored in the RIRA register. Thus, they specify the word location being addressed within the I buffer. Signal MIFS1100 is coded to specify whether the first or second half of the block is being received. Signal DATAODD100 specifies whether the first or second word of the first two word pairs is being received. The signal DATAODD100 is generated by an AND gate 750-11437.

Lastly, the comparator circuit 750-11435 compares a signal ENABTBRDY100 applied to terminal A16 from block 750-102 with the voltage VCC representative of a binary ONE applied to terminal B16. In the presence of a true comparison between the two sets of all six signals, the circuits 750-11435 forces its output to a binary ONE. This results in the complement output terminal forcing signal IBUFCMPR000 to a binary ZERO. This causes block 750-722 to force the IBUFRDY100 signal to a binary ONE as explained herein.

Additionally, section 750-114 includes an AND gate 750-11417. During the first half of a cache cycle (i.e., signal FHT120 from delay circuit 750-11810 is a binary ONE) when the FLDTBVALID flip-flop 750-11414 is a binary ONE, the AND gate 750-11417 forces control signal [RTB5-8100 to a binary ONE. This signal is applied as a clock strobe input to the level storage section of transit block buffer 750-102. This section is constructed from a 4×4 simultaneous dual read/write 16-bit memory organized as four words each 4 bits in length similar to the memory device of block 750-10238 and the memory devices used in constructing the 36-bit read command buffer section of block 750-102 as well as the write command/data buffer 750-100.

FIG. 7a shows that the data reception and control block 750-115 includes a plurality of NAND gates 750-11500 through 750-11510 and a plurality of AND gates 750-11511 through 750-11514 connected as shown to generate the control strobe enable signals [LQBUF100, [IBUF1100 and [IBUF2100, reset buffer signal RESETBUF100 and write control buffer signal [WRTBUF0100. These signals are used to control the operation of the buffer circuits of section 750-7. As seen from FIG. 7a, the other write control buffer signal [WRTBUF1100 is generated by a buffer delay circuit 750-11515 in response to signal FARDA010. The signal [WRTBUF0100 is derived from the output of the two input data selector/multiplexer circuit 750-128 which selects either the signal RMIFS1100 from register 750-127 or signal RMIFSB1100 from register 750-129. The selection is made in accordance with the state of signal FARDA000 produced from the accept line ARDA of data interface 600. The multiplexer circuit 750-128, in accordance with the state of signal FARDA000, generates the two sets of signals MIFS2100, MIFS3100 and DMIFS2100, DMIFS3100 which are applied to the read address inputs of buffer 750-102.

It will be noted that section 750-115 also includes a double precision (FDPFSX) D type flip-flop 750-11517 which is set in response to clocking signal [CLKT020 to a binary ONE state via a first AND gate input in accordance with the state of the signal PTXDPFS100 applied to the AND gate via amplifier circuit 750-11518 from the DPFS line by SIU 100. The DPFS line when set indicates that two words of data are being sent from SIU 100. Switching occurs when SIU100 forces the signal PTXARDA100 applied thereto via an amplifier circuit 750-11519 from the ARDA line of interface 600 to a binary ONE. The ARDA line indicates that the read data requested by cache 750 is on the DFS lines from SIU100. The output of a FARDA flip-flop (not shown) which delays signal ARDA by one clock period is applied to a second hold AND gate input along with signal FDPFSX100. The FDPFSX flip-flop 750-11517 remains set for two clock periods. That is, the flip-flop 750-11517 is set in accordance with the number of SIU responses (DPFS signals). In the case of a read single command, the SIU generates two SIU responses, each response for bringing in a pair of words. In each case, this permits the writing of the two words into cache when signal RWRCACFLG100 is a binary ONE.

The binary ZERO output of flip-flop 750-11517 is inverted by a NAND/AND gate 750-11521 and delayed by a buffer delay circuit 750-11522 before it is applied to AND gate 750-11512. The same binary ZERO output without being inverted is delayed by a buffer delay circuit 750-11523 and applied to circuits which reset the states of bit positions of a transit buffer valid bit register which forms part of transit buffer 750-102.

It will also be noted that the double precision signal FDPF110 is combined in an AND gate 750-11524 with a write cache flag signal RWRTCACFLG100 from transit block buffer flag storage portion of buffer 750-102. The AND gate 750-1152 generates a memory write request signal MEMWRTREQ100 which is forwarded to section 750-9 for enabling memory data to be written into cache (i.e., controls address switch(s) selection).

As seen from FIG. 7a, the initiating request control circuits block 750-116 includes an active output port request flip-flop 750-11600. The flip-flop is a clocked D type flip-flop which includes two input AND/OR gating circuits. Flip-flop 750-11600 is set to a binary ONE state in response to clock signal [CLKT020 when block 750-114 forces a pair of signals ENABSETAOPR100 and SETAOPR100 to binary ONES. When set to a binary ONE, this, in turn, sets the AOPR line of interface 600, signalling the SIU100 of a data transfer request. The binary ZERO side of flip-flop 750-11600 is inverted by an inverter circuit 750-11602, delayed by a delay buffer circuit 750-11604 and applied to a hold AND gate. The flip-flop 750-11600 remains set until the clock time that signal FARA020 switches to a binary ZERO indicating that the SIU100 accepted the cache memory request.

The hold control block 750-117, as shown, includes an inhibit transit buffer hit FINHTBHIT flip-flop 750-11700, an AND gate 750-11702 and a plurality of AND/NAND gates 750-11704 through 750-11716. The flip-flop 750-11700 is set to a binary ONE state via a first input AND gate and a NAND gate 750-11701 in response to a T clock signal [CLKT020 when signals INHTBHIT100 and TBHIT100 are binary ONES. The NAND gate 750-11701 forces signal INHTBHIT100 to a binary ONE in the case of a cancel condition (i.e., signal [CANCELC012 is a binary ZERO).

The complement output side of flip-flop 750-11700 applies signal FINHTBHIT000 as one input to AND gate 750-11702. A directory busy signal DIRBUSY000 from block 750-526 is applied to the other input of AND gate 750-11702. When the directory is not performing a search (i.e., signal DIRBUSY000 is a binary ONE) and signal INHTBHIT100 is a binary ONE, AND gate 750-11702 forces signal INHTBACMP000 to a binary ONE. This, in turn, causes the gate 750-11704 to force signal TBHIT100 to a binary ONE when the AND gate 750-136 forces a transit block address compare signal TBACMP100 to a binary ONE. At the same time, gate 750-11704 forces signal TBHIT000 to a binary ZERO.

The AND/NAND gates 750-11708 through 750-11710 generate signals CPSTOP000 through CPSTOP003 which are forwarded to processor 700 for indicating a hold condition. The other AND/NAND gates 750-11714 through 750-11716 generate signals [HOLDDMEM000 through [HOLDDMEM003 to specify an internal hold condition for preventing the other sections of cache 750 from executing the command applied to the command lines by processor 700. Whenever there is a hold command condition (i.e., signal HOLDCMD000 is a binary ZERO), a miss condition (i.e., signal FRDMISS020 is a binary ZERO), a hold quad condition from block 750-916 (i.e., signal HOLDLDQUAD000 is a binary ZERO) or a transit block hit condition (i.e., signal TBHIT000 is a binary ZERO), the gates 750-11708 through 750-11710 force their respective output signals CPSTOP003 through CPSTOP000 to binary ZEROS and signals CPSTOP103 through CPSTOP100 to binary ONES. This, in turn, causes the processor 700 to halt operation.

Under similar conditions, in addition to a hold search condition (i.e., signal HOLDSEARCH000 is a binary ZERO) as indicated by AND gate 750-11712 forcing signal [EARLYHOLD000 to a binary ZERO or a hold cache condition (i.e., signal [HOLDCCU000 is a binary ZERO), the gates 750-11714 through 750-11716 force their respective output signals [HOLDDMEM000 through [HOLDDMEM003 to binary ZEROS and signals [HOLDDMEM100 through [HOLDDMEM103 to binary ONES.

Referring to the Figure, it is seen that the timing circuits of block 750-118 include a synchronous D type flip-flop 750-11800 with two AND/OR input circuits. The flip-flop 750-11800 receives a half T clocking signal [CLKHT100 via gate 750-11802 and inverter circuit 750-11804. A definer T clock signal DEFTCLK110 is applied to one of the data inputs via a pair of delay buffer circuits 750-11806 and 750-11808. Each buffer circuit provides a minimum delay of 5 nanoseconds.

Both the signals [CLKHT100 and DEFTCLK110 are generated by the common timing source. In response to these signals, the half T flip-flop 750-11800 switches to a binary ONE state upon the trailing edge of the DEFTCLK110 signal. It switches to a binary ZERO state upon the occurrence of the next [CLKHT100 signal (at the trailing edge).

The signals FHT100 and FHT000, in addition to signals FHT120, FHT010 and FHT020 derived from the binary ONE and binary ZERO output terminals of flip-flop 750-11800 are distributed to other circuits of section 750-1 as well as to other sections (i.e., 750-5, 750-9 and 750-114). The signals FHT120, FHT020 and FHT010 are distrubuted via another pair of delay buffer circuits 750-11810 and 750-11812 and a driver circuit 750-11814 respectively.

The T clock signals such as [CLKT020 and [CLKT022 generated by the common timing source are distributed in their "raw" form to the various flip-flops of registers. When there is a need to generate a ½ T clock signal, the ½ T clock signal [CLKHT020 is gated with the ½ T definer signal (FHT100) at the input of the flip-flop or register. The state of signal FHT100 is used to define the first and second halves of a T cycle. When signal FHT100 is a binary ONE, this defines a time interval corresponding to the first half of a T clock cycle. Conversely, when signal FHT100 is a binary ZERO, this defines a time interval corresponding to the second half of a T clock cycle.

For the purpose of the present invention, the data recovery circuits can be considered conventional in design and may, for example, take the form of the circuits described in the referenced patent applications. These circuits generate a data recovery signal for forwarding to processor 700 by "ANDING" the ½ T clock signal FHT000 with a signal indicating that data is being strobed into the processor's registers. This causes the data recovery signal to be generated only during the second half of a T clock cycle when such data is being strobed into the processor's registers.

In the case of sections 750-5 and 750-9, the signal FHT100 is used to control the switching of other timing and control flip-flops as explained herein.

DETAILED DECRIPTION OF SECTION 750-3

Figure 7B:
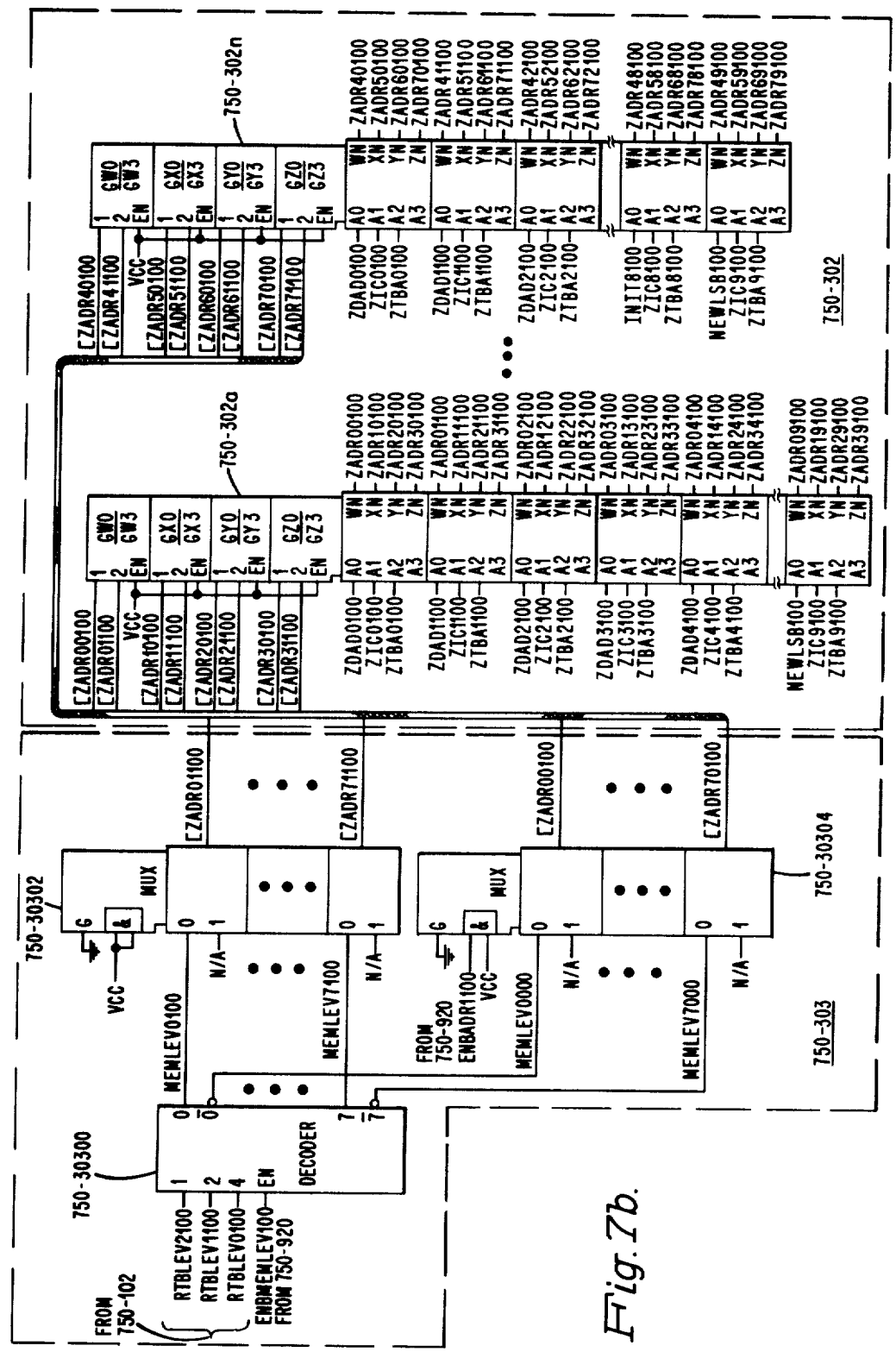

FIG. 7b shows in greater detail specific ones of the blocks of section 750-3. Corresponding reference numbers have been used where possible.

Referring to FIG. 7b, it is seen that the decoder circuits of block 750-303 include a decoder circuit 750-30300 which is enabled for operation by signal ENBMEMLEV100 from the circuits of block 750-920. The signals from non-inverted output terminals of decoder circuit 750-30300 are applied to the input terminals of a first multiplexer circuit 750-30302. The signals at the inverted output terminals are applied to the input terminals of a second multiplexer circuit 750-30304. The multiplexer circuit 750-30302 is always enabled for operation while the multiplexer circuit 750-30304 is only enabled when signal ENBADR1100 is forced to a binary ONE by the circuits of block 750-920. It is assumed that the "0" positions of both multiplexer circuits will always be selected.

Predetermined combinations of the two sets of control signals [ZADR01100 through [ZADR71100 and signals [ZADR00100 through [ZADR70100 are applied to the control input terminals of each of the eight crossbar address selection switches 750-302a through 750-302h, as shown. It is seen that each crossbar switch includes a number of sections, each section includes three parts indicated by the heavy lines between sections. For simplicity, the number of sections of each switch are shown together. For simplicity, the control portion of each section is shown only once since it is the same for all the sections which are required to make up the switch.

As seen from the Figure, depending upon the states of the pairs of control signals [ZADR00100, [ZADR01100 through [ZADR70100, [ZADR71100, the signals from one of the three sources are applied to each set of W, X, Y and Z terminals simultaneously.

DETAILED DESCRIPTION OF SECTION 750-5

Figure 7C:
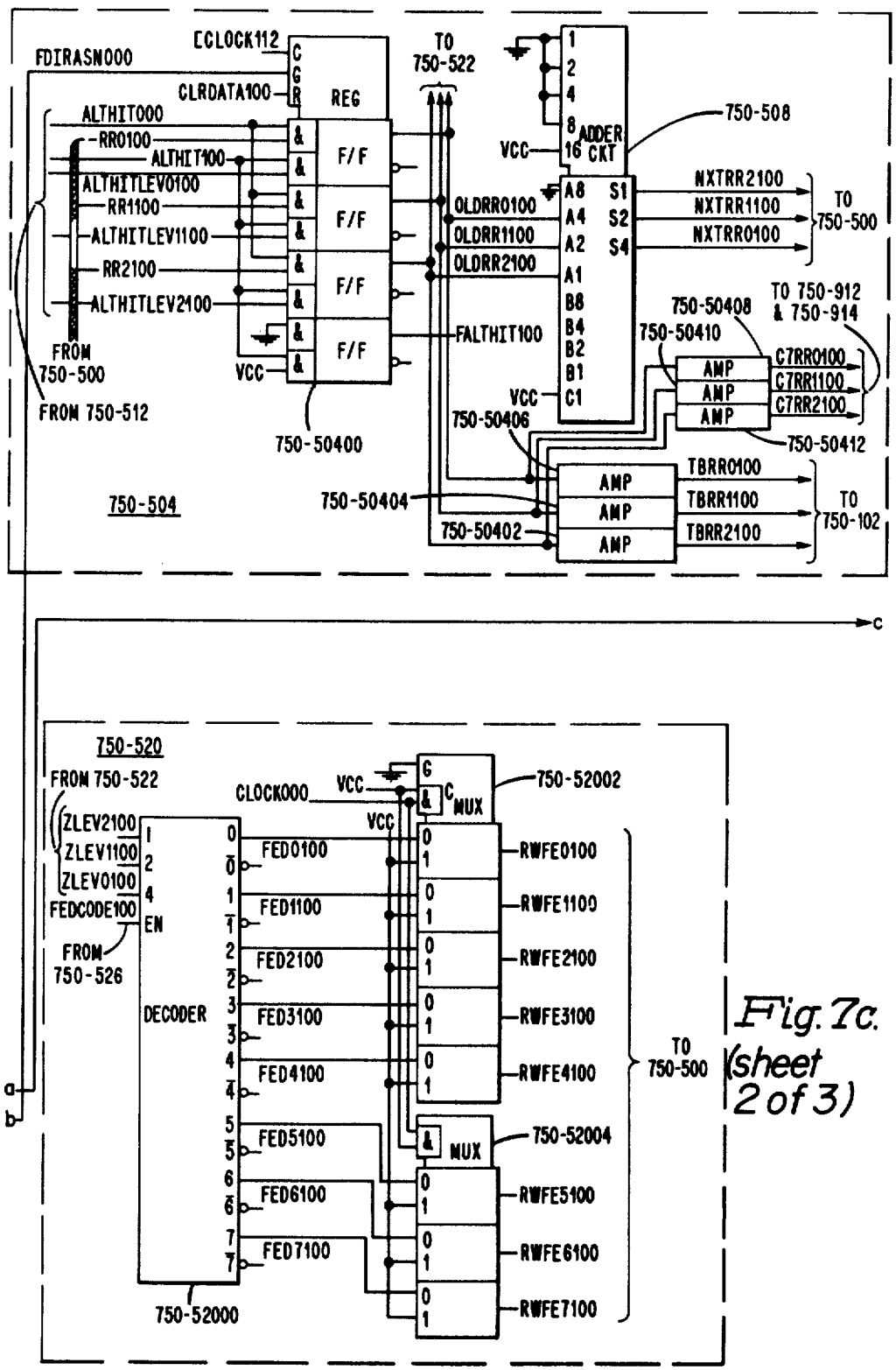

FIG. 7c shows in greater detail specific ones of the blocks of section 750-5 as explained previously. Corresponding reference numbers have been used where possible.

Referring to FIG. 7c, it is seen that the directory hit/miss control circuits of block 750-512 include an encoder network comprising a plurality of NAND gates 750-51200 through 750-51220 and a plurality of amplifier circuits 750-51224 through 750-51228. The NAND gate circuits are connected to encode the set of signals ZFE1100 through ZFE7100 from block 750-506 and the set of signals ZHT1100 through ZHT7100 from the blocks 750-546 through 750-552 into the 3-bit code for controlling the operation of switch 750-306.

The signal GSRCH100 is generated by the circuits of block 750-526. As explained herein, this signal is only forced to a binary ONE during the second half of a T clock cycle. Thus, an output from one of the NAND gates 750-51200 through 750-51208 is generated only during that interval. More specifically, the hit signal specified by the state of the full-empty bit causes one of the signals ZCDLEV1000 through ZCDLEV7000 to be forced to a binary ZERO state. This, in turn, conditions NAND gates 750-51216 through 750-51220 to generate the appropriate 3-bit code.

Signal ZCDICENAB100 also generated by the circuits of block 750-526 is forced to a binary ONE only during the first half of a T clock cycle. Thus, outputs from NAND gates 750-51210 through 750-51214 are generated only during that interval. That is, the instruction address level signals ZNICLEV0100 through ZNICLEV2100 from block 750-910 produce signals ICL0000 through ICL2000 which, in turn, produce signals ZCD0100 through ZCD2100. It will be noted that the signals ZCD0100 through ZCD2100 correspond to ZNICLEV0100 through ZNICLEV2100.

The signals RDDBLL0000 through RDDBLL2000 are used to define the second cycle of operation for a read double command. Accordingly, when any one of the signals RDDBLL0000 through RDDBLL2000 are in a binary ZERO state, this forces a corresponding one of the signals ZCD0100 through ZCD2100 to a binary ONE.

The signals ZCD0100 through ZCD2100 are applied to different inputs of corresponding ones of the amplifier driver circuits 750-51224 through 750-51228. These circuits apply the control signals [ZCD100 through [ZCD2100 to the control terminals of switch 750-306.

A next block shown in greater detail in FIG. 7c is block 750-526. As mentioned previously, block 750-526 includes a number of directory control flip-flops. The control state flip-flops shown include the directory assignment (FDIRASN) control state flip-flop 750-52600 and a plurality of timing flip-flops of a register 750-52610.

The flip-flop 750-52600 is a clocked D type flip-flop which is set to a binary ONE via first input AND gate in the case of a command request (i.e., signal REQCOMB0100 is a binary ONE) for a read type command (i.e., RDTYP100 is a binary ONE) when processor 700 requests data from memory and not cache 750 (i.e., signal BYPCAC110 is a binary ONE). In greater detail, in the absence of a hold condition (i.e., signal HOLD000 applied via an AND gate 750-52602 is a binary ONE), a go transfer (i.e., signal NOGO021 is a binary ONE), no cancel condition (i.e., signal CANCELC010 is a binary ONE) and processor 700 has signalled a request (i.e., signal DREQCAC111 is a binary ONE) and AND gate 750-52604 forces signal REQCOMB0100 to a binary ONE.

An AND gate 750-52606 forces the signal SETONBYP100 to a binary ONE in the case of read type when decoder circuit 750-528 forces signal RDTYP100 to a binary ONE when processor 700 forces the bypass cache signal BYPCAC110 to a binary ONE. The result is that the FDIRASN flip-flop 750-52600 switches to a binary ONE for specifying a directory assignment cycle of operation.

The flip-flop 750-52600 is also set to a binary ONE via a second input AND gate in the case of a command request (i.e., signal REQCOMB0100 is a binary ONE) when a miss condition is detected for the block requested to be read (i.e., signal SETONMISS100 is a binary ONE). The signal SETONMISS100 is forced to a binary ONE by an AND gate 750-52608 when signal RDTYP100 is a binary ONE and signal RAWHIT000 from block 750-512 is a binary ONE. The flip-flop 750-52600 is reset to a binary ZERO state upon the occurrence of clock signal [CLOCK112 generated from the common source in the absence of a set output signal from the two input AND gates.

A first flip-flop (FICENAB) of register 750-52610 is used to define the interval of time within a T clock cycle when instructions or operands are to be fetched from cache 750.

This flip-flop is switched to a binary ONE state via a first AND gate in response to a clock signal [CLOCKD120 when signal FHT100 generated by the timing circuits of block 750-112 is a binary ONE. Clock signal [CLOCKD120 from the common timing source is applied via an AND gate 750-52612 and an inverter circuit 750-52612 and an inverter circuit 750-52514. The FICENAB flip-flop resets on the following clock signal when signal FHT100 has been switched to a binary ZERO.

The second flip-flop of register 750-52610 is used to define an interval during which operands (not instructions) are being fetched from cache 750 as a consequence of a special condition caused by an IF1 command which did not specify the last word in an instruction block. The FRCIC flip-flop is switched to a binary ONE via a first input AND gate in response to clock signal [CLOCKD120 when signal FJAMZNI-CLEV000 is a binary ONE. The FRCIC flip-flop resets on the following clock pulse when signal FJAMZNI-CLEV000 has been switched to a binary ZERO.

As shown, the signal at the binary ZERO output terminal of the FICENAB flip-flop corresponds to the gate half T clock signal GATEHFTCHLK110 which is distributed to the circuits of block 750-920.

The signal FICENAB000 is combined with signal FRCIC000 and signal RDDBLZCDE000 within an AND gate 750-52616 to produce signal GSRCH100. The signal RDDBLZCDE000 is from decoder circuit. This gate forces signal GSRCH100 to a binary ONE during the second half of a T clock cycle when operands are being fetched (i.e., signal FICENAB000 is a binary ONE) except in the case of a read double command (i.e., signal RDDBLZCDE000 is a binary ONE).

The binary ZERO output of the FICENA flip-flop is combined with signal FRCIC000 within a NAND gate 750-52618. The NAND gate 750-52618 operates to force signal ZCDINCENAB100 to a binary ONE during the first half T interval when instructions are being fetched (i.e., signal FICENAB000 is a binary ZERO) or in the case of the type IF1 command described above (i.e., signal FRCIC000 is a binary ZERO).

The circuits of block 750-526 further include a NAND gate 750-52620 and a plurality of AND gates 750-52622 through 750-52628 connected, as shown. The circuits generate a first enable control signal DIRADDE100 for controlling the operation of decoder circuit 750-521. Additionally, they generate a second enable control signal FEDCODE100 for controlling the operation of a decoder circuit 750-52000 of block 750-520.

In greater detail, during a directory assignment cycle (i.e., signal FDIRASN100 is a binary ONE) in the absence of a transfer no go condition (i.e., signal NOGO21 is a binary ONE), AND gate 750-52626 forces signal DIRNOGO100 to a binary ONE. When a signal FSKIPRR000 from the circuits of block 750-916 is a binary ONE, this causes the AND gate 750-52628 to force signal DIRADDE100 to a binary ONE which enables decoder circuit 750-521 for operation. When either signal DIRNOGO100 or FSKIPRR000 is forced to a binary ZERO, this causes AND gate 750-52628 to disable decoder circuit 750-521 by forcing signal DIRADDE100 to a binary ZERO.

Under the same conditions, the AND gate 750-52624 forces signal FEDCODE100 to a binary ONE which enables decoder circuit 750-52000 for operation. The AND gate 750-52630 causes an amplifier circuit 750-52632 to force signal FORCEBYP000 to a binary ONE when both signals FSKIPRR000 and FBYP-CAC00 are binary ONES. The FORCEBYP000 is applied to the transit block flag section of block 750-102. The signal FBYPCAC000 is generated in a conventional manner in accordance with the signal applied to the line BYPCAC by processor 700. The signal is stored in a flip-flop, not shown, whose binary ZERO output corresponds to signal FBYPCAC000.

The circuits of block 750-520, as shown, include the decoder circuit 750-52000 and a pair of multiplexer circuits 750-52002 and 750-52004. It is assumed that normally the signals applied to the "0" input terminals of multiplexer circuits 750-52002 and 750-52004 are selected to be applied as outputs (i.e., the signal applied to the G input is a binary ZERO). Therefore, when the decoder circuit 750-520000 is enabled, the output signals FED0100 through FED7100 result in the generation of signals RWFE0100 through RWFE7100 in response to clock signal [CLOCK000.

The FIG. 7c also shows in greater detail register 750-504 as including a clocked four stage register 750-50400 and a plurality of amplifier circuits 750-50402 through 750-50602. The register 750-50400 includes D type flip-flops, the first three of which are connected for storing round robin signals OLDRR0100 through OLDRR2100. The fourth flip-flop is connected to indicate the presence of an alternate hit condition having been detected by the circuits of block 750-562, not shown. That is, it is set to a binary ONE state when signal ALTHIT100 is a binary ONE.

It will be noted that the flip-flops of register 750-50400 are only enabled in response to clock signal [CLOCK112 when signal FDIRASN000 is a binary ONE indicative of no directory assignment cycle being performed (a hit condition).

In the case of a hit condition detected within the half of a block being referenced, signal ALTHIT000 is forced to a binary ZERO. This causes the first three flip-flops of register 750-50400 to be loaded via a first set of input AND gates with the round robin signals RR0100 through RR2100 from block 750-500. When there is a hit condition detected within the other half (alternate) of the block being referenced, the circuits of block 750-512 force signal ALTHIT100 to a binary ONE. This causes the three flip-flops to be loaded via a second set of input AND gates with the alternate level signals ALTHITLEV0100 through ALTHITLEV2100 generated by the circuits of block 750-512.

The binary ONE signals of register 750-50400 are applied as inputs to the amplifier driver circuits 750-50402 through 750-50406 for storage in the transit block buffer 750-102. The same signals are applied to the A operand input terminals of an adder circuit of block 750-508. The adder circuit adds or increments the signals OLDRR0100 through OLDRR2100 by one via the binary ONE applied to the C1 terminal of the adder circuit. The sum signals NXTRR0100 through NXTRR2100 generated at the F output terminals are written into the round robin section of control directory 750-500.

Figure 7D:
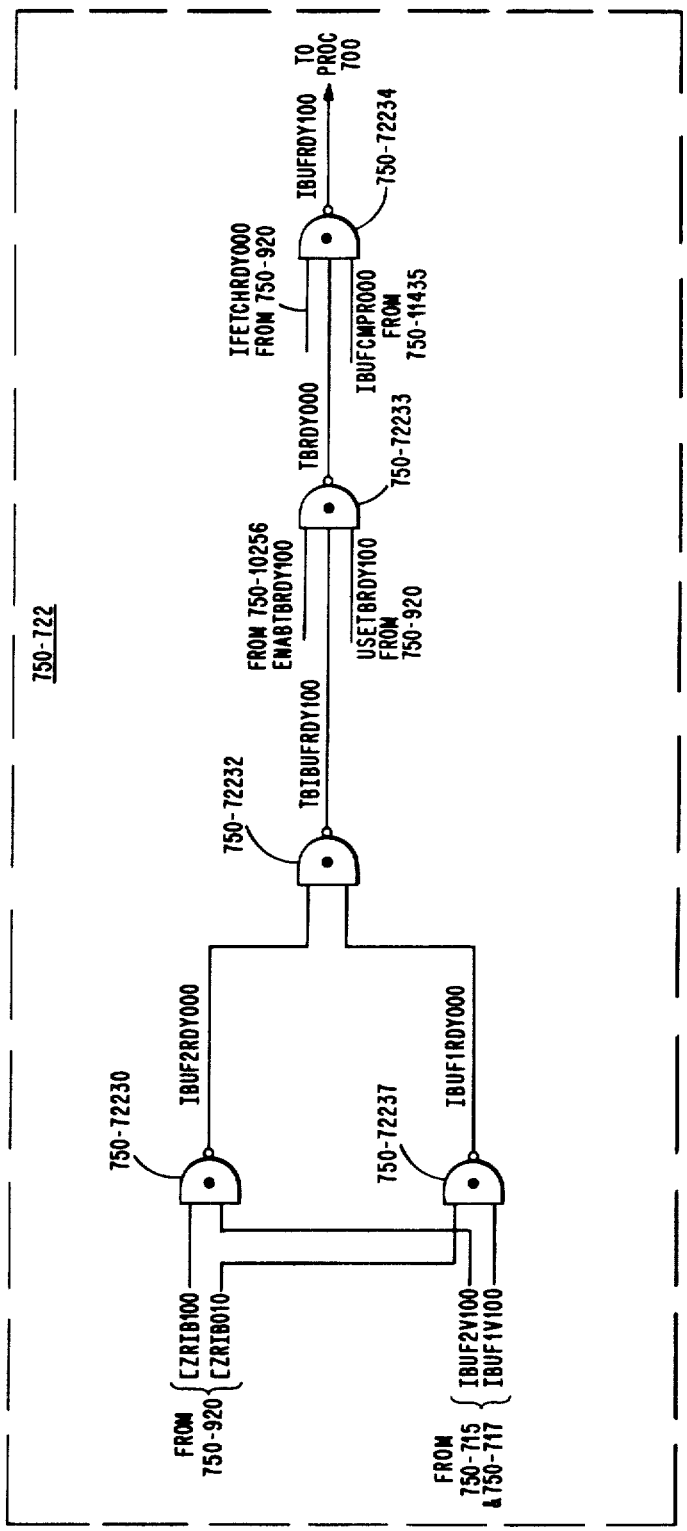
Figure 7E:
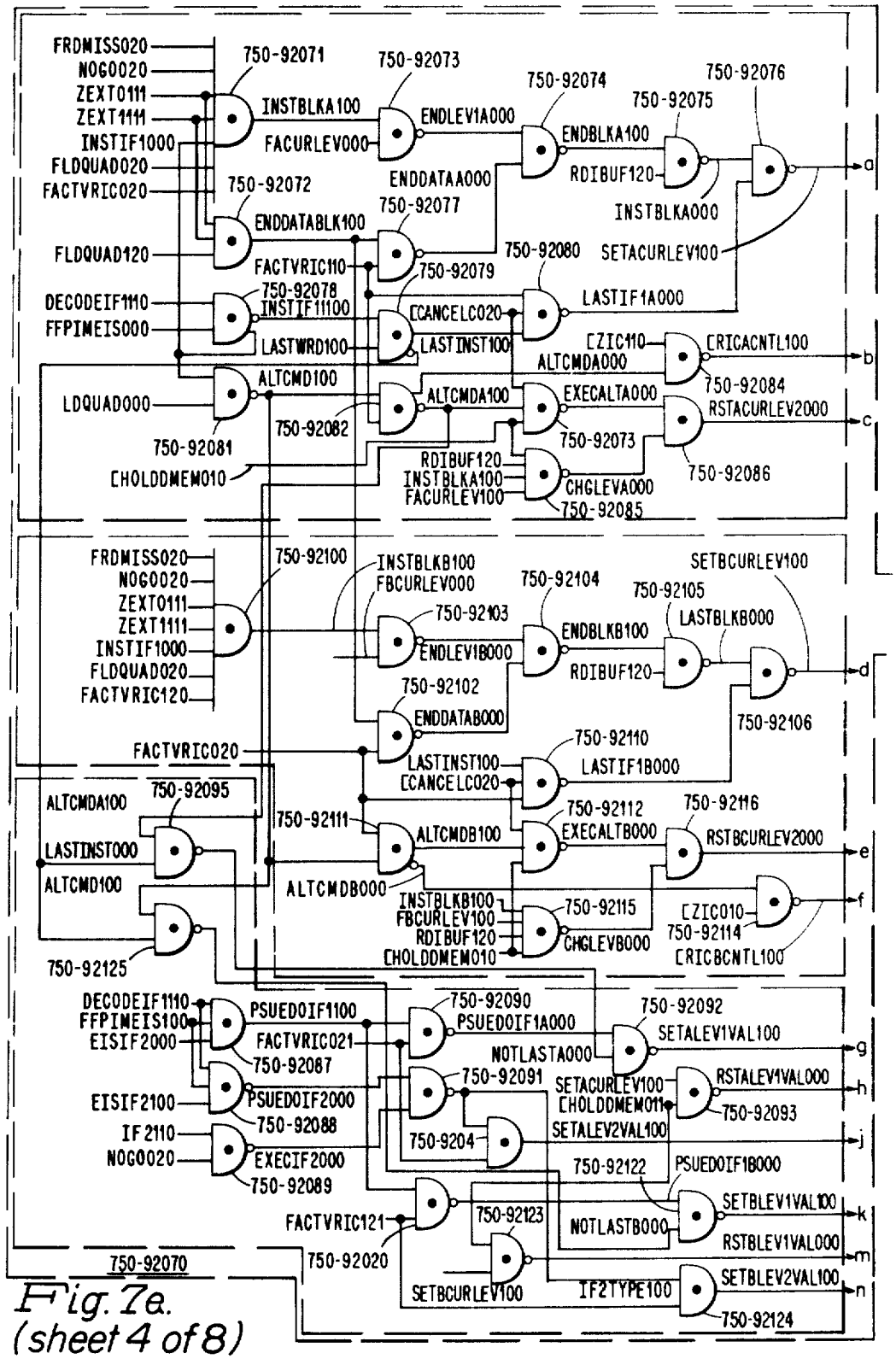

Lastly, the signals OLDRR0100 through OLDRR2100 are applied as inputs to another set of amplifier driver circuits 750-50408 through 750-50412 for storage in one of the instruction address registers 750-900 and 750-902 of FIG. 7e.

DETAILED DESCRIPTION OF SECTION 750-7

FIG. 7d shows in greater detail different ones of blocks of section 750-7. As seen from FIG. 7d, block 750-722 includes a plurality of series connected NAND gates 750-72230 through 750-72234. The NAND gates 750-72230 and 750-72231 are connected to receive instruction buffer valid and instruction control signals IBUF1V100, [ZRIB010 and IBUF2V100, [ZRIB100 from I buffers 750-715 and 750-717 and block 750-920. The IBUF1V100 and IBUF2V100 signals indicate the instruction buffer into which information is being loaded. That is, when signal IBUF1V100 is a binary ONE, that specifies that I buffer 750-715 is loaded. When signal IBUF2V100 is a binary ONE, that specifies that I buffer 750-717 is loaded with an instruction word.

The control signals [ZRIB010 and [ZRIB100 specify which instruction buffer valid bit is to be examined which corresponds to the instruction buffer being addressed. That is, when signal [ZRIB010 is a binary ONE, the IBUF1 valid bit is specified by the circuits of block 750-920. When signal [ZRIB100 is a binary ONE, that specifies the IBUF2 valid bit. When either signal IBUF1RDY000 or signal IBUF2RDY000 is forced to a binary ZERO, NAND gate 750-72232 forces signal TBIBUFRDY100 to a binary ONE indicative of a ready condition.

The circuits of block 750-920 force an enabling signal USETBRDY100 to a binary ONE following the switching of the appropriate I buffer valid bit. This causes the NAND gate 750-72233 to force the TBRDY000 signal to a binary ZERO. The result is that NAND gate 750-72234 forces the IBUFRDY100 to a binary ONE signalling the ready condition.

It will also be noted that NAND gate 750-72234 also forces the IBUFRDY100 signal to a binary ONE when an instruction fetch ready signal IFETCHRDY000 is forced to a binary ZERO by the circuits of block 750-920. Signal IFETCHRDY000 is a binary ONE except when the instructions are being pulled from a block in cache. Lastly, NAND gate 750-72234 forces IBUFRDY100 signal to a binary ONE when an instruction buffer compare signal IBUFCMPR000 is forced to a binary ONE comparator circuit 750-11435.

DETAILED DESCRIPTION OF SECTION 750-9

FIG. 7e shows in greater detail specific ones of the blocks of section 750-9. Corresponding reference numbers have been used where possible.

Referring to FIG. 7e, it is seen that the block 750-920 includes a first group of circuits of block 750-92000 which generate the four sets of write control signals WRT00100 through WRT70100, WRT01100 through WRT71100, WRT02110 through WRT72100 and WRT03100 through WRT73100. As seen from FIG. 7e, these circuits include a pair of multiplexer circuits 750-92002 and 750-92004, a register 750-92006 and four octal decoder circuits 750-92008 through 750-92014, connected as shown.

The multiplexer circuit 750-92002 has signals RHITLEV0100 through RHITLEV2100 from block 750-512 applied to the set of "0" input terminals while signals RTBLEV0100 through RTBLEV2100 applied to the set of "1" input terminals. During the first half of a T cycle when signal FDFN2HT100 applied to the control terminal G0/G1 is a binary ZERO, the signals RHITLEV0100 and RHITLEV2100 are applied to the output terminals. They are clocked into the top three flip-flops of register 750-92006 in response to T clock signal [CLKHT02. This enables processor operands to be written into cache 750-300 during the second half of the T clock cycle. During the second half of a T cycle when signal FDFN2HT100 is forced to a binary ONE, the signals RTBLEV0100 through RTBLEV2100 are clocked into the register 750-92006 in response to the T clock signal [CLKHT02. This enables memory data to be written into cache 750-300 during the first half of the next cycle.

The second multiplexer circuit 750-92004 has signals ZONE0100 through ZONE3100 from switch 750-144 applied to the set of "0" input terminals while signal MEMWRTREQ100 from block 750-112 is applied to the set of "1" input terminals. When signal FDFN2HT100 is a binary ZERO, the signals ZONE0100 through ZONE3100 are applied to the output terminals. They are clocked into the bottom four flip-flops of register 750-9206 in response to T clock signal [CLKHT02. During the first half of a T clock cycle, NAND gate 750-92005 forces signal ENBWRT100 to a binary ONE which enables the previously loaded signals to be applied to the output terminals. This enables the processor zone bits to be used in specifying which operand bytes are to be updated when writing processor data into the specified level of cache. When signal FDFN2HT100 is forced to a binary ONE, the signal MEMWRTREQ100 is clocked into the register 750-92006. This causes all the zone bits to be forced to binary ONES for causing all of the bytes of each data word received from memory to be written into the specified level of cache during the first half of the next T clock cycle.

As seen from FIG. 7e, different ones of the signals RWRTLEV0100 through RWRTLEV2100 are applied to the enable input terminals of octal decoder circuits 750-92008 through 750-92014. The signals RWRTLEV0100 through RWRTLEV2100 are applied to the input terminals of each of the octal decoder circuits 750-92008 through 750-92014.

The block 750-920 includes a second group of circuits of block 750-92020. These circuits generate the half T clock signal applied to the circuits of block 750-92000, the enable memory level signal ENABMEMLEV100, and enable address signal ENADR1100 applied to the circuits of block 750-303. They also generate the sets of control signals [ZIC010, [ZIC110 and [RICA100, [RICB100 applied to the circuits of instruction address registers 750-900 and 750-902 in addition to control signals [RIRA100 and [RIRB100 applied to the registers 750-308 and 750-310.

The circuits of block 750-92020 include a pair of half definer flip-flops of a register 750-92022, a group of three control flip-flops of register 750-92024 and a clocked flip-flop 750-92026. The circuits also include a number of AND gates, NAND gates, AND/NAND gates and AND/OR gate 750-92030 through 750-92041.

The series connected AND/NAND gate 750-92030, AND/OR gate 750-92032 and AND gates 750-92034 and 750-92035 in response to a signal FLDQUAD100 from 750-916, a signal FWFIDESC010 from processor 700 and signals FACTVRIC000 and FACTVRIC100 from register 750-92024 generate control signals [ZIC000, [ZIC010 and [ZIC110. These signals are used to control the operation of ZIC switch 750-906 and the different sections of registers 750-900 and 750-902 (e.g. level valid bit storage and level bit storage) in addition to registers associated therewith.

The series connected AND gate 750-92036, the AND/NAND gate 750-92037 and NAND gates 750-92038 through 750-92041 operate to generate register strobe signals [RICA100 and [RICB100. These signals control the loading of registers 750-900 and 750-902. The AND gate 750-92036 forces signal VALRDIBUF100 to a binary ONE when a hit condition was detected in the case of a read command (i.e., signal FRDMISS000 is a binary ONE), the transfer was a go (i.e., signal NOGO020 is a binary ONE) and signal CMPDATA/ICLEV000 from the comparator circuit of block 750-912 is a binary ONE.

The signal FRDMISS000 is obtained from the binary ZERO output of the flip-flop, not shown, which as mentioned is set in accordance with the Boolean expression: FRDMISS=(RDCMD·[HOLDDMEM·HIT·TOIC·[CANCELC). The signals GOODFTCHA100 and GOODFTCHB100 generated by circuits, not shown, indicate whether the RICA register 750-900 or RICB register 750-902 is being used at that time and its contents are therefore incremented. For example, signal GOODFTCHA100 is generated in accordance with the following Boolean expression: GOODFTCHA=IN-STIF1·FLDQUAD·FACT-VRIC·FDFN2HT+FDFN2HT·FL-DQUAD·FACTVRIC. Signal GOODFTCHB is generated in a similar fashion except for the reversal in states of signals FACTVRIC and FACTVRIC.

It is seen that when signal EXECRDIBUF100 is forced to a binary ONE when processor 700 forces signal RDIBUF110 to a binary ONE, the NAND gate 750-92039 causes NAND gate 750-92041 to force signal [RICA100 to a binary ONE when signal GOODFT-CHA100 is a binary ONE. The signal ENBSTRBA000 indicates when the RICA register 750-900 is being initially loaded. That is, when signal ENBSTRBA000 is forced to a binary ZERO, it causes NAND gate 750-92041 to force signal [RICA100 to a binary ONE. More specifically, signal ENBSTRBA is generated in accordance with the following Boolean expression:
ENBSTRBA=FLDQUAD·FACTVRIC·FNEWIF-1·FDFN1HT+FDFN1HT·FACTVRIC·FJAMZ-NICLEV·FHOLDIF1 +(INSTIF1+DCDL-DQUAD)·FACTVRIC·FDFN2HT·[-CANCLCMD+FDFN2HT·[ZIC·INH2-HT·ENAB2HT.
wherein ENAB2HT=ENABRIC1+ENABRIC2 and INH2HT=[CANCLCMD·FLASTINST. Under either set of conditions, signals [RICA100 and [RICB100 enable the strobing of their corresponding registers when they are either being initially loaded or following incrementing as when instructions are being fetched or pulled out from cache.

The NAND gate 750-92042, AND/NAND gate 750-92043 and NAND gates 750-92044 through 750-92049 are connected to generate register strobe signals [RIRA100 and [RIRB100 in a fashion similar to the generation of register strobe signals [RICA100 and [RICB100.

The NAND gate 750-92046 forces signal [RIRA100 to a binary ONE in the case of a new instruction fetch (i.e., signal NEWINST000 is a binary ZERO) or when the processor 700 takes an instruction from RIRA register 750-308 (i.e., signal TAKEINST000 is a binary ZERO). The NAND gate 750-92049 forces signal [RIRB100 in the case of a new operand fetch (i.e., signal NEWDATA000 is a binary ZERO) or when processor 700 takes a data word from RIRB register 750-310 (i.e., signal TAKEDATA000 is a binary ZERO).

The AND gate 750-92050 and AND/NAND gate 750-92051 generate signal ENBMEMLEV100 during the second half of a T clock cycle (i.e., signal FDFN2HT101 is a binary ONE) when the circuits of block 750-112 force memory write request signal MEMWRTREQ100 to a binary ONE. The NAND gate 750-92052 generates signal ENBADR1100 during the second half of a T clock cycle (i.e., signal FDFN1HT101 is a binary ZERO) or when the instruction counter is in use (i.e., signal USEIC000 is a binary ZERO).

As concerns the flip-flop registers, it is seen that the flip-flop of register 750-92026 is switched to a binary ONE state via a first AND gate when AND gate 750-92053 is conditioned to force signal INSTIF1100 to a binary ONE in response to an IF1 command being decoded by decoder circuit 750-922 (i.e., signal DCDIF1100 is a binary ONE) which does not require additional descriptors (i.e., signal FFPIMEIS020 from processor 700 is a binary ONE) and AND gate 750-92054 forces signal [CANCELCMD000 to a binary ONE in response to a no cancel condition (i.e., signal [CANCELC010 is a binary ONE) and a no hold condition (i.e., signal [HOLDDMEM001 is a binary ZERO).

The flip-flop register 750-92026 is reset to a binary ZERO via a second input AND gate which receives signals ENABNEWINST000 and NEWIF1FDBK100 from a pair of NAND gates 750-92042 and 750-92043 and AND gate 750-92055. The binary ONE output of the flip-flop register 750-92026 is applied to NAND gate 750-92056. NAND gate 750-92056, during the first half of a T clock cycle (i.e., signal FDFN1HT100 is a binary ONE), switches signal USEIC000 to a binary ZERO when signal FNEWIF1100 is switched to a binary ONE.

The second flip-flop register 750-92022 includes the pair of timing flip-flops which are both set to binary ONES in response to signal GATEHFTCLK100 from section 750-5 in response to ½ T clock signal [CLKHT021. The flip-flops of register 750-92022 are reset to binary ZEROS in response to the next ½ T clock signal [CLKHT021.

The flip-flops of register 750-92024, as mentioned previously, provide various state control signals. The first flip-flop (FRDIBUF) is switched to a binary ONE state when NAND gate 750-92060 forces signal SETR-DIBUF100 to a binary ONE in response to read I buffer request from processor 700 (i.e., signal EXECR-DIBUF000 is a binary ZERO) or an inhibit ready condition (i.e., signal FINHRDY010 is a binary ZERO)

when AND gate 750-92061 forces signal ENABSETRDIBUF100 to a binary ONE. The signal ENABSETRDIBUF100 is forced to a binary ONE in the case of a command which is not a load quad command (i.e., signal FLDQUAD000 is a binary ONE) or an instruction fetch 1 command (i.e., signal GOODIF1000 is a binary ONE). The FRDIBUF flip-flop is reset a clock period later in response to T clock signal [CLKT021 via a second input AND gate.

The second flip-flop (FACTVRIC) of register 750-92024 is set and reset in accordance with the Boolean expressions previously given via the NAND gate 750-92062 and 750-92064, the AND gate 750-92063 and AND/NAND gate 750-92065. The third flip-flop (FRDDATA) is set to a binary ONE state via a first input AND gate in response to signal SETRDIBUF100 when the command is a load quad command (i.e., signal FLDQUAD100 is a binary ONE). The FRDDATA flip-flop is reset to a binary ZERO state a clock period later via a second input AND gate in response to the T clock signal [CLKT021.

The next group of circuits included within block 750-920 include the circuits of block 750-92070. As seen from FIG. 7e, these circuits include a first plurality of AND gates, AND/NAND gates and NAND gates 750-92071 through 750-92086, connected as shown. These gates generate control signals SETACURLEV100, [RICACNTL100 and RSTACURLEV2000 which control the setting and resetting of the current level and level valid bit positions of RICA register 750-900 in accordance with the states of signals SETALEV1VAL100, RSTALEV1VAL000 and SETLEV2VAL100. These signals are generated by another plurality of AND gates and NAND gates 750-92087 through 750-92095.

A second plurality of AND gates, AND/NAND gates and NAND gates 750-92100 through 750-92116, in a similar fashion, generates signals SETBCURLEV100, RSTBCURLEV200 and [RICBCNTL100 which set and reset the current level and valid bits for the RICB register 750-902 in accordance with signals SETBLEV1VAL100, RSTBLEV1VAL000 and SETBLEV2VAL100. These signals are generated another plurality of AND gates and NAND gates 750-92120 through 750-92125.

A plurality of AND gates 950-92126 through 750-92129, in response to signals SETALEV1VAL100, SETBLEV1VAL100, SETALEV2VAL100 and SETBLEV1VAL100, generate control signals [RICALEV1100 through [RICBLEV2100 when signal [CANCELCMD000 is a binary ONE. These signals are applied to the control input terminals of the level bit storage sections of the RICA and RICB registers 750-900 and 750-902 for controlling the loading of hit level signals from section 750-512.

A further plurality of AND/NAND, AND/OR gates and NAND gates 750-92130 through 750-92137, in response to signals from the lvel valid bit storage and level storage sections of registers 750-900 and 750-902, generate the use transit buffer ready signal USETBRDY100 and the control signals [ZRIB010 and [ZRIB100 which are applied to the circuits of block 750-114.

It is also seen that block 750-92070 includes a four D type flip-flop register 750-92140, the pair of AND gates 750-92141 and 750-92142, the pair of AND/NAND gates 750-92143 and 750-92144 and the pair of AND-/OR gates 750-92145 and 750-92146, connected as shown. The flip-flops of register 750-92140 are loaded with the contents of bit positions 8 and 9 of the RICA and RICB register 750-900 and 750-902 in response to T clock signal [CLKHT020 under the control of signals [RICA100 and [RICB100. That is, the top pair of register flip-flops are clocked when signal [RICA100 applied to terminal G1 is forced to a binary ONE while the bottom pair of register flip-flops are clocked when signal [RICB100 applied to terminal G2 is forced to a binary ONE. The signals [ZIC000 and [ZIC100 applied to terminals G3 and G4 control independently the generation output signals from the top pair of flip-flops and bottom pair of flip-flops respectively at the corresponding sets of output terminals.

Pairs of binary ZERO output signals are combined within AND gates 750-92141 and 750-92142 to generate address signals ZEXT0100 and ZEXT1100, in addition to those signals required for the generation of control signal NEXTLEVVAL100 which is applied to the control input terminals of comparator circuit 750-912.

At last group of circuits include a flip-flop register 750-92150 and a plurality of AND gates, an AND/NAND gate, NAND gates and AND/OR gate 750-92151 through 750-92156. These circuits are connected to generate signal IFETCHRDY000 which is applied to the circuits of section 750-114. The gates 750-92153 and 750-92154 are connected to generate timing signals DFN2HT101 and DFN2HT100 in response to signal FHT010 from block 750-112. These signals are forced to binary ONES during the second half of a T clock cycle of operation.

The flip-flop register 750-92150 is set to a binary ONE via a first input AND gate when AND gates 750-92151 and 750-92152 force signals SETINHRDY100 and CANCELINHRDY000 to binary ONES. It is reset to a binary ZERO via a second input AND gate when NAND gate 750-92155 force signal RSINHRDY000 to a binary ZERO. The binary ZERO output of register 750-92150 is applied to AND/OR gate 750-92156. When signal FINHRDY000 is forced to a binary ZERO, it causes gate 750-92156 to force signal IFETCHRDY000 to a binary ONE state.

Additionally, FIG. 7e shows in greater detail the switch 750-910 and comparator circuits of blocks 750-912 and 750-914. The switch 750-910 is a crossbar switch which operates in the manner previously described. The W outputs select one of the two sets of signals applied to the A0 and A1 terminals in accordance with the state of signal [ZIC110. The X outputs select one of the two sets of signals applied to the A3 and A4 terminals in accordance with the state of signal [ZIC110. The Y and Z outputs select one of the four sets of signals applied to the A0-A4 terminals in accordance with the states of signals [ZIC110, [ZNICLEV100 and [ZIC110, ZCURLEV100.

The output signals ZNICLEV0100 through ZNICLEV2100 from the Y output terminal of circuit 750-910 are applied to the B input terminals of comparator circuit 750-912 for comparison with the signals RTBLEV0100 through RTBLEV2100 from section 750-102. The comparator circuit 750-912 is enabled when decoder circuit 750-922 had decoded an IF1 command (i.e., signal DECODEIF1010 is a binary ONE) and signal NEXTLEVVAL100 is a binary ONE. The comparison results in the generation of signals CMPDATA/ICLEV100 and CMPDATA/ICLEV000.

Other comparator circuits of blocks 750-912 and 750-914 operate in a similar manner to generate signals CMPCURLEV100 and CMPALTLEV100. In greater detail, another section of circuit 750-912 compares signals ZICLEV0100 through ZICLEV2100 with signals C7RR0100 through C7RR2100. When there is a true comparison, signal CMPCURLEV100 is forced to a binary ONE. This section is enabled via a NAND gate 750-91202 when either signal ZLEV1VAL000 or signal ZLEV2VAL000 is a binary ZERO.

The comparator circuit 750-914 has two sections enabled by pairs of signals ZCURLEV100, ZLEV1VAL100 and ZCURLEV000, ZLEV2VAL100 as shown. The first section compares level 1 signals ZLEV10100 through ZLEV12100 with round robin signals C7RR0100 through C7RR2100. When there is a true comparison, the output signal at the A=B terminal is forced to a binary ZERO which causes NAND gate 750-91402 to force signal CMPALTLEV100 to a binary ONE.

In a similar fashion, the second section compares level 2 signals ZLEV20100 through ZLEV22100 with round robin signals C7RR0100 through C7RR2100. When there is a true comparison, the output signal is forced to a binary ZERO which causes NAND gate 750-91402 to force signal CMPALTLEV100 to a binary ONE.

DESCRIPTION OF OPERATION

With reference to FIGS. 1 through 7e, the operation of the preferred embodiment of the present invention will now be described.

As discussed above, the T clock cycle is divided into first and second halves. That is, when signal FHT100 is a binary ONE, this defines the first half of a T clock cycle. When signal FHT100 is a binary ZERO, this defines the second half of a T clock cycle.

During the first half of the T clock cycle, instructions are fetched and memory data is written into cache 750-300 when there is no conflict as explained herein. In both cases, the level to be accessed is already established. That is, for instructions, the level is stored in either the RICA or RICB instruction address register at the time an IF1 or IF2 command received from processor 700 was executed. For memory data, the level is stored in one of the register locations of transit block buffer 750-102 as a result of the circuits of block 750-520 having detected a miss condition which caused cache 750 to fetch the requested data from memory. During the second half of a T clock cycle, either operand data is accessed from cache or processor data is written into cache in accordance with the results of a directory search.

As previously discussed, processor 700 carries out various operations during I, C and E cycles of operation in executing instructions. This results in the issuance of cache commands by processor 700 to cache unit 750 as described herein. For ease of explanation, it is assumed that the instructions reside in cache unit 750-300.

It will be appreciated that at some point during instruction processing, processor 700 loads one of the instruction address registers RICA/RICB with address and level information. This usually comes about as a consequence of the processor executing a transfer or branch instruction which results in processor 700 generating an IF1 command followed by an IF2 command. Following the execution of these commands by cache unit 750, instructions are fetched during the first half of a T clock cycle and operands are fetched during the second half T clock cycle.

The operation of cache unit 750 in executing the IF1 and IF2 commands now will be described briefly. The IF1 command upon receipt by cache unit 750 is decoded by the decoder circuits 750-922. The decoder circuits 750-922 cause the circuits of block 750-920 to generate signals for loading the alternate instruction address register which is assumed to be RICA with signals corresponding to the incremented value of the address included within the IF1 command.

That is, during the first T clock cycle, the address signals from switch 750-530 are incremented by one by circuit 750-912 and loaded into the RICA instruction address register 750-900 in response to ½ T clock signal [CLKHT100 when signal [RICA100 is a binary ONE. The signal [RICA100 is forced to a binary ONE by the circuits 750-920 when signal ENBSTRBA000 of FIG. 7d is forced to a binary ZERO during the first half of the first T clock cycle.

During the first half of the first T clock cycle, the IF1 command address is loaded into all of the RADRO registers 750-301a through 750-301n via the ZADRO-7 address selection switches 750-302a through 750-302n in response to signal [CLKHT100. During the first half of the T clock cycle, signal ENBMEMLEV100 is a binary ZERO. Also, signal ENBADR1100 is a binary ZERO (i.e., the control state FNEWIF1 flip-flop 750-92026 switches on the T clock in response to signal [CLKT021. Therefore, each of the pairs of signals [ZADR01100, [ZADR00100 through [ZADR71100, [ZADR70100 are binary ZEROS causing position 0 to be selected as an address source for all eight address registers 750-301a through 750-301n.

The IF1 command address is also applied as an input to the directory circuits of block 750-502 via ZDAD switch 750-530 for a search cycle of operation. Since the instruction block is in cache, the circuits of block 750-512 generate hit signal HITTOC7100 and hit level signals HITLEVC70100-2100 which are applied to section 750-9. The decoding of the IF1 command causes the hit level signals HITLEVC70100-2100 to be loaded into the level 1 bit positions of the RICA instruction address register. Also, the level 1 valid bit and hit/miss bit positions of the RICA register 750-900 are forced to binary ONES (i.e., hit signal HITTOC7100 switches the hit/miss bit position to a binary ONE). The stored level 1 value is thereafter used to control the operation of the ZCD switch 750-306 during subsequent instruction fetches as explained herein.

The first instruction accessed from the location specified by the IF1 address is transferred as an operand word to processor 700 during the second half of the first T clock cycle via position 1 of the ZDI switch 750-312 during the end of the first T clock cycle. The first instruction is clocked into the RBIR register 704-152 of processor 700 on the T clock in response to signal [CLKT100.

The signal FJAMZNICLEV000 enables the next instruction to be transferred to processor 700 during the second half of the second T clock cycle. This signal is forced to a binary ZERO by the circuits of block 750-920. The signal FJAMZNICLEV000 again causes the level signals ZNICLEV000-2100 obtained from RICA register 750-900 to be applied as inputs to the control input terminals of ZCD switch 750-306 following execution of the IF1 command. That is, referring to FIG. 7c, it is seen that signal FJAMZNICLEV000 switches signal FRCIC000 to a binary ZERO. This causes NAND gate 750-52618 to force signal ZCDINCENAB100 to a binary ONE during the second half of the second T clock cycle. Signal ZCDINCENAB100 conditions NAND gates 750-51210 through 750-51214 to generate signals [ZCD0100 through [ZCD2100 from signals ZNICLEV0100 through ZNICLEV2100.

Also, the IF1 command decoded by decoder circuit 750-922 caused the FNEWIF1 flip-flop 750-92026 to be switched to a binary ONE on the T clock in response to signal [CLKT020. As mentioned previously, it defines the operations during the cycle (second) after the IF1 command was received. More specifically, during the first half of the second T clock cycle, the NEWIF1 flip-flop 750-92026 causes NAND gate 750-92056 to switch signal USEIC000 to a binary ZERO. The signal USEIC000 conditions NAND gate 750-92052 to force the signal ENBADR1100 to a binary ONE. Since there is no memory data transfer taking place at this time, the decoder circuit 750-30300 is not enabled at this time (i.e., signal ENBMEMLEV100 is a binary ZERO). Thus, signals MMEMLEV0000 through MEMLEV7000 are binary ONES while signals MEMLEV0100 through MEMLEV7100 are binary ZEROS.

The multiplexer circuit 750-30304, in turn, applies the binary ONE signals to its output terminals which results in output signals [ZADR00100 through [ZADR70100 being forced to binary ONES while multiplexer circuit 750-30302 forces signals [ZADR01100 through [ZADR71100 to binary ZEROS. These pairs of signals condition the address selection switches 750-302a through 750-302n to select as a source of address signals, the RICA instruction address register connected to switch position 1 during the first half of the second T clock cycle.

Accordingly, the RADR0-7 address registers 750-302a through 750-302n are loaded via the ZIC switch 750-906 with the address signals from RICA register 750-900 in response to the ½ T clock signal [CLKHT100 during the first half of the second cycle. The RICA register 750-900 is selected since at this time signal [ZIC100 is a binary ZERO. That is, signal ENBALT100 is a binary ZERO and signal FACTVRIC100, from the binary ZERO output of FACTVRIC flip-flop of register 750-92024, is a binary ZERO. These signals condition AND/OR gate 750-92032 to force signal [ZIC100 to a binary ZERO. The address contents applied to cache unit 750-300 cause a second word from each level to be read out to ZCD switch 750-306. The level signals ZNICLEV0100-2100 select the word corresponding to a second instruction at the level specified by the contents of the RICA register 750-900 to be applied to the ZIB lines. It is applied to the ZIB lines via position 0 of the ZIB switch 750-314.

During the first half of the second cycle, the address signals from RICA register 750-900 are again incremented by one by circuit 750-902 and loaded into the RICA register 750-900 via position 1 of ZICIN switch 750-902 in response to ½ T clock signal [CLKHT100 when strobe signal [RICA100 is a binary ONE. Again, signal [RICA100 is forced to a binary ONE when signal ENBSTRBA00 is forced to a binary ZERO during the second half of the second T clock cycle. At T clock time, the address of the third instruction resides in the RICA register 750-900.

The signal FJAMZNICLEV000 when forced to a binary ZERO causes NAND gate 750-92044 to force signal NEWINST000 to a binary ZERO during the second half of the second T clock cycle. This causes NAND gate 750-92046 to force signal [RIRA100 to a binary ONE. On the T clock at the end of the second T clock cycle, the second instruction read out from ZCD switch 750-306 is also loaded into the RIRA register 750-308. This enables processor 700 to load the second instruction into its RBIR register in response to T clock signal [CLKT100 at the end of the second T clock cycle when it has completed execution of the previous instruction.

That is, when processor 700 has completed executing the first instruction, it forces the RDIBUF line to a binary ONE. The signal applied to the RDIBUF line by processor 700 causes the circuits of block 750-92020 to switch the FRDIBUF flip-flop of register 750-92024 to a binary ONE in response to T clock signal [CLKT020. Hence, signal FRDIBUF100 corresponds to the signal applied to the RDIBUF line delayed by one clock period. Thus, it specifies that a signal on the RDIBUF line was received from processor 700 during the last cycle. This indicates whether the RIRA register 750-308 has to be refilled with another instruction during the first half of the third T clock cycle. If processor 700 does not complete the execution of the previous instruction, the RDIBUF line signal will not be generated. When the next instruction to be accessed has already been loaded into the RIRA register 750-308, the register is not refilled during the first half of the next T clock cycle of operation.

The execution of the IF2 command by cache unit 750 is similar to the IF1 command. However, the address contained in the IF2 command is only used for a directory search in the case of a hit as assumed in this example. The result is that the hit level signals HITLEVC70100-2100 generated by the circuits of block 750-512 are loaded into the level 2 bit positions of the RICA register 750-900. Also, the valid bit and hit/miss bit positions are forced to binary ONES (i.e., a go condition is assumed).

When processor 700 completes its execution of the previous instruction, it forces the RDIBUF line to a binary ONE. During the first half of the third T clock cycle, the signal FRDIBUF100 causes the third instruction specified by the level signal contents of the RICA register 750-900 to be loaded into the RIRA register 750-308 and the RICA register contents to be incremented by one and reloaded into the RICA register 750-900.

During a first I cycle (fourth cycle), processor 700 begins executing the third instruction as explained herein. It will be assumed by way of example that the instruction specifies a load operation (LDA) which results in the forwarding of a read type command to cache 750. It is also assumed that the information requested is not in cache store 750-300.

During the I cycle, processor 700 forms an address which is included in the read single command forwarded to cache 750 by processor section 704-4 of FIG. 3e. The command is coded to specify a memory read quad operation for fetching a 4 word block from memory 800. In greater detail, the generated address loaded into the RAD0 register 704-46 serves as the command address. Additionally, command bits 1-4 and zone bits 5-8 are generated by the circuits 704-118 of FIG. 5c and switch 704-40. The zone bits 5-8 are set to binary ONES, since they are not used for read commands. Command bits 1-4 are forced to a command code of 0111 by the decoder circuits of block 704-118 (i.e., quad operation). The circuits of block 704-108 generate the cache command signals coded to specify a read single type command which are applied to the DMEM lines. The decoder 704-120 forces the DREQCAC line to a binary ONE. As seen from FIG. 8, during the next T clock cycle 5, which corresponds to a C cycle, processor 700 signals cache 750 of the cache request by forcing the DREQCAC line to a binary ONE.

The address contained within the read command is applied via ZDAD switch 750-530 as an input to ZADR0-7 switches 750-301a through 750-301n in addition to the directory circuits of blocks 750-500 and 750-502. As seen from FIG. 7c, during the first half of the fifth cycle, AND/NAND gate 750-92051 and NAND gate 750-92052 force signals ENBMEMLEV100 and ENBADR1100 to binary ZEROS. The result is that the circuits of block 750-303 cause the pairs of control signals [ZADR00100, [ZADR01100, through [ZADR70100, [ZADR71100 to be binary ZEROS. Accordingly, the ZADR0-7 switches 750-302a through 750-302n select ZDAD switch 750-532 as an address source.

The read command address is loaded into the RADR0-7 registers 750-301a through 750-301n for application to all levels on a ½ T clock in response to signal [CLKHT100.

As mentioned, since the word specified by the read command address, the circuits of block 750-512 force signals RAWHIT000, HITTOTB010 and HITTOIC010 to binary ONES indicative of a miss condition. Additionally, the FRDMISS flip-flop, not shown, is set to a binary ONE which results in signal FRDMISS120 being forced to a binary ONE.

From FIG. 7c, it is seen that the directory assignment FDIRASN flip-flop 750-52600 switches to a binary ONE because of a miss condition (i.e., signal RAWHIT000 is a binary ONE) when none of the words of the block reside in cache store 750-300 and the full-empty bit signals accessed by the read command address, applied via ZDAD switch 750-530, are binary ZEROS (i.e., no alternate hit condition). The signal ALTHIT000, when a binary ONE, causes the round robin bit signals read out from directory 750-500, to be loaded into register 750-504. The round robin signals are incremented by one so as to indicate the next level for replacement and are written back into directory 750-500.

Also, the round robin signals TBRR0100-2100 are applied as inputs to transit block buffer 750-102 for subsequent loading therein. Further, the round robin signals are decoded by circuits 750-520 and 750-522. This results in the generation of write enable strobe signals for writing the full-empty bits and read command address bits 10-23 into directories 750-500 and 750-502, in addition to incremented round robin signals NXTRR0100-2100 completing the directory assignment. At that time, the FDIRASN flip-flop is reset to a binary ZERO.

Before the directory assignment cycle, prior to the setting of FLDTBVALID flip-flop 750-11414, the write address signals FTBPTR0100-1100 from in pointer flip-flops of block 750-10600 are decoded by decoder circuit 750-10230 which results in forcing one of the register strobe signals [ RTB0100-3100 to a binary ONE to load bit positions 0-4, 9-35 of the specified one of the register locations of transit block buffer 750-102 with the command and address applied to the ZADOB/RADO lines 0-4, 9-23/24-35. At the same time, the corresponding location of command queue 750-108 is loaded with necessary control information required for transferring the read command to main memory.

It will be noted that loading occurs only when the addressed transit block buffer location is available (does not contain a read command). That is, referring to FIG. 7a, it is seen that AND gate 750-10224 only forces signal VALIDIN000 to a binary ONE when the valid bit flip-flop associated with the addressed location is in a binary ZERO state. At that time, one of the NAND gates 750-10216 through 750-10222 specified by in pointer signals IN0100-IN3100 forces its output to a binary ONE when the valid bit flip-flop is a binary ZERO. The remaining NAND gates also force their outputs to a binary ONE because of not being selected (i.e., the in pointer signal applied thereto is a binary ZERO). However, when the valid bit flip-flop of the addressed location is in a binary ONE state, AND gate 750-10224 is inhibited from forcing signal VALIDIN000 to a binary ONE. This, in turn, inhibits the enabling of decoder circuit 750-10230 and the loading of command queue location addressed by in pointer register 750-108.

In accordance with the teachings of the present invention, at the earliest point in time, which corresponds to the time processor 700 applies the read command to the ZADOB/RADO lines, the comparator circuits 750-132 through 750-135 are enabled to compare the read command block address bits 24-31 applied to the RADO lines 24-31 with the block addresses of each of the read commands stored in the read command section of the transit block buffer 750-102. When there is a conflict such that the read command block address is identical to the block address of one or more of the read commands stored in those locations of the transit block buffer 750-102 identified by the binary ONE states of the valid bit flip-flops of register 750-10214, the AND gate 750-136 forces signal TBACMP100 to a binary ONE.

As seen from FIG. 7a, the signal TBACMP100 causes AND/NAND gate 750-11704 to force signal TBHIT100 to a binary ONE and signal TBHIT000 to a binary ZERO. The signal TBHIT000 conditions the hold AND/NAND gates 750-11708 through 750-11712 to force the stop and internal hold control signals to be turned on. This causes processor 700 and certain other sections of cache 750 to halt further operations. It will be noted that the AND gate 750-11703 forces signal INHTBACMP000 to a binary ZERO to prevent the occurrence of false compare due to a directory busy condition (i.e., signal DIRBUSY000 is a binary ZERO), or due to the processor 700 cancelling the command (i.e., signal FINHTBHIT000 is a binary ZERO). This prevents the holding of processor 700 or cache 750 in such situations.

As seen from FIG. 7c, the signal [HOLDDMEM002 inhibits the FDIRASN flip-flop 750-52600. This causes the cache unit 750 to repeat the search cycle of operation until the compare condition goes away. As seen from FIG. 7a, this occurs when the valid bit flip-flop of register 750-10214 associated with the transit block buffer location storing the read command creating the conflict is reset to a binary ZERO. This occurs when signal RESETTBV100 is switched to a binary ONE following the receipt of the four words of memory data sent by main memory in response to the read command transferred to main memory 800 by cache 750. The NAND gate 750-10210 switches signal RE- SETTBV100 to a binary ONE when the last word received from main memory 800 via SIU100 is written into cache store 750-300.

When a corresponding one of the signals FTBV0100-3100 switches to a binary ZERO this disables the compare circuit which is causing AND gate 750-136 to force signal TBACMP100 to a binary ONE. Upon signal TBACMP100 being switched to a binary ZERO, the circuits of block 750-117 force the CPSTOP and [HOLDDMEM signals off releasing or preventing further holding of processor 700 and the cache sections. At that time, the cache 750 then completes the directory search operation. At this time, the information requested by the read command resides in cache store 750-300 as a consequence of having completed execution of the previous read command which produced the conflict. Hence, neither one of the DIRASN and FLDTBVALID flip-flops are set to a binary ONE state, because the circuits of block 750-512 now are operative to detect a hit condition.

By resolving the conflicts in commands in accordance with the teachings of the present invention, duplicate commands are not issued for the same information and the necessity to link commands is eliminated.

The operation of the preferred embodiment of the present invention will now be considered relative to the processing of a write command received from processor 700. It will be assumed that the read command discussed above did not produce a conflict. Therefore, cache 750 performs a directory assignment operation, in the manner described above. At this time, both the DIRASN and FLDTBVALID flip-flops are set to binary ONES as a consequence of the miss detected as a result of the search operation. The FLDTBVALID flip-flop, when set to a binary ONE, causes the contents of in pointers 750-106 and 750-108 to be incremented by one in preparation of the next command. The appropriate control flag bits are set and written into the buffer flag section of transit block buffer 750-102. More specifically, the write cache flag and read quad flag bit positions are forced to binary ONES as a result of signals FORCEBYP000 and FRDQUAD100 being binary ONES. The signal FRDQUAD100 is generated by the FRDQUAD flip-flop which is set to a binary ONE when FLDTBVALID flip-flop 750-11414 switches to a binary ONE. The signal FORCEBYP000 normally can be assumed to be a binary ONE.

On the T clock of the next cycle following the directory assignment cycle, the read command is read out from transit block buffer 750-102, in response to the out pointer address signals, from command queue 750-107 into the RDTS register 750-119 via the ZTBC position of ZDTS switch 750-118. The level signals TBRR0100-2100 are loaded into the addressed transit block buffer register location on the ½ T clock of the same cycle. The read command is transferred to SIU100 on the DTS lines via switch 750-102 of FIG. 4.

The appropriate memory identifier signals are loaded into RMITS register 750-124 and the steering signals into the steering register (not shown). These signals are applied to the MITS and SDTS lines to the SIU, respectively. For further information regarding the generation and use of steering signals, reference may be made to U.S. Pat. No. 4,006,466. Additionally, this patent may be referenced for further information relating to the format of the memory of the read/write ZAC commands.

As mentioned, the read command causes main memory 800 to transfer the requested four word half blocks to cache unit 750. It will be assumed that prior to such transfer, processor 700 applies a write command to the ZADOB/RADO lines which contains an address identical to the address of the read command previously loaded into transit block buffer 750-102 in transit. The write command is generated by processor 700, in response to a store instruction.

This instruction requires two processor cycles for completion. During the first cycle, processor 700 carries out operations similar to those required for the load instruction which results in generating the address. This address is included in the write single command which processor 700 forwards to cache unit 750 during the first cache cycle. At that time, processor 700 forces the DREQCAC line to a binary ONE.

The write command address applied to the ZADOB/RADO lines is loaded into RADR0-7 registers 750-301a through 750-301n from position 1 of ZADR switch 750-302. During the first half of a first cylce, since there is no memory data transfer, the circuits of block 750-92000 of FIG. 7e force signals ENBMEMLEV100 and ENBADR1100 to binary ZEROS. This causes the circuits of block 750-303 to force the sets of signals [ZADR00100, [ZADR01100 through [ZADR70100, [ZADR71100 to binary ZEROS. Accordingly, ZADR0-7 switches 750-302a through 750-302n connect the address output of ZDAD switch 750-530 as the address input to RADR0-7 registers 750-301a through 750-301n.

While the command write address is clocked into RADR0-7 registers on the ½ T clock in response to signal [CLKHT100 and applied to all of the levels, nothing happens at this time, since the directory search must be performed for the write command (i.e., no write signals are generated). The write command address is saved in the RDAD register 750-532 for writing the processor data word during the next T clock cycle. The write command address is also applied to directories 750-500 and 750-502 for carrying out a search cycle of operation.

As in the case of the read command, at the earliest point in time, which corresponds to the time processor 700 applies the write command to the ZADOB/RADO lines, the comparator circuits 750-132 through 750-135 are enabled to compare the write command address bits 24-31 with the addresses of each of the read commands stored in the register section of the transit block buffer 750-102. Since the write address is identical to the read command just processed, the comparator circuit enabled by the valid bit flip-flop associated with the location storing the read command, causes AND gate 750-136 to force signal TBACMP100 to a binary ONE.

As previously described, the signal TBACMP100 causes AND/NAND gate 750-11704 to force signals TBHIT100 and TBHIT000 to a binary ONE and binary ZERO, respectively. Again, the signal TBHIT100 conditions the hold AND/NAND gates 750-11708 through 750-11712 to force the stop and internal hold signals to be turned on. This inhibits processor 700 and certain other sections of cache unit 750 from performing further operations. Therefore, cache unit 750 effectively repeats the search operation until the compare condition or conflict is no longer present. As previously described, the condition is removed when the valid bit flip-flop of the transit block location containing the read command address of the read command in transit is reset to a binary ZERO. This occurs when the last word of the four data words requested are written into cache store 750-300.

At that time, the CPSTOP and [HOLDDMEM signals are turned off. This releases processor 700 and the held cache sections. At such time, the cache 750 then completes the directory search operation. The information requested by the completed read command now resides in cache store 750-300. Hence, the circuits of block 750-512 are operative to detect a hit condition. As seen from FIG. 7e, the decoder circuits 750-92008 through 750-92014 are conditioned by the zone signals ZONE0100-3100 from switch 750-144 and the hit signals RHILEV0100-2100 from register 750-524 to write the data words of the write command received from processor 700 in cache store 750-300. At the same time, the cache unit 750 transfers the write command word to memory in a manner similar to that of the read command word. When the cache unit 750 receives a signal via the ARA line indicating that the write command has been accepted, it transfers the one or two data words to SUI100 on the DTS lines via the RWRTDATA register 750-121 and switch 750-120.

It will be noted that the arrangement of the preferred embodiment includes the NAND gate 750-10215. This gate operates to force signal RDBSY100 to a binary ONE when a read command is in process or a memory cycle is started.

In greater detail, it is seen that the contents of the valid flip-flop register 750-10214 are cleared to ZEROS in response to initialize signal INITTB100 generated by processor 700. In the case where the processor 700 has not received a response from a previous request, the processor 700 could generate an initialize signal. Since there may be a memory cycle in progress at the time, this could produce undesirable results.

The state of signal RDBSY100 is applied as a further input to processor 700 (e.g. via another interface line of interface 604 for signalling processor 700 when all read commands have been completed (i.e., signal FTBV0000-3000 are binary ONES) and a memory cycle has not been started (i.e., signal FLDTBVALID000 is a binary ONE). At such time, processor 700 can begin its processing of an interrupt or fault condition.

From the foregoing, it is seen how the arrangement of the present invention resolves any possible conflicts between commands being processed and those in transit at the earliest possible time. Upon the detection of a possible conflict, processor operation is held up until the conflict is no longer present. By using the same circuits to detect the conflict and hold up processor operation, the complexity of the arrangement is reduced significantly. Also, by directly controlling processor operations, this eliminates the need for linking commands and complex command sequencing circuits.

In addition to the above, the arrangement inhibits holding processor 700 and sections of cache unit 750 when such holding is not necessary (e.g. cancel situations).

It will be obvious to those skilled in the art that many changes may be made to the preferred embodiment of the present invention. For example, while the preferred embodiment described the registers used for storing transit block addresses as part of the transit block buffer 750-102, such registers can also be considered as the transit block buffer. Accordingly, the read commands can be viewed as being stored in a separate buffer similar to the write command/data buffer 750-100. Similarly, the valid bit indicator storage elements and other indicator flags can be viewed as being either separate from the transit block buffer or as a part thereof.

However, it will be appreciated that the transit block address storage is required to be implemented so as to enable all of the valid block addresses stored therein to be compared with the corresponding portion of a read or write command generated by the processing unit.

While in accordance with the provisions and statute, there has been illustrated and described the best form of the invention known, certain other changes may be made to the system described without departing from the spirit of the invention as set forth in the appended claims and that in some cases, certain features of the invention may be used to advantage without a corresponding use of other features.

What is claimed is:

1. A cache unit for use with a data processing unit for providing fast access to information fetched from a main store coupled to said cache unit in response to commands received from said data processing unit, each command including a command code and an address, said cache unit comprising:

a buffer store including a plurality of addressable word locations for storing said information;

a transit block buffer including a first number of register locations, each including a number of bit positions for storing at least a predetermined portion of said address for each outstanding command having a command code specifying a predetermined one of a plurality of operations;

comparator circuit means having first and second plurality of inputs corresponding in number to said number of register locations, each one of said first plurality of inputs being connected to a different one of said register locations and each of said second plurality of inputs being connected in common to receive said portion of said address as each command is generated by said data processing unit during operation, said comparator circuit means including means for generating an output signal upon the detection of an identical comparison between a corresponding address portion of each command generated by said data processing unit having a command code specifying any one of said predetermined plurality of operations and said portion of said address stored in at least one of said register locations; and, control means coupled to said comparator circuit means and to said data processing unit, said control means being operative in response to said output signal to generate a signal for inhibiting said processing unit from performing further operations until the cause of said output signal is no longer present.

2. The cache unit of claim 1 wherein said predetermined one of said plurality of operations corresponds to a read type operation and wherein said plurality of operations include read and write types of operations.

3. The cache unit of claim 2 wherein said cache unit further includes:

a plurality of valid bit bistable means corresponding in number to said number of transit block buffer register locations, each of said plurality of valid bit means for indicating when a corresponding one of said locations contains information relating to a valid read type command; and, addressing means coupled to said plurality of valid bit bistable means and to said transit block buffer, said addressing means for generating signals for enabling the storage of said portion of said address of each read type command into a next available one of said register locations and the setting of said corresponding one of said plurality of said valid bit bistable means from a first state to a second state upon storage thereof indicating that said read type command is in process.

4. The cache unit of claim 3 wherein said first state corresponds to a binary ZERO state and said second state corresponds to a binary ONE state.

5. The cache unit of claim 3 wherein said comparator circuit means includes:

a plurality of compare circuits corresponding in number to the number of said register locations, each compare circuit having a pair of sets of input terminals corresponding to one of said plurality of said first and second plurality of inputs coupled to a different one of said register locations and to receive said portion of said command address, an enabling input terminal coupled to one of said plurality of valid bit bistable means associated with said different one of said register locations and an output terminal, said each compare circuit being enabled by said one of said plurality of valid bit bistable elements when in said second state to generate an output compare signal indicating a conflict upon detecting that said portion of said command address is identical to said address of said outstanding read type command stored in said different one of said register locations.

6. The cache unit of claim 5 wherein said comparator circuit means further includes:

logic circuit means having a plurality of input terminals, each input terminal coupled to said output terminal of a different one of said compare circuits and an output terminal coupled to said control means, said logic circuit means for logically combining said compare output signals to generate said output signal when any one of said compare circuits detects said conflict.

7. The cache unit of claim 6 wherein said logic circuit means includes an OR gate.

8. The cache unit of claim 3 wherein said unit further includes:

valid bit reset control means connected to receive a set of identifier signals returned from said main store specifying the transit block register location corresponding to the outstanding read type command to which said requested information is being sent from said main store, said reset control means including detection means for detecting when all of the information requested by said outstanding read type command has been received, said reset control means being individually coupled to each of said plurality of valid bit bistable means and said detection means being operative to generate a reset output signal for switching a corresponding one of said valid bit bistable means from said second predetermined state to said first predetermined state indicating that said execution of said outstanding read type command is complete.

9. The cache unit of claim 8 wherein said detection means includes:

input logic gating means connected to receive response signals from said main store indicative of each transfer of a group of words of said information;

decoder circuit means having a plurality of input terminals, a first group of said input terminals of receiving said set of identifier signals, another one of said input terminals coupled to said input logic gating means and a plurality of sets of output terminals, each output terminal of a first set of output terminals being connected to a different one of said valid bit bistable means;

a plurality of pair count bistable means corresponding in number to said number of register locations, each pair count bistable means being coupled to a different one of a second set of output terminals and to said input logic means, said each pair count bistable means being operative upon detecting that all of said groups of words of information have been received to condition said input logic means to apply a signal to said another of said input terminals; and, said decoder circuit means being operative to generate said reset signal on one of said first set of output terminals designated by said set of identifier signals for switching said corresponding one of said valid bit bistable elements to said first predetermined state for indicating that the execution of said outstanding read type command is complete.

10. The cache unit of claim 2 wherein said buffer store is organized into a plurality of levels, each level containing a number of blocks of said word locations and wherein said portion of said command address corresponds to a block address.

11. The cache unit of claim 10 wherein said cache unit includes a number of sections and wherein said control means includes:

a plurality of logic circuit means, each logic circuit means being coupled to receive said output signal and being coupled to a different one of said number of sections, said each logic circuit means in response to said output signal being operative to generate an internal hold signal for inhibiting further operations by the section associated therewith.

12. The cache unit of claim 11 wherein one of said sections includes a directory search section, said section comprising:

a directory having a plurality of locations corresponding in number to the number of levels in said buffer store and each location being addressable by set addresses, each location of said directory storing block addresses of blocks of words within the associated level stored in said buffer store, said directory responsive to said set address corresponding to a low order portion of said command address to read out said block addresses corresponding to a high order portion of said command address;

search compare means coupled to said directory for comparing said block addresses read out from said directory with the high order portion of said command address and generating a signal indicative of whether or not the information being requested is stored in said buffer store; and, directory control means coupled to said search compare means and to one of said plurality of logic circuit means, said directory control means including a number of bistable elements for generating a sequence of control signals for defining certain cycles of operations to be performed by said directory control means, said directory control means being conditioned by said internal hold signal to repeat a directory search cycle of operation instead of performing a directory assignment cycle of operation indicated by said signal from said search compare means during the presence of said output signal.

13. The cache unit of claim 12 wherein said search compare means upon the removal of said conflict condition is operative to generate a hit signal indicating that the block of information requested by said next command now is stored in said buffer store, one of said number of bistable elements of said directory control means being prevented by said hit signal from switching from a first state to a second state which defines said directory assignment cycle of operation.

14. The cache unit of claim 11 wherein said control means further includes:
   bistable means coupled to said processing unit, said bistable means being conditioned to switch from a first state to a second state in response to a cancel command control signal from said processing unit for signalling cancellation of said next command and said bistable means when in said second state being connected to inhibit said control means from generating said signal for inhibiting said further operations of said processing unit in response to said output signal produced in response to said next command.

15. The cache unit of claim 14 wherein said plurality of valid bit bistable means are connected to receive an initialize signal from said data processing unit for switching each of said plurality of valid bit bistable means from said second state to said first state, said unit further including:
   gating means having a plurality of input terminals, each connected to a different one of said valid bit bistable means and an output terminal coupled to said processing unit, said gating means being operative to generate an output busy signal when any one of said valid bit bistable means is in said second state signalling said processing unit of an outstanding read type command.

16. The cache unit of claim 15 wherein said unit further includes:
   bistable means coupled to one of said plurality of logic circuit means, to said search compare means and to said transit block buffer, said bistable means being operative to switch from a first state to a second state in response to said signal from said search compare means indicating that the information requested by said next command is not stored in said buffer store and said bistable means when in said second state signalling that a main store cycle of operation has been started; and,
   conductor means coupling said bistable means to said gating means, said gating means being operative to generate said output busy signal when said bistable means is in said second state.

17. The cache unit of claim 16 wherein said transit block buffer includes a second number of locations equaling said first number for storing each read type command which is to be transferred to said main store.

18. A cache unit for use with a data processing unit for providing fast access to information fetched from a main store coupled to said cache unit in response to commands received from said data processing unit, each command including at least an address, said cache unit comprising:
   a buffer store including a plurality of addressable word locations for storing said information;
   a transit block buffer including a number of registers, each register including a number of bit positions for storing at least a predetermined portion of said address for each outstanding command coded to specify a read type operation;
   comparator circuit means having first and second plurality of inputs corresponding in number to said number to said number of registers, each one of said first plurality of inputs being connected to a different one of said registers and each of said second plurality of inputs being connected in common to receive said portion of said address as each command is generated by said data processing unit during operation, said comparator circuit means includes means for generating an output signal indicative of a conflict upon detecting an identical comparison between a corresponding address portion of each read or write type command from said data processing unit and said portion of said command address stored in one or more of said registers; and,
   hold control means coupled to said comparator circuit means and to said data processing unit, said hold control means being operative in response to said output signal to generate a signal for inhibiting said processing unit from performing further operations until the cause of said output signal is no longer present, thus indicating that the execution of all of said outstanding read type commands which conflict with said read or write command have been completed.

19. The cache unit of claim 18 wherein said cache unit further includes:
   a plurality of valid bit bistable elements corresponding in number to said number of transit block buffer register locations; and,
   addressing means coupled to said plurality of valid bit bistable elements and to said transit block buffer registers, said addressing means generating signals for enabling storage of said portion of said address of each read type command into a next available one of said registers and the setting of a corresponding one of said plurality of said valid bit bistable elements from a first predetermined state to a second predetermined state upon storage thereof indicating that said read type command is in process.

20. The cache unit of claim 18 wherein said buffer store is organized into a plurality of levels, each level containing a number of blocks of said word locations and wherein said portion of said portion of said command address corresponds to a block address.

21. The cache unit of claim 20 wherein said comparator circuit means includes:
   a plurality of compare circuits corresponding in number to the number of said registers, each compare circuit having a pair of sets of input terminals corresponding to one of said plurality of said first and second plurality of inputs coupled to a corresponding one of said registers and to receive said portion of said command address, an enabling input terminal coupled to one of said plurality of valid bit bistable elements associated with said corresponding one of said registers and an output terminal, said each compare circuit when enabled by said one of said plurality of valid bit bistable elements being operative to generate a compare output signal indicating a conflict upon detecting that said portion of said command address is identical to said address of said read type command stored in said corresponding one of said registers.

22. The cache unit of claim 21 wherein said comparator circuit means further includes:

logic circuit means having a plurality of input terminals, each coupled to said output terminal of a different one of said compare circuits and an output terminal coupled to said control means, said logic circuit means for logically combining said compare output signals to generate said output signal when any one of said compare circuits detects said conflict.

23. The cache unit of claim 20 wherein said unit further includes:

valid bit reset control means connected to receive a set of memory identifier signals returned from said main store specifying the transit block register corresponding to the outstanding read type command to which said requested information is being sent from said main store, said reset control means including detection means for detecting when all of the information requested by said outstanding read type command has been received, said reset control means being individually coupled to each of said plurality of valid bit bistable elements and said detection means being operative to generate a reset output signal for switching a corresponding one of said valid bit bistable elements from said second predetermined state to said first predetermined state indicating that said execution of said outstanding read type command is complete.

24. The cache unit of claim 23 wherein said first predetermined state and said second predetermined state correspond to a binary ZERO and a binary ONE state respectively.

25. The cache unit of claim 18 wherein said cache unit includes a number of sections and wherein said control means further includes:

a plurality of logic circuit means, each logic circuit means being coupled to receive said output signal and being coupled to a different one of said number of sections, said each logic circuit means in response to said output signal being operative to generate an internal hold signal for inhibiting further operations by the section associated therewith.

26. The cache unit of claim 25 wherein said control means further includes:

bistable means coupled to said processing unit, said bistable means being conditioned to switch from a first predetermined state to a second predetermined state in response to a cancel command control signal from said processing unit for signalling cancellation of said next command and said bistable means when in said second predetermined state being connected to inhibit said plurality of logic circuit means and said control means from generating signals in response to said output signal for inhibiting said further operations of said processing unit and said sections.

27. The cache unit of claim 26 wherein said plurality of valid bit bistable elements are connected to receive an initialize signal from said data processing unit for switching each of said plurality of valid bit bistable elements from said second predetermined to said first predetermined state and said unit further including:

gating means having a plurality of input terminals, each connected to a different one of said valid bit bistable elements and an output terminal coupled to said processing unit, said gating means being operative to generate an output busy signal when any one of said valid bit bistable elements is in said second predetermined state signalling said processing unit of an outstanding read command.

28. A cache system for use with a data processing unit for providing fast access to information fetched from a main store coupled to said cache unit in response to commands received from said data processing unit, each command including a command code and an address including a block address, said cache system comprising:

a cache store including a plurality of levels, each level containing a number of blocks of addressable word locations for storing said information, each level and each block being defined by a set address and a block address respectively;

a transit block buffer including a plurality of sections, a first section having a number of locations for storing outstanding read commands to be transferred to said main store and a second section having said number of registers for storing said read command block addresses;

a plurality of comparator circuit means corresponding in number to said number of locations, each comparator circuit means having first and second sets of inputs, said first set of inputs being connected to a different one of said registers and said second set of inputs being connected in common to receive said portion of said block address as each command is applied as an input to said buffer during operation of said data processing unit, each comparator circuit means including means for generating an output compare signal upon detecting an identical comparison between a block address stored in said register and the block address of a read or write command applied to said buffer by said data processing unit; and, control means coupled to each of said comparator circuit means and to said data processing unit, said control means being operative in response to said compare output signal from any one of said comparator circuit means to generate a signal for inhibiting said processing unit from performing further operations until the cause of said compare output signal is no longer present, thus indicating that the execution of all of said read commands which conflict with said read or write command have been completed.

29. The cache unit of claim 28 wherein said system further includes: a plurality of valid bit bistable elements corresponding in number to said number of transit block registers; and, addressing means coupled to said plurality of valid bit bistable elements and to said transit block buffer, said addressing means generating signals for enabling storage of said read command and corresponding block address into a next available one of said locations of said first section and the corresponding one of said registers of said second section and the setting of a corresponding one of said plurality of said valid bit bistable elements from a first state to a second state upon storage of said read and block address command in said buffer for indicating that said command is in transit.

30. The cache system of claim 29 wherein each of said comparator circuit means includes:
  a corresponding one of said plurality of valid bit bistable elements, said each comparator circuit means being enabled by said one of said plurality of valid bit bistable elements when in said second state to compare said block addresses and generate said compare output signal upon detecting said identical comparison therebetween.

31. The cache system of claim 30 wherein said system further includes:
  valid bit reset control means connected to receive a set of memory command identifier signals from said main store specifying the transit block register corresponding to the outstanding read command to which said requested block of information is being sent from said main store, said reset control means including detection means for detecting when all of the information words of said block have been received, said reset control means being individually coupled to each of said plurality of valid bit bistable elements and said detection means being operative to generate a reset output signal for switching a corresponding one of said valid bit bistable elements from said second state to said first state indicating that said execution of said outstanding read command is complete.

32. The cache system of claim 31 wherein said detection means includes:
  input logic gating means connected to receive response signals from said main store indicative of transfers of pairs of words of said block of information;
  decoder circuit means having a plurality of input terminals, a first group of said input terminals for receiving said set of memory command identifier signals and another of said input terminals coupled to said input logic gating means and a plurality of sets of output terminals, each output terminal of a first set of output terminals being connected to a different one of said valid bit bistable elements;
  a plurality of pair count bistable means corresponding in number to said number of register locations, each pair count bistable means being coupled to a different one of a second set of output terminals and to said input logic means, said each pair count bistable means being operative upon being incremented to a predetermined count to generate a signal indicating that all of the pairs of words of said information block have been received, said input logic means in response to said signal being operative to apply a signal to said another one of said input terminals; and,
  said decoder circuit means being conditioned by said signal to generate said reset signal one one of said first set of output terminals designated by said set of identifier signals for switching said corresponding one of said valid bit bistable elements to said first state.

33. The cache system of claim 28 wherein said cache system includes a number of sections and wherein said control means further includes:
  a plurality of logic circuit means, each logic circuit means being coupled to receive said compare output signals and being coupled to a different one of said number of sections, said each logic circuit means in response to said compare output signals being operative to generate an internal hold signal for inhibiting further operations by the section associated therewith.

34. The cache system of claim 33 wherein one of said sections includes a directory search section, said section comprising:
  a directory having a plurality of locations corresponding in number to the number of levels in said cache store and each location being addressable by said set addresses, each location of said directory storing block addresses of blocks of words within the associated level stored in said cache store, said directory responsive to said set of address corresponding to a low order portion of said command address to read out said block addresses corresponding to a high order portion of said command address;
  search compare means coupled to said directory for comparing said block addresses read out from said directory with the high order portion of said command address and generating a signal indicative of whether or not the block of information being requested is stored in said cache store; and,
  directory control means coupled to said search compare means and to said control means, said directory control means including a number of bistable elements for generating a sequence of control signals for defining the cycles of operations to be performed by said directory control means, said directory control means being conditioned by said control means to repeat a directory search cycle of operation until said compare output signals are no longer present.

35. The cache system of claim 34 wherein said search compare means includes means which is operative upon the removal of said conflict for generating a hit signal indicating that the block of information requested by said next command now is stored in said cache store and one of said number of bistable elements of said directory control means being inhibited by said hit signal from switching from a first state to a second state for defining said directory assignment cycle of operation.

36. The cache system of claim 33 wherein said control means further includes:
  bistable means coupled to said processing unit, said bistable means being conditioned to switch from a first state to a second state in response to a cancel command control signal from said processing unit for signalling cancellation of said read/write command and said bistable means when in said second state being connected to inhibit said plurality of logic circuit means and said control means from generating signals in response to said compare output signals for inhibiting said further operations of said processing unit and said sections.

37. The cache system of claim 36 wherein said plurality of valid bit bistable elements are connected to receive an initialize signal from said data processing unit for switching each of said plurality of valid bit bistable elements from said second state to said first state and said system further including:
  gating means having a plurality of input terminals, each connected to a different one of said valid bit bistable elements and an output terminal coupled to said processing unit, said gating means being operative to generate an output busy signal when any one of said valid bit bistable elements is in said second state signalling said processing unit of an outstanding read command.

* * * * *